(12) United States Patent
Yasumura

(10) Patent No.: US 7,170,761 B2
(45) Date of Patent: Jan. 30, 2007

(54) SWITCHING POWER SUPPLY CIRCUIT

(75) Inventor: Masayuki Yasumura, Kanagawa (JP)

(73) Assignee: Sony Corporation (JP)

( * ) Notice: Subject to any disclaimer, the term of this patent is extended or adjusted under 35 U.S.C. 154(b) by 62 days.

(21) Appl. No.: 11/143,987

(22) Filed: Jun. 2, 2005

(65) Prior Publication Data

US 2005/0281059 A1    Dec. 22, 2005

(30) Foreign Application Priority Data

| Jun. 2, 2004 | (JP) | ............................ P2004-164452 |
| Jun. 30, 2004 | (JP) | ............................ P2004-194106 |
| Aug. 13, 2004 | (JP) | ............................ P2004-235912 |
| Sep. 9, 2004 | (JP) | ............................ P2004-262695 |
| Sep. 13, 2004 | (JP) | ............................ P2004-265442 |
| Mar. 22, 2005 | (JP) | ............................ P2005-082518 |

(51) Int. Cl.
    *H02M 3/335* (2006.01)
(52) U.S. Cl. .............................. 363/17; 363/98; 363/25
(58) Field of Classification Search ............ 363/16–20, 363/25, 132, 127, 98, 95, 97, 24, 26; 323/266, 323/267

See application file for complete search history.

(56) References Cited

U.S. PATENT DOCUMENTS

| 4,128,868 | A | * | 12/1978 | Gamble | ......................... 363/26 |
| 5,274,543 | A | * | 12/1993 | Loftus, Jr. | .................. 363/127 |
| 6,310,792 | B1 | * | 10/2001 | Drobnik | ...................... 363/147 |
| 6,583,999 | B1 | * | 6/2003 | Spindler et al. | .............. 363/98 |
| 6,930,893 | B2 | * | 8/2005 | Vinciarelli | ................... 363/17 |

FOREIGN PATENT DOCUMENTS

JP             06-327246 A       11/1994

* cited by examiner

*Primary Examiner*—Rajnikant B. Patel
(74) *Attorney, Agent, or Firm*—Lerner, David, Littenberg, Krumholz & Mentlik, LLP

(57) ABSTRACT

A switching power supply circuit includes a primary side series resonant circuit forming a current resonant converter, and a secondary side series resonant circuit formed by at least a secondary winding and a secondary side series resonant capacitor, whereby a coupling type resonant circuit is formed by magnetic coupling of an isolated converter transformer. In order to obtain a unimodal characteristic for this coupling type resonant circuit, the total coupling coefficient of the isolated converter transformer is set to 0.65 or lower. For power factor improvement, a power factor improving circuit of a power regeneration system or a voltage feedback system is provided.

15 Claims, 29 Drawing Sheets

PIT

VAC=100V, Pomax=150W

VAC=230V, Pomax=150W

VAC=100V, Pomax=200W

VAC=230V, Pomax=200W

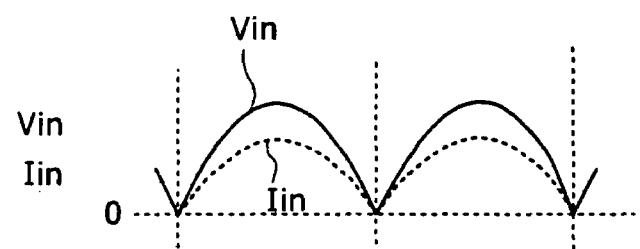
FIG. 34A Vin Iin
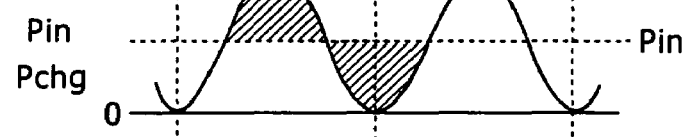
FIG. 34B Pin Pchg
FIG. 34C Ichg
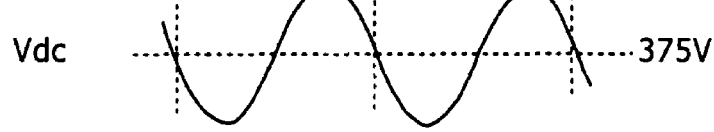
FIG. 34D Vdc

SWITCHING POWER SUPPLY CIRCUIT

CROSS-REFERENCE TO RELATED APPLICATIONS

The present application claims priority from Japanese Application Nos. 2004-164452 filed Jun. 2, 2004, 2004-194106 filed Jun. 30, 2004, 2004-235912 filed Aug. 13, 2004, 2004-262695 filed Sep. 9, 2004, 2004-265442 filed Sep. 13, 2004 and 2005-082518 filed Mar. 22, 2005, the disclosures of which are hereby incorporated by reference herein.

BACKGROUND OF THE INVENTION

The present invention relates to a switching power supply circuit provided as a power supply for various electronic devices.

Recently, due to the development of switching devices capable of withstanding relatively high currents and voltages of high frequency, most power supply circuits that rectify a commercial power supply voltage and obtain a desired direct-current voltage have become switching type power supply circuits.

Switching power supply circuits have a transformer and other devices miniaturized by raising the switching frequency, and are used as a power supply for various electronic devices, such as a high-power DC-to-DC converter.

Generally, when a commercial power supply voltage is rectified, a current flowing in a smoothing circuit has a distorted waveform, thus causing a problem in that a power factor indicating the efficiency of use of the power supply is degraded. In addition, a measure to suppress the harmonics caused by such a distorted current waveform is required.

So-called wide range-ready power supply circuits are known as switching power supply circuits configured to be able to perform operations dealing with a range of alternating input voltages of about AC 85 V to 288 V, for example, so as to be ready for regions using an alternating input voltage AC 100 V system, such as, for example, Japan and the United States of America, and regions using an alternating input voltage AC 200 V system, such as, for example, Europe.

As the above-described resonant converter, a resonant converter configured to achieve stabilization by controlling the switching frequency of a switching device forming the converter (a switching frequency control system) is known.

In a resonant converter of such a switching frequency control system configured to switching-drive a switching device using a general-purpose oscillation and drive circuit IC, for example, a maximum variable range of switching frequency fs is, for example, fs=about 50 kHz to about 250 kHz. With such a variable range, under a load condition in which the load power Po is varied in a relatively wide variation range of Po=0 W to about 90 W or even about 150 W, for example, it is substantially impossible to achieve stabilization while dealing with a wide range of alternating input voltage of AC 85 V to 288 V.

When performing stabilization dealing with a variation of load power Po=150 W to 0 W in a single range configuration of an AC 100 V system dealing with variations in a range of about AC 85 V to 144 V, for example, a switching frequency variable range is about 80 kHz to about 200 kHz. To realize a wide range configuration dealing with variations in a range of AC 85 V to 288 V as described above requires a wider range of about 80 kHz to 500 kHz, for example, as a switching frequency control range. With a maximum variable range of the above-mentioned oscillation and drive IC, it is substantially impossible to control the switching frequency.

Even if the oscillation and drive IC can realize such a wide frequency control range, a high switching frequency of 400 kHz or 500 kHz involves an increase in losses at the switching device and the transformer, for example, thus making it very difficult to obtain a practical numerical value as the power conversion efficiency.

For these reasons, it is substantially impossible for resonant converters to be configured to deal with the wide range by switching frequency control.

Accordingly, as a conventional technique enabling realization of a wide range-ready configuration in a resonant converter and power factor improvement, a method using a so-called active filter is known (see Japanese Patent Laid-Open No. Hei 6-327246, for example). The fundamental configuration of such an active filter is shown in FIG. 33 of that reference.

In FIG. 33, a bridge rectifier circuit Di is connected to a commercial alternating-current power supply line AC. An output capacitor Cout is connected in parallel with the positive electrode/negative electrode lines of the bridge rectifier circuit Di. A rectified output of the bridge rectifier circuit Di is supplied to the output capacitor Cout, whereby a direct-current voltage Vout is obtained as the voltage across the output capacitor Cout. This direct-current voltage Vout is supplied as the input voltage to a load 110, such as a DC-to-DC converter, for example, in a succeeding stage.

As shown in the figure, a configuration for power factor improvement includes an inductor L, a fast recovery type diode D, a resistor Ri, a switching device Q, and a multiplier 111.

The inductor L and the diode D are connected in series with each other and inserted between the positive electrode output terminal of the bridge rectifier circuit Di and the positive electrode terminal of the output capacitor Cout.

The resistor Ri is inserted between the negative electrode output terminal (a primary side ground) of the bridge rectifier circuit Di and the negative electrode terminal of the output capacitor Cout.

In this case, a MOS-FET is selected as the switching device Q. As shown in the figure, the switching device Q is inserted between the primary side ground and a point of connection between the inductor L and the diode D.

The multiplier 111 is connected with a current detection line L1 and a waveform input line Lw as a feedforward circuit, and a voltage detection line Lv as a feedback circuit.

The multiplier 111 detects the level of the rectified current flowing through the negative electrode output terminal of the bridge rectifier circuit Di, which level is input from the current detection line L1.

The multiplier 111 also detects the waveform of the rectified voltage at the positive electrode output terminal of the bridge rectifier circuit Di, which waveform is input from the waveform input line Lw. This is equivalent to detection of a waveform of commercial alternating-current power AC (alternating input voltage) as absolute values.

The multiplier 111 also detects the variation difference of the direct-current input voltage on the basis of the direct-current voltage Vout of the output capacitor Cout which voltage is input from the voltage detection line Lv.

The multiplier 111 outputs a drive signal for driving the switching device Q.

The multiplier 111 first multiplies together the level of the rectified current detected from the current detection line L1 and the variation difference of the direct-current input voltage detected from the voltage detection line Lv as described above. Then, the multiplier 111 generates a current command value of the same waveform as the alternating input voltage VAC based on the result of the multiplication and the waveform of the direct-current input voltage detected from the waveform input line Lw.

Further, the multiplier 111 in this case compares the current command value with an actual level of alternating input current (detected on the basis of the input from the current detection line L1), performs PWM control on a PWM signal according to the difference between the current command value and the actual level of the alternating input current, and generates a drive signal based on the PWM signal. The switching device Q is switching-driven by this drive signal. As a result, the alternating input current is controlled so as to have the same waveform as the alternating input voltage, and the power factor approaches one and is thus improved. Also, in this case, since the current command value generated by the multiplier is controlled so as to be varied in amplitude according to the variation difference of the rectified and smoothed voltages, variations in the rectified and smoothed voltages are suppressed.

FIG. 34A shows an input voltage Vin and an input current Iin input to the active filter circuit shown in FIG. 33. The voltage Vin corresponds to the waveform of the voltage as the rectified output of the bridge rectifier circuit Di, while the current Iin corresponds to the waveform of the current as the rectified output of the bridge rectifier circuit Di. The waveform of the current Iin has the same conduction angle as the rectified output voltage (voltage Vin) of the bridge rectifier circuit Di. This indicates that the waveform of the alternating input current flowing from the commercial alternating-current power supply AC to the bridge rectifier circuit Di has the same conduction angle as the current Iin. That is, a power factor close to one is obtained.

FIG. 34B shows the change in energy (power) Pchg input to and output from the output capacitor Cout. The output capacitor Cout stores energy when the input voltage Vin is high, and releases energy when the input voltage Vin is low, thus maintaining a flow of output power.

FIG. 34C shows the waveform of a charge and discharge current Ichg of the above-described output capacitor Cout. As is understood also from the fact that the charge and discharge current Ichg is in phase with the waveform of the input and output energy Pchg of FIG. 34B, the charge and discharge current Ichg flows so as to correspond to an operation of storing/releasing the energy Pchg by the output capacitor Cout.

Unlike the input current Vin, the charge and discharge current Ichg has substantially the same waveform as the second harmonic of the alternating line voltage (commercial alternating-current power AC). A ripple voltage Vd as a second harmonic component occurs in the alternating line voltage as shown in FIG. 34D due to the flow of energy to and from the output capacitor Cout. Because of reactive power conservation, the ripple voltage Vd has a 90° phase difference with respect to the charge and discharge current Ichg shown in FIG. 34C. A rating of the output capacitor Cout is determined in consideration of a second harmonic ripple current and the processing of a high-frequency ripple current from a boost converter switch modulating the second harmonic ripple current.

FIG. 35 shows an example of the configuration of an active filter having a basic control circuit system, which filter is based on the circuit configuration of FIG. 33. Incidentally, the same parts as in FIG. 33 are identified by the same reference numerals, and a description thereof will be omitted.

A switching pre-regulator 115 is disposed between the positive electrode output terminal of a bridge rectifier circuit Di and the positive electrode terminal of an output capacitor Cout. The switching pre-regulator 115 is a part formed by the switching device Q, the inductor L, the diode D and the like in FIG. 33.

The control circuit system including a multiplier 111 also has a voltage error amplifier 112, a divider 113, and a squaring unit 114.

The voltage error amplifier 112 divides a direct-current voltage Vout of the output capacitor Cout by voltage dividing resistors Rvo and Rvd, and then inputs the result to the non-inverting input of an operational amplifier 112a. A reference voltage Vref is input to the inverting input of the operational amplifier 112a. The operational amplifier 112a amplifies a voltage having a level corresponding to an error between the reference voltage Vref and the divided direct-current voltage Vout with an amplification factor determined by a feedback resistor Rv1 and a capacitor Cv1. The operational amplifier 112a then outputs the amplified voltage as an error output voltage Vvea to the divider 113.

The squaring unit 114 is supplied with a so-called feedforward voltage Vff. The feedforward voltage Vff is an output (average input voltage) obtained by averaging an input voltage Vin by an averaging circuit 116 (Rf11, Rf12, Rf13, Cf11, and Cf12). The squaring unit 114 squares the feedforward voltage Vff, and then outputs the squared feedforward voltage Vff to the divider 113.

The divider 113 divides the error output voltage Vvea from the voltage error amplifier 112 by the squared value of the average input voltage which value is output from the squaring unit 114. The divider 113 then outputs a signal resulting from the division to the multiplier 111.

That is, a voltage loop is formed by a system of the squaring unit 114, the divider 113, and the multiplier 111. The error output voltage Vvea output from the voltage error amplifier 112 is divided by the square of the average input voltage (Vff) before being multiplied by a rectified input signal Ivac by the multiplier 111. This circuit maintains the gain of the voltage loop at a constant level without changing the gain as the square of the average input voltage (Vff). The average input voltage (Vff) has an open-loop correcting function, being fed in a forward direction within the voltage loop.

The multiplier 111 is supplied with the output obtained by dividing the error output voltage Vvea by the square of the average input voltage (Vff) and with the rectified output (Iac) of the positive electrode output terminal (a rectified output line) of the bridge rectifier circuit Di via a resistor Rvac. In this case, the rectified output is represented as current (Iac) rather than voltage. The multiplier 111 multiplies these inputs together, thereby generating a current programming signal (multiplier output signal) Imo, and then outputs the current programming signal. This signal corresponds to the current command value described with reference to FIG. 33. The output voltage Vout is controlled by varying the average amplitude of the current programming signal. That is, a PWM signal corresponding to a change in the average amplitude of the current programming signal is generated, and switching driving is performed by a drive signal based on the PWM signal, whereby the level of the output voltage Vout is controlled.

Hence, the current programming signal has a waveform of the average amplitude for controlling the input voltage and the output voltage. Incidentally, the active filter controls not only the output voltage Vout but also the input voltage Vin. It can be said that a current loop in a feedforward circuit is programmed by a rectification line voltage, and therefore the input to a converter (a load 110) in a following stage is resistive.

FIG. 36 shows an example of the configuration of a power supply circuit formed by connecting a current resonant converter in a stage subsequent to an active filter based on the configuration shown in FIG. 33. The power supply circuit shown in this figure is a so-called wide range-ready power supply circuit dealing with alternating input voltages of both an AC 100 V system and an AC 200 V system. Also, the power supply circuit is configured to meet a condition of load power=0 to 150 W. The current resonant converter has the configuration of an externally excited current resonant converter of a half-bridge coupling system.

In the power supply circuit shown in FIG. 36, a common mode noise filter formed by two common mode choke coils CMC and three across capacitors CL are connected to a commercial alternating-current power supply AC in the connection mode shown in the figure, and a bridge rectifier circuit Di is connected in a subsequent stage.

A rectified output line of the bridge rectifier circuit Di is connected with a normal mode noise filter 125 formed by connecting one choke coil LN and two filter capacitors (film capacitors) CN and CN as shown in the figure.

The positive electrode output terminal of the bridge rectifier circuit Di is connected to the positive electrode terminal of a smoothing capacitor Ci via a series connection of the choke coil LN, an inductor LPC of a power choke coil PCC, and a fast recovery type rectifier diode D20. The smoothing capacitor Ci corresponds to the output capacitor Cout in FIG. 33 and FIG. 35. The inductor LPC of the power choke coil PCC and the diode D20 correspond to the inductor L and the diode D, respectively, shown in FIG. 33.

In addition, an RC snubber circuit formed by a capacitor Csn and a resistor Rsn is connected in parallel with the rectifier diode D20 in FIG. 36.

A switching device Q11 in this figure corresponds to the switching device Q10 in FIG. 33. That is, in actually mounting the switching device of the active filter, the switching device Q11 in this case is inserted between a point of connection between the inductor LPC and the fast recovery type rectifier diode D20 and a primary side ground (via a resistor R3). A MOS-FET is selected as the switching device Q11 in this case.

A power factor and output voltage controlling IC 120 in this case is an integrated circuit (IC) that controls the operation of the active filter for improving a power factor so as to approximate the power factor to one.

In this case, the power factor and output voltage controlling IC 120 includes, for example, a multiplier, a divider, a voltage error amplifier, a PWM control circuit, and a drive circuit for outputting a drive signal for switching-driving the switching device. Circuit parts corresponding to the multiplier 111, the voltage error amplifier 112, the divider 113, the squaring unit 114 and the like shown in FIG. 35 are included within the power factor and output voltage controlling IC 120.

In this case, a feedback circuit is formed so as to input a voltage value obtained by dividing the voltage across the smoothing capacitor Ci (rectified and smoothed voltage Ei) by voltage dividing resistors R5 and R6 to a terminal T1 of the power factor and output voltage controlling IC 120.

A feedforward circuit inputs a level of rectified current from a point of connection of a resistor R3 inserted between a source of the switching device Q11 and the primary side ground through a resistor R4 to a terminal T2 of the power factor and output voltage controlling IC 120. That is, a feedforward circuit as a line corresponding to the current detection line L1 in FIG. 33 is formed.

A terminal T4 of the power factor and output voltage controlling IC 120 is supplied with operating power for the power factor and output voltage controlling IC 120. A half-wave rectifier circuit formed by a diode D21 and a capacitor 21 shown in the figure converts an alternating voltage excited in a winding N5 coupled to the inductor LPC by transformer coupling in the power choke coil PCC into a low direct-current voltage, and then supplies the low direct-current voltage to the terminal T4 of the power factor and output voltage controlling IC 120.

The power factor and output voltage controlling IC 120 outputs, from a terminal T3 thereof, a drive signal for driving the switching device to a gate of the switching device Q11.

The switching device Q11 performs a switching operation according to the drive signal applied thereto.

As described with reference to FIG. 33 and FIG. 35, the switching device Q11 is switching-driven by the drive signal based on PWM control such that the conduction angle of the rectified output current is substantially equal to the conduction angle of the waveform of the rectified output voltage. The conduction angle of the rectified output current being substantially equal to the conduction angle of the waveform of the rectified output voltage means that the conduction angle of an alternating input current flowing in from the commercial alternating-current power supply AC is substantially equal to the conduction angle of the waveform of an alternating input voltage VAC. Consequently, the power factor is controlled to be substantially one. That is, the power factor is improved.

As figures representing the actual power factor improving operation, FIG. 37 and FIG. 38 show waveforms of the alternating input current IAC obtained in the circuit shown in FIG. 36 together with the alternating input voltage VAC by way of comparison. FIG. 37 shows a result when the alternating input voltage VAC=100 V. FIG. 38 shows a result when the alternating input voltage VAC=230 V.

As shown in FIG. 37, the peak level of the alternating input current IAC is 6.5 Ap when the alternating input voltage VAC=100 V. It is understood that the conduction period of the alternating input current IAC substantially coincides with the conduction period of the alternating input voltage VAC and that the power factor is thereby improved.

When the alternating input voltage VAC=230 V, as shown in FIG. 38, the peak level of the alternating input current IAC is 3.0 Ap. It is to be understood that, also in this case, the conduction period of the alternating input current IAC substantially coincides with the conduction period of the alternating input voltage VAC and that the power factor is thereby improved.

In addition to such power factor improvement, the power factor and output voltage controlling IC 120 shown in FIG. 36 operates so as to make constant the average value of the rectified and smoothed voltage Ei (corresponding to Vout in FIG. 35)=380 V in the range of the alternating input voltage VAC=85 V to 264 V. That is, the direct-current input voltage stabilized at 380 V is supplied to the current resonant converter in the subsequent stage regardless of the variation range of the alternating input voltage VAC=85 V to 264 V. This is also indicated by a decrease in the peak level of the alternating input current IAC to less than ½ when the alternating input voltage VAC=230 V in FIG. 37 and FIG. 38.

Such a range of the alternating input voltage VAC=85 V to 264 V continuously covers the commercial alternating-current power supply AC 100 V system and the commercial alternating-current power supply AC 200 V system. Hence, the switching converter in the subsequent stage is supplied with the direct-current input voltage (Ei) stabilized at the same level in the cases of the commercial alternating-current power supply AC 100 V system and the commercial alternating-current power supply AC 200 V system. That is, having the active filter, the power supply circuit shown in FIG. 36 is also configured as a wide range power supply circuit.

The current resonant converter in the stage subsequent to the active filter includes two switching devices Q1 and Q2 as shown in the figure. In this case, the switching devices Q1 and Q2 are connected to each other by half-bridge coupling such that the switching device Q1 is on a high side and the switching device Q2 is on a low side. The switching devices Q1 and Q2 are connected in parallel with the rectified and smoothed voltage Ei (direct-current input voltage). That is, the converter forms a current resonant converter of a half-bridge coupling system.

The current resonant converter in this case is externally excited. Correspondingly, a MOS-FET is used as the switching devices Q1 and Q2. Clamping diodes DD1 and DD2 are connected in parallel with the switching devices Q1 and Q2, respectively, whereby a switching circuit is formed. The clamping diodes DD1 and DD2 form a path for passing a current in an opposite direction when the switching devices Q1 and Q2 are turned off.

The switching devices Q1 and Q2 are switching-driven by an oscillation and drive circuit 2 at a required switching frequency in timing in which the switching devices Q1 and Q2 are turned on/off alternately. The oscillation and drive circuit 2 operates so as to variably control the switching frequency under control according to the level of a secondary side direct-current output voltage Eo to be described later by a control circuit 1 shown in the figure. The oscillation and drive circuit 2 thereby stabilizes the secondary side direct-current output voltage Eo.

An isolated converter transformer PIT is provided to transmit the switching output of the switching devices Q1 and Q2 from the primary side to the secondary side.

One end part of a primary winding N1 of the isolated converter transformer PIT is connected to a point of connection (a switching output point) between the switching devices Q1 and Q2. Another end part of the primary winding N1 of the isolated converter transformer PIT is connected to the primary side ground via a series resonant capacitor C1. The capacitance of the series resonant capacitor C1 and the leakage inductance (L1) of the primary winding N1 form a series resonant circuit. The series resonant circuit performs a resonant operation by being supplied with the switching output of the switching devices Q1 and Q2. The series resonant circuit thereby converts the operation of the switching circuit formed by the switching devices Q1 and Q2 into a current resonance type operation.

A secondary winding N2 is wound on the secondary side of the isolated converter transformer PIT. The secondary winding N2 in this case is connected with a full-wave rectifier circuit formed by a bridge rectifier circuit including rectifier diodes Do1 to Do4 connected to each other by a bridge connection as shown in the figure and a smoothing capacitor Co. A secondary side direct-current output voltage Eo is thereby obtained as the voltage across the smoothing capacitor Co. This secondary side direct-current output voltage Eo is supplied to a load side not shown in the figure, and also branches off to be input as a detection voltage for the above-described control circuit 1. The control circuit 1 supplies a control signal corresponding to the level of the secondary side direct-current output voltage Eo input to the control circuit 1 to the oscillation and drive circuit 2. The oscillation and drive circuit 2 drives the switching devices Q1 and Q2 such that the switching frequency of the switching devices Q1 and Q2 is varied to stabilize the secondary side direct-current output voltage Eo according to the control signal. That is, the secondary side direct-current output voltage Eo is stabilized by a switching frequency control system.

FIG. 39 shows the characteristics of AC→DC power conversion efficiency (total efficiency), the power factor, and the rectified and smoothed voltage Ei with respect to the load variation. This figure shows the characteristics with respect to the variation of load power Po=150 W to 0 W. The characteristics at the time of the alternating input voltage VAC=100 V (AC 100 V system) are represented by solid lines, and the characteristics at the time of the alternating input voltage VAC=230 V (AC 200 V system) are represented by broken lines.

FIG. 40 shows the characteristics of AC→DC power conversion efficiency (total efficiency), the power factor, and the rectified and smoothed voltage Ei with respect to the variation of the alternating input voltage VAC. This figure shows the characteristics with respect to the variation of the alternating input voltage VAC=85 V to 264 V under a fixed condition of load power Po=150 W.

As shown in FIG. 39, the AC→DC power conversion efficiency ($\eta$AC→DC) is increased as the load power Po is increased. With respect to the variation in the alternating input voltage VAC, under the same load condition, the AC→DC power conversion efficiency ($\eta$AC→DC) is increased as the level of the alternating input voltage VAC is raised, as shown in FIG. 39 and FIG. 40.

In practice, under the load condition of the load power Po=150 W, $\eta$AC→DC=about 88.0% when the alternating input voltage VAC=100 V, and $\eta$AC→DC=about 91.0% when the alternating input voltage VAC=230 V.

As shown in FIG. 39, the power factor PF is increased as the load power Po is increased. As shown in FIG. 39 and FIG. 40, with respect to the variation of the alternating input voltage VAC, the power factor PF is decreased as the level of the alternating input voltage VAC is raised.

In practice, under the load condition of the load power Po=150 W, the power factor PF=about 0.99 when the alternating input voltage VAC=100 V, and the power factor PF=about 0.98 when the alternating input voltage VAC=230 V.

As shown in FIG. 39 and FIG. 40, the rectified and smoothed voltage Ei is constant against variations of the load power Po=150 W to 0 W and the alternating input voltage VAC=85 V to 264 V.

As is understood from the description thus far, the power supply circuit shown in FIG. 36 is formed with the conventionally known active filter shown in FIG. 33 and FIG. 35. The power factor is improved by employing such a configuration. In addition, under the condition of a load power of 150 W or lower, a so-called wide range-ready configuration operating in the commercial alternating-current power supply AC 100 V system and the commercial alternating-current power supply AC 200 V system is realized.

However, the power supply circuit shown in FIG. 36 has the following problems.

First, the power conversion efficiency of the power supply circuit shown in FIG. 36 is a total of the AC→DC power conversion efficiency corresponding to the active filter in the preceding stage and the DC→DC power conversion efficiency of the current resonant converter in the succeeding stage, as is also shown in the figure.

That is, the total power conversion efficiency of the circuit shown in FIG. 36 is a value obtained by multiplying the values of these power conversion efficiencies together, and thus tends to be correspondingly decreased.

According to an experiment, the AC→DC power conversion efficiency of a part corresponding to the active filter in the circuit of FIG. 36 is ηAC→DC=about 93% when the alternating input voltage VAC=100 V, and is ηAC→DC=about 96% when the alternating input voltage VAC=230 V. The DC→DC power conversion efficiency on the current resonant converter side is ηDC→DC=about 95% when the load power Po=150 W and the rectified and smoothed voltage Ei=380 V.

Thus, the total AC-to-DC power conversion efficiency of the circuit of FIG. 36 is decreased to ηAC→DC=about 88.0% when the alternating input voltage VAC=100 V, and is decreased to q AC→DC=about 91.0% when the alternating input voltage VAC=230 V, as described with reference to FIG. 39 and FIG. 40.

In addition, since the active filter circuit performs a hard switching operation, a very high level of noise occurs. Therefore, a relatively serious measure to suppress noise is required.

Thus, in the circuit shown in FIG. 36, the noise filter formed by the two common mode noise choke coils and the three across capacitors is formed in the line of the commercial alternating-current power supply AC. That is, a filter of two or more stages is required.

Also, the normal mode noise filter formed by the one choke coil LN and the two filter capacitors CN is provided in the rectified output line. Further, the RC snubber circuit is provided for the fast recovery type rectifier diode D20 for rectification.

Thus, the actual circuit requires measures against noise using a very large number of parts, which results in an increase in cost and an increase in the mounting area of the power supply circuit board.

Furthermore, while the switching frequency of the switching device Q11 operated by the power factor and output voltage controlling IC 120 as a general-purpose IC is fixed at 60 kHz, the switching frequency of the current resonant converter in the subsequent stage is varied in a range of 80 kHz to 200 kHz. Since switching timings of the switching device Q11 and the current resonant converter are thus independent of each other, primary side ground potentials obtained by switching operations of the switching device Q11 and the current resonant converter interfere with each other and thus become unstable, so that an abnormal oscillation, for example, tends to occur. This, for example, makes circuit design difficult and degrades reliability.

SUMMARY OF THE INVENTION

Accordingly, in view of the above problems, a switching power supply circuit according to an embodiment of the present invention is formed as follows.

The switching power supply circuit includes a rectifying and smoothing circuit operable to receive a commercial alternating-current power and to generate a rectified and smoothed voltage; a switching circuit including a switching device operable to receive the rectified and smoothed voltage as a direct-current input voltage and to perform a switching operation at a switching frequency, the switching operation resulting in a switching output; and a switching driving unit operable to drive the switching device to perform the switching operation.

The switching power supply circuit further includes a converter transformer having a core with a primary winding on a primary side and a secondary winding on a secondary side, the primary winding being supplied with the switching output of the switching operation, and the secondary winding having an alternating voltage induced therein by the primary winding, the core having a gap formed at a predetermined position between the primary side and the secondary side, the gap having a length selected to produce a predetermined coupling coefficient between the primary side and the secondary side; and a primary side series resonant circuit including a leakage inductance component of the primary winding and a capacitance of a primary side series resonant capacitor connected in series with the primary winding for producing a predetermined primary side resonant frequency for making the switching circuit operate on a current resonant basis.

The switching power supply circuit further includes a secondary side series resonant circuit including a leakage inductance component of the secondary winding and a capacitance of a secondary side series resonant capacitor connected in series with the secondary winding for producing a predetermined secondary side resonant frequency, the primary side series resonant circuit and the secondary side series resonant circuit forming an electromagnetic coupling type resonant circuit.

The switching power supply circuit further includes a secondary side direct-current output voltage generating circuit operable to input an oscillation output from the secondary side series resonant circuit and to perform a rectifying operation on the input oscillation output to generate a secondary side direct-current output voltage; and a constant-voltage control circuit operable to perform constant voltage control on the secondary side direct-current output voltage by controlling the switching driving unit according to a level of the secondary side direct-current output voltage to adjust the switching frequency of the switching circuit.

The switching power supply circuit further includes a power factor improving circuit operable to feed back the switching output of the switching operation to a predetermined rectified current path of the rectifying and smoothing circuit, and to interrupt a rectified current according to the fed-back switching output.

The switching power supply circuit further includes a composite coupling coefficient setting unit operable to set a composite coupling coefficient between the primary side and the secondary side of the converter transformer so that the electromagnetic coupling type resonant circuit has a unimodal output characteristic with respect to the input of a frequency signal having the switching frequency.

The thus formed switching power supply circuit has the power factor improving function of a system feeding back the switching output obtained in the primary side series resonant circuit to the rectified current path, has the configuration of a switching converter in which a primary side series resonant circuit converting a primary side switching operation into a current resonant type operation is formed, and further has a series resonant circuit on the secondary side.

With such a configuration, the switching power supply circuit according to the embodiment of the present invention forms a coupling type resonant circuit by electromagnetic coupling of the converter transformer. Further, a predetermined value considered to be for loose coupling is set as a composite coupling coefficient between the primary side and the secondary side of the converter transformer within the power supply circuit.

By thus setting a value for loose coupling as the composite coupling coefficient of the converter transformer, it is possible to obtain a steep unimodal output characteristic in response to the frequency signal of the switching frequency (switching output) as input to the coupling type resonant circuit. As a result, the range (necessary control range) of the switching frequency, which range is necessary for stabilization, can be reduced as compared with a case in which a series resonant circuit is formed on only the primary side.

BRIEF DESCRIPTION OF THE DRAWINGS

FIGS. 34A, 34B, 34C, and 34D are waveform charts of the operation of the active filter shown in FIG. 33;

DETAILED DESCRIPTION

The best mode for carrying out the invention (hereinafter referred to as embodiments) will hereinafter be described. In the description below of the embodiments, the embodiments are roughly classified into four embodiments, that is, a first, a second, a third, and a fourth embodiment. Further, variations in the categories of the first, second, third, and fourth embodiments will be represented by embodiments 1-1 to 1-n, 2-1 to 2-n, 3-1 to 3-n, and 4-1 to 4-n according to the numbers (n) of the variations, respectively.

Figure 1:
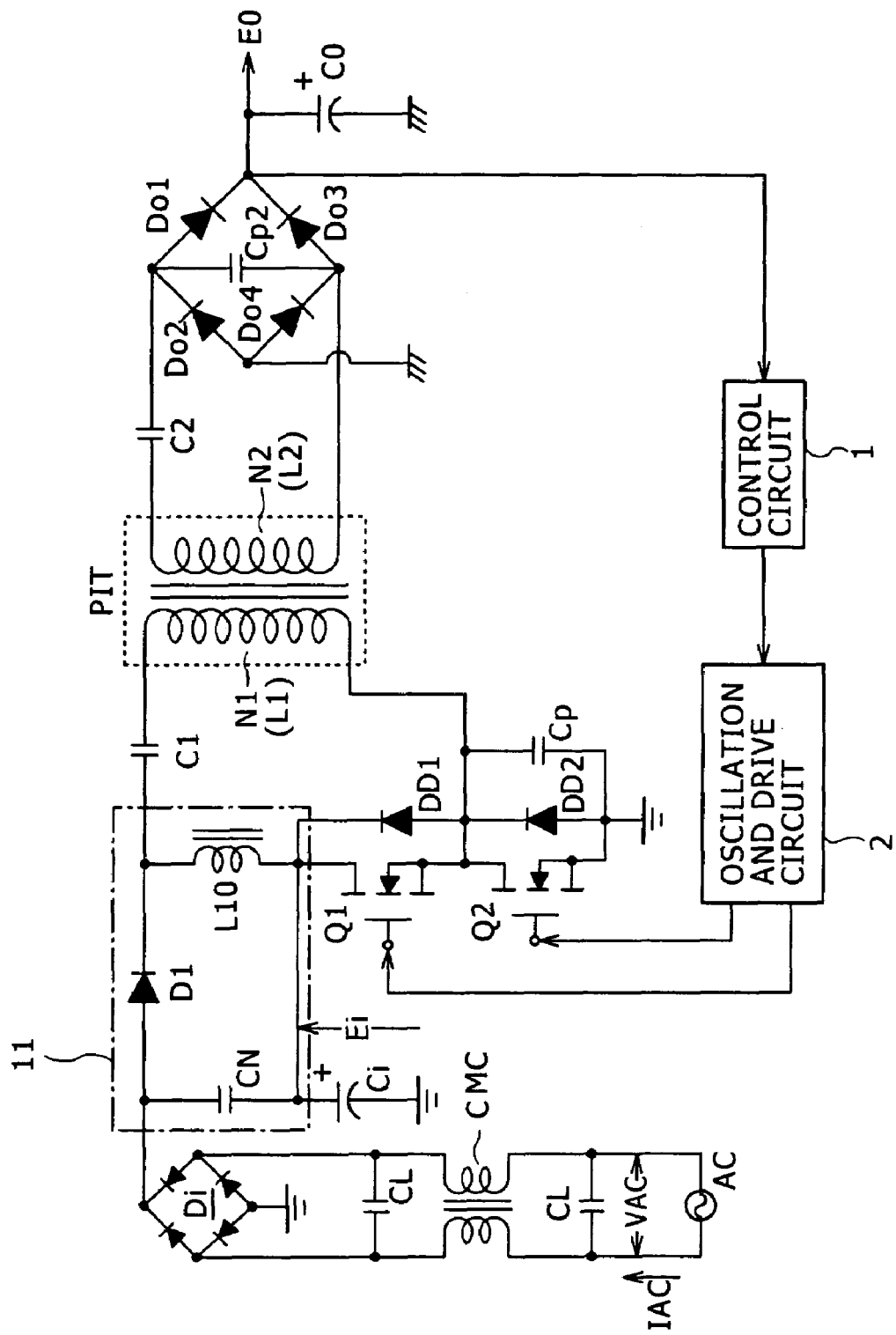
FIG. 1 is a circuit diagram showing an example of the configuration of a power supply circuit according to an embodiment 1-1 of the present invention.

FIG. 1 is a circuit diagram showing an example of the configuration of a switching power supply circuit according to an embodiment 1-1. The power supply circuit shown in this figure employs a combination of an externally excited current resonant converter of a half-bridge coupling system with a partial voltage resonant circuit as the fundamental configuration on the primary side.

Also, the power supply circuit shown in this figure employs a so-called wide range-capable configuration so as to be operable with inputs of both an AC 100 V system and an AC 200 V system.

The power supply circuit in this case is suitable for use as a power supply for a printer device, for example. The power supply circuit deals with a relatively wide range of variation of the load power Po from a maximum load power Pomax=150 W to a minimum load power Pomin=0 W (no load).

The power supply circuit shown in FIG. 1 has a common mode noise filter formed by connecting filter capacitors CL and CL and a common mode choke coil CMC to a commercial alternating-current power supply line AC.

A full-wave rectifying and smoothing circuit, including a bridge rectifier circuit Di and one smoothing capacitor Ci, is connected to the commercial alternating-current power supply line AC in a stage subsequent to the noise filter. In the embodiment 1-1, however, a power factor improving circuit 11 is provided so as to be interposed between the positive electrode output line of the bridge rectifier circuit Di and the positive electrode terminal of the smoothing capacitor Ci. The configuration and operation of the power factor improving circuit 11 will be described later.

The full-wave rectifying and smoothing circuit is supplied with a commercial alternating voltage AC, and performs a full-wave rectifying operation, whereby a rectified and smoothed voltage Ei (direct-current input voltage) is obtained across the smoothing capacitor Ci. The rectified and smoothed voltage Ei in this case has a level corresponding to an alternating input voltage VAC multiplied by unity.

A switching circuit formed by connecting two switching devices Q1 and Q2 formed by a MOS-FET by half-bridge coupling as shown in the figure is provided as the current resonant converter supplied with the direct-current input voltage and switching (interrupting) the direct-current input voltage. Damper diodes DD1 and DD2 are connected in parallel with the switching devices Q1 and Q2 between a drain and a source of the switching devices Q1 and Q2, respectively.

An anode and a cathode of the damper diode DD1 are connected to the source and the drain of the switching device Q1, respectively. Similarly, an anode and a cathode of the damper diode DD2 are connected to the source and the drain of the switching device Q2, respectively. The damper diodes DD1 and DD2 are body diodes of the switching devices Q1 and Q2, respectively.

A primary side partial resonant capacitor Cp is connected in parallel with the switching device Q2 between the drain and the source of the switching device Q2. The capacitance of the primary side partial resonant capacitor Cp and the leakage inductance L1 of a primary winding N1 form a parallel resonant circuit (a partial voltage resonant circuit) A partial voltage resonant operation, in which voltage resonance occurs only when the switching devices Q1 and Q2 are turned off, is obtained.

The power supply circuit is provided with an oscillation and drive circuit 2 to switching-drive the switching devices Q1 and Q2. The oscillation and drive circuit 2 includes an oscillating circuit and a driving circuit. A general-purpose IC, for example, can be used as the oscillation and drive circuit 2.

The oscillating circuit and the driving circuit within the oscillation and drive circuit 2 apply a drive signal (gate voltage) of a required frequency to each of the gates of the switching devices Q1 and Q2. Thus, the switching devices Q1 and Q2 perform a switching operation at the required switching frequency so as to be turned on/off alternately.

An isolated converter transformer PIT is provided to transmit the switching output of the switching devices Q1 and Q2 to the secondary side.

One end of the primary winding N1 of the isolated transformer PIT is connected to a point of connection (a switching output point) between the source of the switching device Q1 and the drain of the switching device Q2. Thereby, the switching output is transmitted. Another end of the primary winding N1 is connected to a point of connection between the cathode of the switching diode D1 and a high-frequency inductor L10 within the power factor improving circuit 11 to be described later via a primary side series resonant capacitor C1 connected in series with the primary winding N1.

Figure 2:
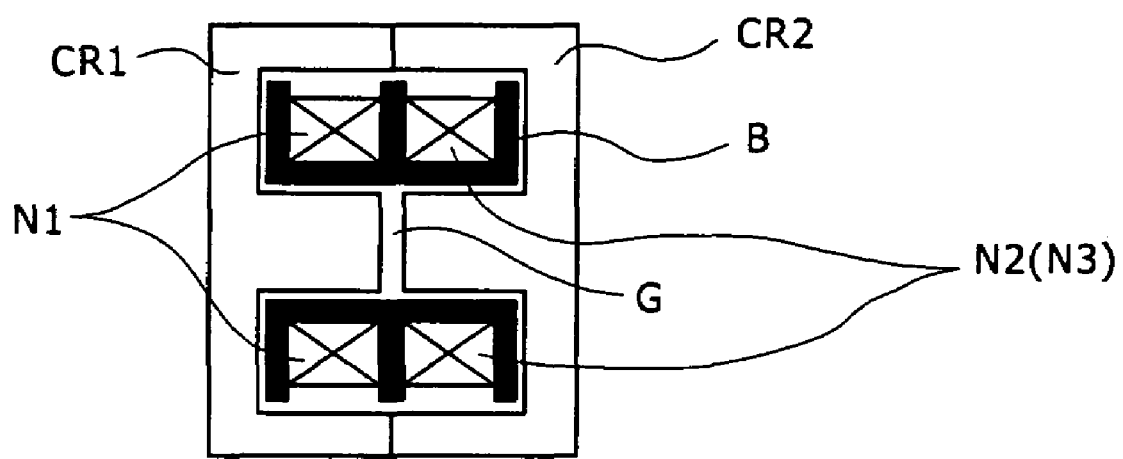
FIG. 2 is a sectional view of an example of the structure of an isolated converter transformer provided in the switching power supply circuit according to the embodiment.

The isolated converter transformer PIT has the structure shown in the sectional view of FIG. 2.

As shown in FIG. 2, the isolated converter transformer PIT has an EE type core (E-E-shaped core) formed by combining E-shaped cores CR1 and CR2 of ferrite material with each other in such a manner that magnetic legs of the core CR1 are opposed to magnetic legs of the core CR2.

Also, a bobbin B formed from a resin, for example, is provided in a shape with a primary side winding part and a secondary side winding part divided from each other so as to be independent of each other. The primary winding N1 is wound around one winding part of the bobbin B. A secondary winding N2 is wound around the other winding part of the bobbin B. The bobbin B thus wound with the primary side winding and the secondary side winding is attached to the above-described EE type core (CR1 and CR2). The primary side winding and the secondary side winding are thereby wound around the central magnetic leg of the EE type core in respective different winding regions. The structure of the isolated converter transformer PIT as a whole is thus obtained.

Also, a gap G is formed in the central magnetic leg of the EE type core as shown in the figure. The gap length of the gap G in this case is set to about 2.8 mm, for example. Thereby, a state of loose coupling with a coupling coefficient k=about 0.65 or lower, for example, is obtained.

Figure 36:
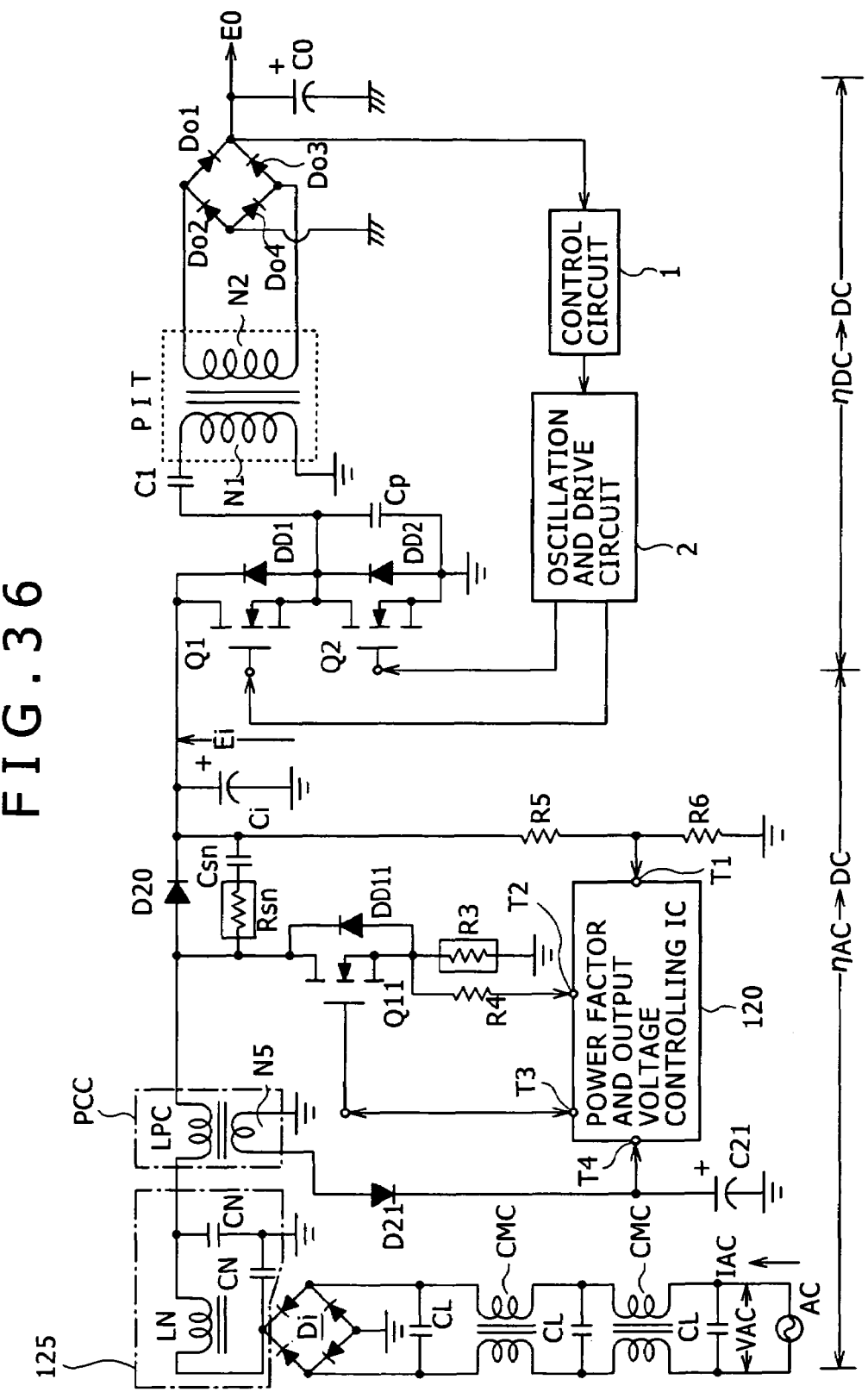
FIG. 36 is a circuit diagram showing an example of the configuration of a conventional power supply circuit including an active filter.
Figure 37:
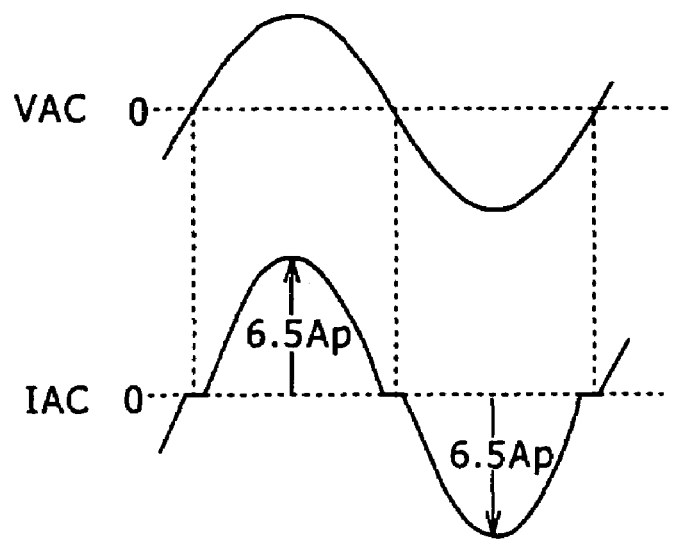
FIG. 37 is a waveform chart showing the waveforms of an alternating input voltage and an alternating input current obtained in the power supply circuit shown in FIG. 36 in correspondence with an AC 100 V system.
Figure 38:
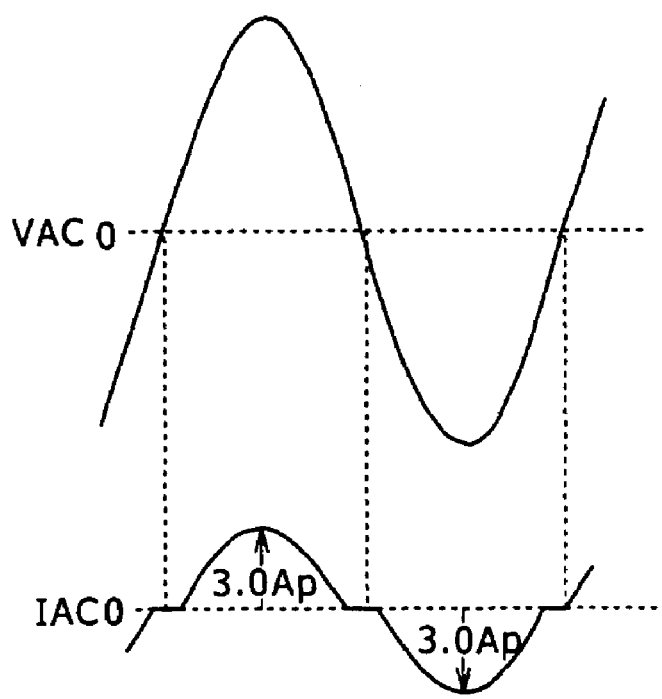
FIG. 38 is a waveform chart showing the waveforms of an alternating input voltage and an alternating input current obtained in the power supply circuit shown in FIG. 36 in correspondence with an AC 200 V system.
Figure 39:
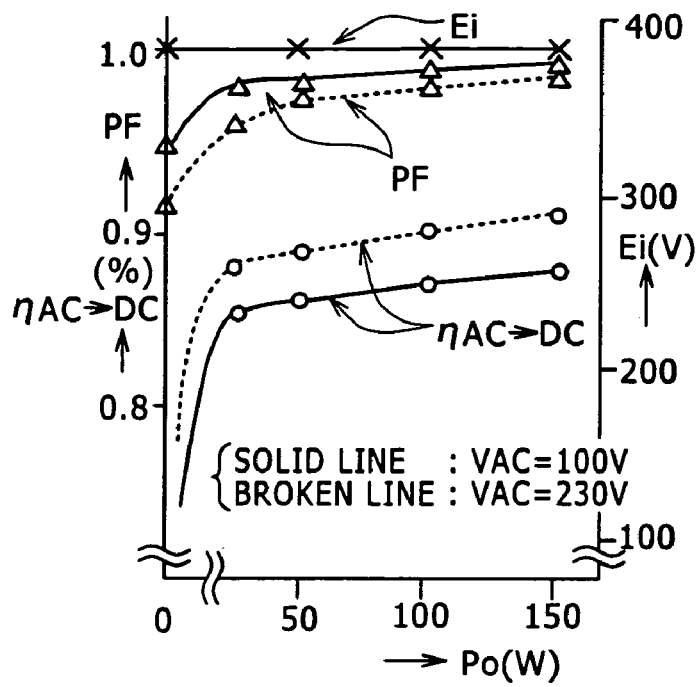
FIG. 39 is a characteristic diagram showing the characteristics of power conversion efficiency, a power factor, and a rectified and smoothed voltage with respect to the load variation in the power supply circuit shown in FIG. 36.
Figure 40:
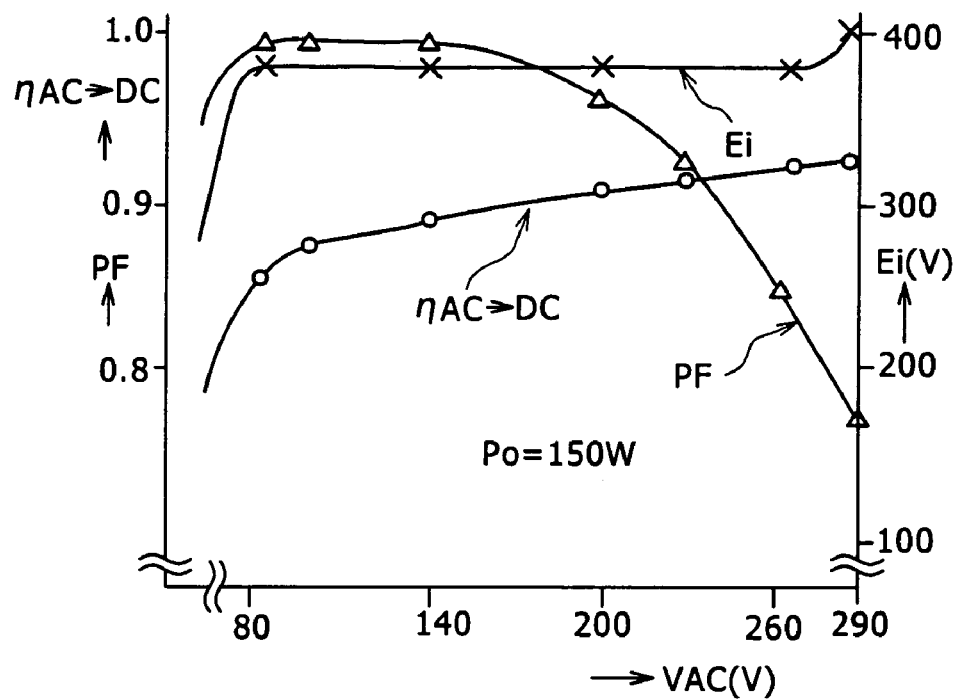
FIG. 40 is a characteristic diagram showing the characteristics of power conversion efficiency, a power factor, and a rectified and smoothed voltage with respect to the variation in an alternating input voltage in the power supply circuit shown in FIG. 36.

Incidentally, in power supply circuits having conventional current resonant converters including the foregoing power supply circuit shown in FIG. 36, the gap formed in the core of the isolated converter transformer PIT is set to about 1.5 mm or less, for example. As a coupling coefficient, k=about 0.75 or higher is obtained.

On the other hand, the degree of coupling between the primary side and the secondary side in the structure of the isolated converter transformer PIT in the embodiment described above is lower than in the conventional power supply circuits.

In FIG. 1, the isolated converter transformer PIT with the above-described structure produces a required leakage inductance L1 at the primary winding N1. The capacitance of the primary side series resonant capacitor C1 and the leakage inductance L1 form a primary side series resonant circuit.

Further, according to the above-described connection mode, the switching output of the switching devices Q1 and Q2 is transmitted to the primary side series resonant circuit. The primary side series resonant circuit performs a resonant operation according to the transmitted switching output. The primary side series resonant circuit thereby converts the operation of the primary side switching converter into a current resonance type operation.

Thus, according to the description thus far, the primary side switching converter shown in this figure obtains the current resonance type operation by the primary side series resonant circuit (L1-C1) and the partial voltage resonant operation by the primary side partial voltage resonant circuit (Cp//L1) described above.

That is, the power supply circuit shown in this figure employs a configuration on the primary side in which the resonant circuit for making the primary side switching converter a resonant converter is combined with another resonant circuit. The converter formed by thus combining two resonant circuits together will herein be referred to as a "complex resonant converter."

An alternating voltage corresponding to the switching output transmitted to the primary winding N1 is excited (induced) in the secondary winding N2 of the isolated converter transformer PIT.

In this case, a secondary side series resonant capacitor C2 is connected in series with a winding end point of the secondary winding N2. The capacitance of the secondary side series resonant capacitor C2 and the leakage inductance L2 of the secondary winding N2 thereby form a secondary side series resonant circuit. That is, in the embodiment 1-1, a series resonant circuit is formed on each of the primary side and the secondary side of the isolated converter transformer PIT.

In the embodiment 1-1, the oscillation frequency fo1 of the primary side series resonant circuit and the oscillation frequency fo2 of the secondary side series resonant circuit should satisfy at least a relation represented by $$fo1 > fo2$$

In practice, the oscillation frequency fo2 of the secondary side series resonant circuit is set to about ½ of the oscillation frequency fo1 of the primary side series resonant circuit. In the actual power supply circuit shown in FIG. 1, about 70 kHz is set as the oscillation frequency fo1 of the primary side series resonant circuit, and about 35 kHz is set as the oscillation frequency fo2 of the secondary side series resonant circuit.

A full-wave rectifier circuit, formed by a bridge rectifier circuit including rectifier diodes Do1 to Do4 connected to each other by a bridge connection as shown in the figure and a smoothing capacitor Co, is connected to the secondary winding N2 of the isolated converter transformer PIT. The connection mode of the full-wave rectifier circuit is as follows.

One end part of the secondary winding N2 is connected to a point of connection between the anode of the rectifier diode Do1 and the cathode of the rectifier diode Do2 (a positive electrode input terminal of the bridge rectifier circuit) via the secondary side series resonant capacitor C2 connected in series with the secondary winding N2. Another end part of the secondary winding N2 is connected to a point of connection between the anode of the rectifier diode Do3 and the cathode of the rectifier diode Do4 (a negative electrode input terminal of the bridge rectifier circuit).

A point of connection between the anode of the rectifier diode Do2 and the anode of the rectifier diode Do4 (a negative electrode output terminal of the bridge rectifier circuit) is connected to a secondary side ground. A point of connection between the cathode of the rectifier diode Do1 and the cathode of the rectifier diode Do3 (a positive electrode output terminal of the bridge rectifier circuit) is connected to the positive electrode terminal of the smoothing capacitor Co.

The negative electrode terminal of the smoothing capacitor Co is connected to the secondary side ground (a negative electrode output terminal of the bridge rectifier circuit).

In the thus formed bridge full-wave rectifier circuit, in one half period of the alternating voltage excited in the secondary winding N2, a pair of the rectifier diodes Do1 and Do4 of the bridge rectifier circuit conducts, and thus the smoothing capacitor Co is charged with a rectified current. In the other half period of the alternating voltage excited in the secondary winding N2, a pair of the rectifier diodes Do2 and Do3 conducts, and thus the smoothing capacitor Co is charged with a rectified current.

Thereby, a secondary side direct-current output voltage Eo having a level corresponding to the level of the alternating voltage multiplied by unity, which voltage is excited in the secondary winding N2, is obtained as a voltage across the smoothing capacitor Co.

The secondary side direct-current output voltage Eo thus obtained is supplied to a load not shown in the figure, and also branches off to be input as a detection voltage for a control circuit 1 to be described later.

It can be considered that the full-wave rectifier circuit rectifies and smoothes the oscillation output of the secondary side series resonant circuit. Thus; the secondary side rectifying operation of the full-wave rectifier circuit is also of a current resonance type. That is, the rectified current waveform includes a sinusoidal waveform of the oscillation frequency of the secondary side series resonant circuit.

In addition, the secondary side of the power supply circuit in this case has a secondary side partial resonant capacitor Cp2 inserted between the point of connection between the anode of the rectifier diode Do1 and the cathode of the rectifier diode Do2 and the point of connection between the anode of the rectifier diode Do3 and the cathode of the rectifier diode Do4. That is, the secondary side partial resonant capacitor Cp2 is inserted between the positive electrode input terminal and the negative electrode input terminal of the secondary side bridge rectifier circuit.

The capacitance of the secondary side partial resonant capacitor Cp2 and the leakage inductance L2 of the secondary winding N2 form a parallel resonant circuit (a partial voltage resonant circuit). A partial voltage resonant operation, in which voltage resonance occurs only when the rectifier diodes Do1 to Do4 are turned off, is obtained by the parallel resonant circuit.

The secondary side partial resonant capacitor Cp2 is inserted to form a path for passing a current in an opposite direction which current occurs when the rectifier diodes Do1 to Do4 are turned off, so that the power loss caused at the rectifier diodes Do1 to Do4 is reduced.

As described thus far, the switching power supply circuit according to the embodiment 1-1 has the primary side series resonant circuit (L1-C1) and the primary side partial resonant circuit (L1//Cp) on the primary side, and the secondary side series resonant circuit (L2-C2) and the secondary side partial resonant circuit (L2//Cp2) on the secondary side.

As described above, the combination of two resonant circuits, or the series resonant circuit and the partial resonant circuit on the primary side, is referred to as a complex resonant converter. A switching converter formed by combining three or more resonant circuits as in embodiment 1-1 will herein be referred to as a "multiple complex resonant converter."

The control circuit 1 supplies to the oscillation and drive circuit 2 a detection output corresponding to a level change of the secondary side direct-current output voltage Eo. The oscillation and drive circuit 2 drives the switching devices Q1 and Q2 such that the switching frequency of the switching devices Q1 and Q2 is varied according to the detection output supplied from the control circuit 1. By varying the switching frequency of the switching devices Q1 and Q2, the resonant impedance of the primary side series resonant circuit and the secondary side series resonant circuit is changed, and the level of the secondary side direct-current output voltage Eo is also changed. That is, the level of the secondary side direct-current output voltage Eo is thereby stabilized.

For example, in response to a decrease in the secondary side direct-current output voltage Eo as the load becomes heavier, control is performed to decrease the switching frequency. This reduces the resonant impedance, and thus increases the secondary side direct-current output voltage Eo. On the other hand, in response to an increase in the secondary side direct-current output voltage Eo as the load becomes lighter, control is performed to increase the switching frequency. This increases the resonant impedance, and thus lowers the secondary side direct-current output voltage Eo.

The power supply circuit according to embodiment 1-1 is provided with the power factor improving circuit 11. As described above, the power factor improving circuit 11 is provided so as to be inserted in a rectified current path in the rectifying and smoothing circuit for obtaining the direct-current input voltage (Ei) from the commercial alternating-current power supply line AC. The power factor improving circuit 11 is of a magnetic coupling type using a power regeneration system.

In the power factor improving circuit 11, the anode of a switching diode (power factor improving switching device) D1 as a fast recovery type diode device is connected to the positive electrode output terminal of the bridge rectifier circuit Di. The cathode of the switching diode D1 is connected to one terminal of a high-frequency inductor (choke coil) L10. The other terminal of the high-frequency inductor L10 is connected to the positive electrode terminal of the smoothing capacitor Ci.

That is, a series connection circuit of the switching diode D1 (anode→cathode) and the high-frequency inductor L10 is inserted between the positive electrode output terminal of the bridge rectifier circuit Di and the positive electrode terminal of the smoothing capacitor Ci.

As shown in the figure, a filter capacitor CN is connected in parallel with the series connection circuit of the switching diode D1 and the high-frequency inductor L10. The filter capacitor CN is provided to suppress normal mode noise.

As described above, the point of connection between the cathode of the switching diode D1 and the high-frequency inductor L10 in the series connection circuit of the switching diode D1 and the high-frequency inductor L10 is connected to an end part of the primary winding N1 via the primary side series resonant capacitor C1 connected in series with the point of connection between the cathode of the switching diode D1 and the high-frequency inductor L10. That is, the primary side series resonant circuit (L1-C1) is connected to the point of connection between the cathode of the switching diode D1 and the high-frequency inductor L10.

With such a configuration, the power factor improving circuit 11 regenerates the switching output (primary side series resonance current) as power, and feeds back the switching output to the smoothing capacitor Ci. The power regeneration in this case is performed via the high-frequency inductor L10, and can thus be considered to be performed by a magnetic coupling system.

Since the primary side series resonance current is thus regenerated as power and fed back to the smoothing capacitor Ci, the power factor improving circuit 11 obtains an alternating voltage of a high frequency corresponding to the switching output of the switching devices Q1 and Q2.

The fast recovery type switching diode D1 performs a switching operation according to the alternating voltage. At this time, the switching diode D1 performs a switching operation not only during a period when the level of the absolute value of the alternating input voltage VAC is higher than the level of the voltage across the smoothing capacitor Ci, but also during a certain period when the level of the absolute value of the alternating input voltage VAC is not higher than the level of the voltage across the smoothing capacitor Ci. A rectified current flows so as to correspond to the periods when the switching diode D1 performs a switching operation, and therefore the conduction angle of the rectified current is increased. As the conduction angle of the rectified current is thus increased, the conduction angle of an alternating input current IAC is also increased. Thereby, an average waveform of the alternating input current IAC approximates the waveform of the alternating input voltage VAC. Hence, the power factor is improved.

A description will next be made of how the switching power supply circuit according to the embodiment 1-1 shown in FIG. 1 stabilizes the secondary side direct-current output voltage Eo.

To make the description step by step, a description will first be made of how the secondary side direct-current output voltage Eo is stabilized by a complex resonant converter without the secondary side series resonant circuit being formed by omitting the secondary side series resonant capacitor C2 from the power supply circuit according to the embodiment 1-1 shown in FIG. 1.

Such a complex resonant converter has a primary side series resonant circuit (and a primary side partial voltage resonant circuit), but does not have a secondary side series resonant circuit. Thus, in stabilizing the secondary side direct-current output voltage Eo by a switching frequency control system by upper side control, the switching frequency is variably controlled in a range of frequencies higher than the oscillation frequency fo1 of the primary side series resonant circuit, and a resulting change in resonant impedance is used.

Figure 6:
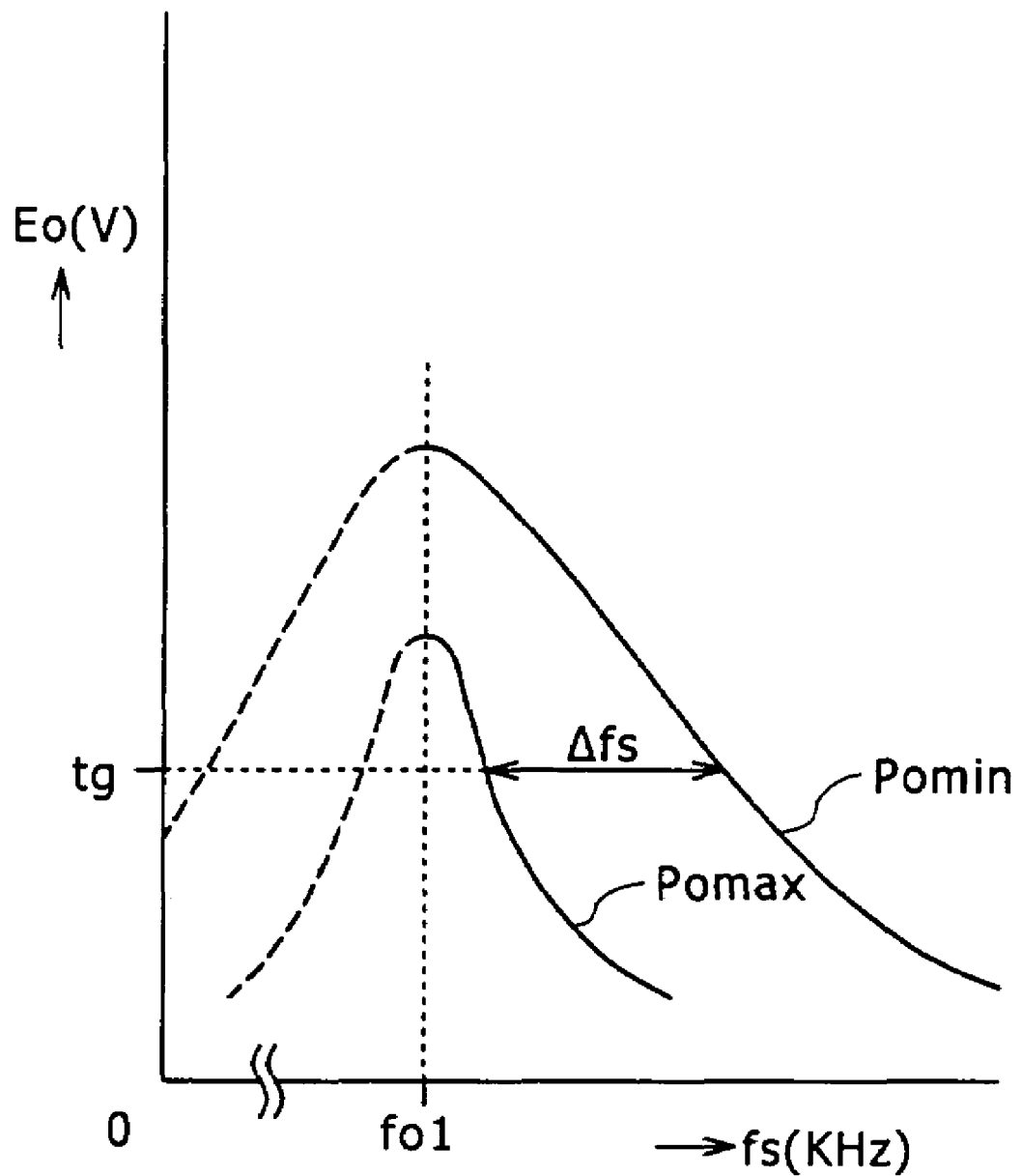
FIG. 6 is a diagram showing constant-voltage control characteristics of a power supply circuit formed by omitting a secondary side series resonant circuit from the power supply circuit shown in FIG. 1.

This will be described with reference to FIG. 6. FIG. 6 shows the characteristics of constant-voltage control on the secondary side direct-current output voltage Eo by the complex resonant converter. In this figure, the abscissa indicates the switching frequency fs, and the ordinate indicates the secondary side direct-current output voltage Eo.

The resonant impedance of the series resonant circuit is lowest at the oscillation frequency fo1. Thus, as a relation between the secondary side direct-current output voltage Eo and the switching frequency fs in upper side control, the level of the secondary side direct-current output voltage Eo is raised as the switching frequency fs approaches the oscillation frequency fo1 of the primary side series resonant circuit, and the level of the secondary side direct-current output voltage Eo is lowered as the switching frequency fs goes away from the oscillation frequency fo1 of the primary side series resonant circuit.

Hence, as shown in FIG. 6, the level of the secondary side direct-current output voltage Eo with respect to the switching frequency fs under a constant load power Po changes in such a manner as to form a quadratic curve in which the level of the secondary side direct-current output voltage Eo peaks when the switching frequency fs is equal to the oscillation frequency fo1 of the primary side series resonant circuit and is lowered as the switching frequency fs goes away from the oscillation frequency fo1.

The level of the secondary side direct-current output voltage Eo corresponding to the same switching frequency fs is lower at the time of maximum load power (Pomax) than at the time of minimum load power (Pomin) by a predetermined amount. The level of the secondary side direct-current output voltage Eo corresponding to the same switching frequency fs is thus shifted between values at the time of maximum load power (Pomax) and at the time of minimum load power (Pomin). That is, supposing that the switching frequency fs is fixed, the level of the secondary side direct-current output voltage Eo is lowered as the load becomes heavier.

With such characteristics, a variable range of the switching frequency (necessary control range), which range is necessary in the power supply circuit when the secondary side direct-current output voltage Eo is to be stabilized by upper side control so as to be Eo=tg, is indicated by Δfs in the figure.

Suppose, for example, that the actual complex resonant converter is ready for an input variation range of the alternating input voltage VAC=85 V to 120 V as the AC 100 V system and the load conditions of the maximum load power (Pomax)=150 W and the minimum load power (Pomin)=0 W (no load) for the secondary side direct-current output voltage Eo, and that a specification is set such that the secondary side direct-current output voltage Eo is stabilized at 135 V by a switching frequency control system.

In this case, the variable range of the switching frequency fs varied for constant-voltage control by the complex resonant converter is fs=80 kHz to 200 kHz or higher, and the necessary control range Δfs is a correspondingly wide range of 120 kHz or more.

With this in mind, consideration will be given to configuring the complex resonant converter as a wide range-ready complex resonant converter.

In order to be wide range-ready, the complex resonant converter should be ready for a range of the alternating input voltage VAC=85 V to 288 V, for example. Therefore, the level variation range of the secondary side direct-current output voltage Eo is extended as compared with a case in which the complex resonant converter is ready for only a single range of the AC 100 V system or the AC 200 V system, for example. Constant-voltage control operation with the level variation of the secondary side direct-current output voltage Eo extended according to such a range of the alternating input voltage requires a wider range for controlling the switching frequency. For example, the range for controlling the switching frequency fs needs to be extended to a range of about 80 kHz to 500 kHz.

It is desirable, however, to set an upper limit of the driving frequency that can be dealt with by the IC (oscillation and drive circuit 2) for driving the switching devices in the present situation to about 200 kHz. Even if a switching driving IC capable of driving at a high frequency as mentioned above is formed and mounted, the power conversion efficiency of the switching device Q1 and the switching device Q2 will be lowered, thus rendering the power supply circuit impractical as an actual power supply circuit. Considering such points, an upper limit of the level of the alternating input voltage VAC where the complex resonant converter can stabilize the secondary side direct-current output voltage Eo efficiently is about 100 V, for example.

Accordingly, it is conventionally known that an active filter may be provided in a preceding stage as shown in FIG. 36 as one configuration for making the switching power supply circuit stabilizing the secondary side direct-current output voltage Eo by a switching frequency control system ready for a wide range. That is, control is effected so that the value of the direct-current input voltage (Ei) occurring on the output side of the active filter is a substantially constant value.

As described above, however, since the active filter circuit performs a hard switching operation, a very high level of noise occurs. Therefore, a relatively serious measure to suppress noise is required for both common mode noise and normal mode noise.

Further, since the switching frequencies of the active filter circuit and the complex resonant converter differ from each other, there is a need to reduce the interference of ground potentials of the active filter circuit and the complex resonant converter with each other and the mutual magnetic interference of magnetisms occurring from the respective components. Therefore, the arrangement of parts on a board is limited. In addition, a grounding pattern needs to be designed in consideration of the path of noise current flowing out from each component. Thus, pattern routing on the board is difficult.

As another configuration for a wide range capability, a rectifier circuit system supplied with commercial alternating-current power and generating direct-current input voltage (Ei) may be provided with a function of switching between a voltage doubler rectifier circuit and a full-wave rectifier circuit according to the commercial alternating-current power supply input of the AC 100 V system or the AC 200 V system. In this case, the circuit is formed such that the level of voltage of the commercial alternating-current power is detected, and the circuit connection in the rectifier circuit system is switched by a switch using an electromagnetic relay so as to form the voltage doubler rectifier circuit in the case of the AC 100 V system and the full-wave rectifier circuit in the case of the AC 200 V system according to the detected level.

However, such a switching configuration in the rectifier circuit system requires an electromagnetic relay. In addition, at least a set of two smoothing capacitors needs to be provided to form the voltage doubler rectifier circuit. Thus, the number of parts is correspondingly increased, resulting in an increase in cost, and the area needed to mount the power supply circuit board is increased, resulting in an increase in size. These smoothing capacitors and the electromagnetic relay in particular have a large size among the parts forming the power supply circuit, thus considerably increasing the size of the board.

Furthermore, in the case of the configuration for switching between full-wave rectifier operation and voltage doubler rectifier operation, when the level of the voltage of the commercial alternating-current power becomes lower than a level corresponding to the AC 200 V system due to, for example, an instantaneous power interruption or a decrease in the alternating input voltage to a value lower than a rated voltage while the commercial alternating-current power of the AC 200 V system is input, an erroneous operation can occur in which it is erroneously detected that the level corresponds to the AC 100 V system, and switching is performed to the voltage doubler rectifier circuit. When such an erroneous operation occurs, a voltage doubler rectifier operation is performed on the alternating input voltage at the level of the AC 200 V system, and therefore, for example, switching devices Q1 and Q2 may be unable to withstand the voltage and may thus break down.

Accordingly, in order to prevent the above-described erroneous operation, an actual circuit detects not only the direct-current input voltage of a main switching converter but also a direct-current input voltage of a converter circuit on a standby power supply side. Thus, the addition of parts for detecting the direct-current input voltage of the converter circuit on the standby power supply side and the like further contribute to the increase in the cost and size of the circuit board as described above.

In addition, detecting the direct-current input voltage of the converter circuit on the standby power supply side for the purpose of preventing erroneous operation means that the wide range-ready power supply circuit having a circuit for switching rectification operation can actually be used in only electronic devices having a standby power supply in addition to a main power supply. That is, electronic devices in which the power supply circuit can be mounted are limited to those types having a standby power supply, and correspondingly the range of applications of the power supply circuit is narrowed.

A further known configuration for a wide range capability switches the form of the primary side current resonant converter between half-bridge coupling and full-bridge coupling according to the commercial alternating-current input voltage of the AC 100 V system/AC 200 V system. With this configuration, even when the alternating input voltage of the AC 200 V system is lowered to the level of the AC 100 V system due to an instantaneous power interruption as described above, for example, and thus an erroneous operation occurs, the switching operation is changed from half-bridge operation to full-bridge operation without the switching devices or the like being unable to withstand the voltage. Hence, the need for detecting the direct-current input voltage on a standby power supply side is eliminated, so that the power supply circuit can be used in electronic devices without a standby power supply. In addition, since the switching of the circuit form is not performed in a commercial power supply line, the switching of the circuit form can be performed by a semiconductor switch. Therefore, the need for a large switch part such as an electromagnetic relay is obviated.

This configuration, however, requires at least four switching devices for forming a full-bridge coupling so as to correspond to the AC 100 V system. That is, as compared with the configuration of a converter with only a half-bridge coupling system, which converter can be formed with two switching devices, two switching devices need to be added.

In addition, with this configuration, the four switching devices perform a switching operation in full-bridge operation. While a resonant converter has low switching noise, an increase in the number of switching devices that thus perform switching is disadvantageous in terms of switching noise.

Thus, none of the above configurations for wide range capability can avoid an increase in the circuit scale and an increase in cost due to an increase in the number of parts as compared with a single range-ready configuration. In addition, the former configuration has the specific problem of limiting its range of applications to devices and the latter configuration has the specific problem of increasing switching noise, for example, which problems are not presented by a single range-ready configuration.

Further, in the complex resonant converter formed by omitting the secondary side series resonant circuit from the power supply circuit of FIG. 1, a correspondingly wide switching frequency control range causes another problem of degradating quick response characteristics in stabilizing the secondary side direct-current output voltage Eo. For example, some electronic devices involve operation that varies the load in such a manner as to change a load condition instantaneously between a maximum load state and substantially no load. Such a load variation is also referred to as a switching load. A power supply circuit included in such a device needs to properly stabilize the secondary side direct-current output voltage in response to a switching load. Incidentally, devices that perform a switching load operation include, for example, a printer as a peripheral device for a personal computer, and a plasma display device.

However, with a wide switching frequency control range as described earlier with reference to FIG. 6, it takes a relatively long time to change to a switching frequency for setting the secondary side direct-current output voltage at a required level in response to a load variation such as a switching load. That is, an unfavorable result is obtained as a constant-voltage control response characteristic.

In contrast to the above-described configurations for wide range capability, the power supply circuit according to the embodiment 1-1 shown in FIG. 1 has a series resonant circuit on each of the primary side and the secondary side (the primary side series resonant circuit and the secondary side series resonant circuit). As a result, the power supply circuit having a current resonant converter as a basis can be ready for a wide range with constant-voltage control by only switching frequency control. This will be described in the following.

Figure 3:
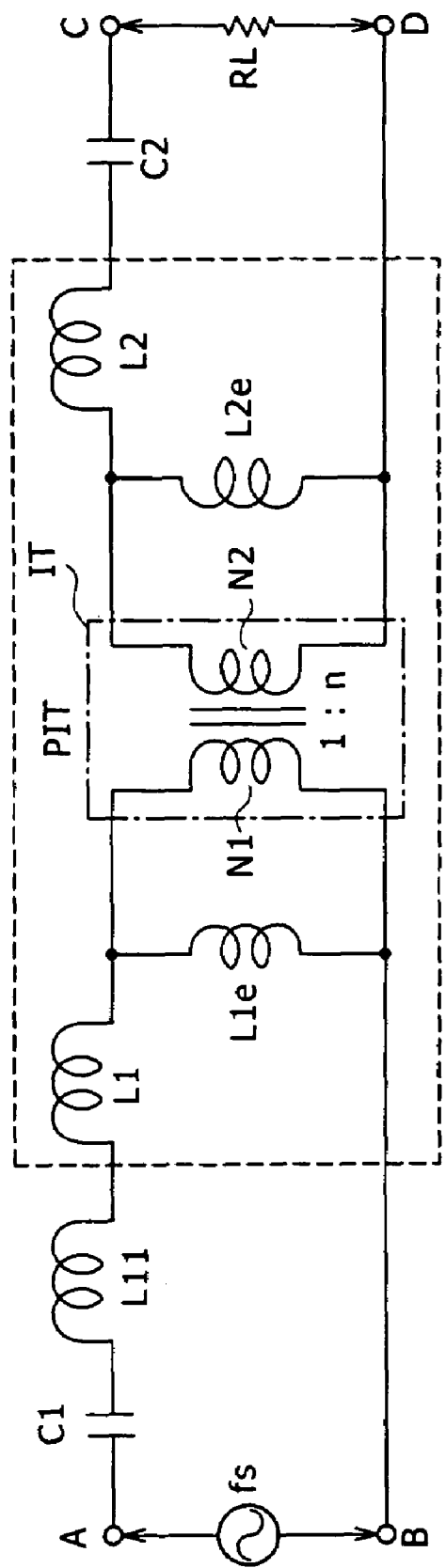
FIG. 3 is an equivalent circuit diagram in which the power supply circuit according to the embodiment is viewed as a magnetic coupling type resonant circuit.

The circuit diagram of FIG. 3 shows an equivalent circuit of the power supply circuit according to the embodiment 1-1 shown in FIG. 1 as viewed from the viewpoint of the relationship between the primary side series resonant circuit and the secondary side series resonant circuit. Incidentally, in this equivalent circuit diagram, the same parts as in FIG. 1 are identified by the same reference numerals.

In FIG. 3, the isolated converter transformer PIT is indicated by a broken line, and an ideal transformer IT is indicated by alternate long and short dashed lines. The ideal transformer IT converts voltage according to a turns ratio of 1:n (1: the number of turns of the secondary winding N2/the number of turns of the primary winding N1). In FIG. 3, reference L1, reference L11, and reference L1e respectively denote the leakage inductance of the primary winding N1, the inductance of a primary winding N11 of a power factor improving transformer VFT, and an exciting inductance of the primary winding N1. Reference L2 and reference L2e respectively denote the leakage inductance of the secondary winding N2 and an exciting inductance of the secondary winding N2.

In the equivalent circuit diagram of FIG. 3, an alternating current (frequency signal) of the switching frequency fs is input on the primary side of the isolated converter transformer PIT. That is, the switching output of the primary side switching converter (switching devices Q1 and Q2) is input on the primary side of the isolated converter transformer PIT.

Then, the alternating current input of the switching frequency fs is supplied to the primary side series resonant circuit on the primary side of the isolated converter transformer PIT. The value of the oscillation frequency fo1 of the primary side series resonant circuit is determined on the basis of the equivalent circuit shown in FIG. 3. The value of the oscillation frequency fo2 of the secondary side series resonant circuit is similarly determined on the basis of the equivalent circuit shown in FIG. 3.

The relationship between the actually set oscillation frequencies fo1 and fo2 in embodiment 1-1 is fo1≈fo2×2.

In the equivalent circuit of FIG. 3, the following Equation 1 holds for the coupling coefficient k of the isolated converter transformer PIT, a self-inductance L1s of the primary winding N1, and the leakage inductance L1 of the primary winding N1 in the equivalent circuit of FIG. 3.

$$L1=(1-k2)L1s \qquad \text{Equation 1}$$

Equation 2 holds for the exciting inductance L1e of the primary winding N1.

$$L1e=k2 \times L1s \qquad \text{Equation 2}$$

Similarly, Equation 3 and Equation 4 hold for the leakage inductance L2 of the secondary winding N2 and the exciting inductance L2e of the secondary winding N2, respectively.

$$L2=(1-k2)L2s \qquad \text{Equation 3}$$

$$L2e=k2 \times L2s \qquad \text{Equation 4}$$

where L2s is a self-inductance L1s of the secondary winding N2.

The equivalent circuit shown in FIG. 3 has a primary side series resonant circuit on the primary side and a secondary side series resonant circuit on the secondary side via electromagnetic induction of the isolated converter transformer PIT. Therefore, the circuit shown in this figure can be considered to form a coupling type resonant circuit by electromagnetic coupling. Thus, the characteristic of constant-voltage control for the secondary side direct-current output voltage Eo in the power supply circuit shown in FIG. 1 differs according to the coupling coefficient k of the isolated converter transformer PIT. This will be described with reference to FIG. 4.

Figure 4:
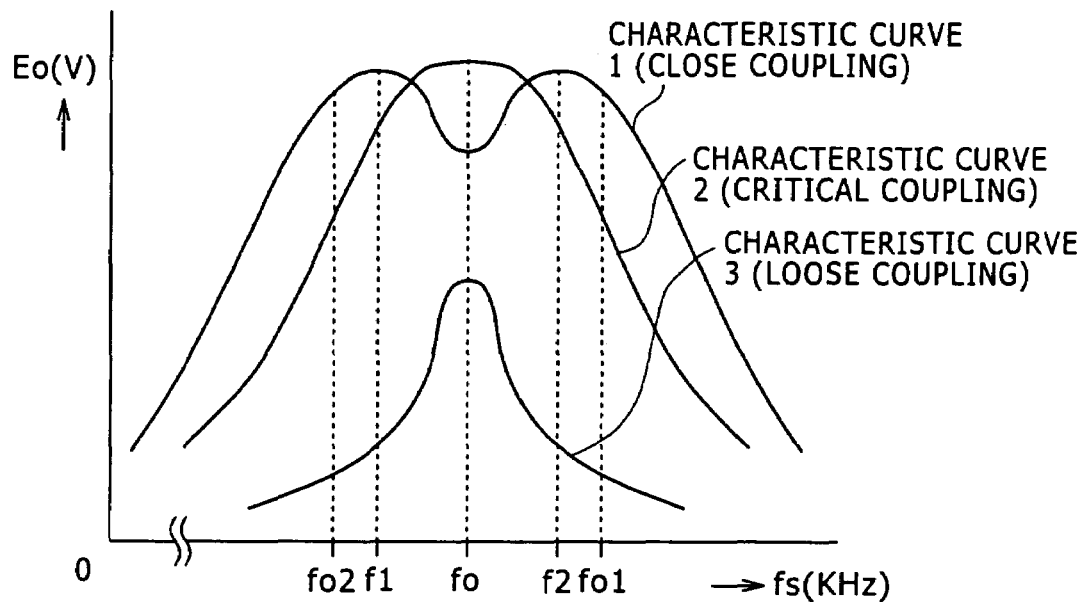
FIG. 4 is a diagram showing constant-voltage control characteristics of the power supply circuit according to the present embodiment.

FIG. 4 shows the output characteristics of the equivalent circuit of FIG. 3 in response to an input (switching frequency signal). That is, FIG. 4 shows the control characteristic of the secondary side direct-current output voltage Eo in relation to the switching frequency fs. In FIG. 4, the abscissa denotes the switching frequency, and the ordinate denotes the level of the secondary side direct-current output voltage Eo.

Incidentally, the description with reference to FIG. 4 is a general description applicable regardless of the frequency relationship between the oscillation frequency fo1 of the primary side series resonant circuit and the oscillation frequency fo2 of the secondary side series resonant circuit. In the figure, the parentheses enclosing the references fo1 and fo2 denote that the characteristics shown in FIG. 4 hold regardless of the frequency relationship between the oscillation frequency fo1 and the oscillation frequency fo2. Incidentally, the parentheses enclosing the references fo1 and fo2 in FIG. 5 denote the same thing.

Suppose that a state of close coupling at a coupling coefficient kt=1 is set. In this state, the value of the coupling coefficient k of the isolated converter transformer PIT is one. Then, Equation 5 is obtained for the leakage inductance L1 of the primary winding N1 and the leakage inductance L2 of the secondary winding N2 in this case by substituting k=1 into Equation 1 and Equation 3, respectively.

$$L1=L2=0 \qquad \text{Equation 5}$$

That is, since the isolated converter transformer PIT is closely coupled, there are no leakage inductances of the primary winding N1 and the secondary winding N2.

Thus, the constant-voltage control characteristic in the state of close coupling between the primary side and the secondary side of the isolated converter transformer PIT is a so-called bimodal characteristic in which the secondary side direct-current output voltage Eo peaks at frequencies f1 and f2 different from the oscillation frequency fo1 of the primary side series resonant circuit and the oscillation frequency fo2 of the secondary side series resonant circuit, as represented by the characteristic curve 1 in FIG. 4. The frequency f1 is expressed by Equation 6 and the frequency f2 is expressed by Equation 7.

$$f1=fo/\sqrt{1+k} \qquad \text{Equation 6}$$

$$f2=fo/\sqrt{1-k} \qquad \text{Equation 7}$$

The term fo in Equation 6 and Equation 7 is an intermediate oscillation frequency between the oscillation frequency fo1 of the primary side series resonant circuit and the oscillation frequency fo2 of the secondary side series resonant circuit. The frequency fo is determined by the primary side impedance and the secondary side impedance and an impedance (mutual coupling inductance M) common to the primary side and the secondary side. The mutual coupling inductance M is expressed by Equation 8.

$$M=k/\sqrt{(L1 \times L2)} \qquad \text{Equation 8}$$

When the above-described coupling coefficient k is gradually decreased from the state of k=1, that is, when the degree of loose coupling is gradually increased from the state of close coupling, the characteristic curve 1 shown in FIG. 4 is changed such that the bimodal tendency is weakened and the characteristic curve is flattened around the intermediate oscillation frequency fo. Then, a state of so-called critical coupling occurs when the coupling coefficient k is decreased to a total coupling coefficient kt. In this state of critical coupling, as represented by the characteristic curve 2, the bimodal characteristic tendency disappears, and the shape of the curve is flattened around the intermediate oscillation frequency fo.

When the value of the coupling coefficient k is further decreased from the state of critical coupling to a state of loose coupling, a unimodal characteristic is obtained in which the secondary side direct-current output voltage Eo peaks only at the intermediate frequency fo, as represented by the characteristic curve 3 in FIG. 4. A comparison of the characteristic curve 3 with the characteristic curves 1 and 2 indicates that while the peak level of the characteristic curve 3 is lower than those of the characteristic curves 1 and 2, the characteristic curve 3 has a steeper slope as a quadratic curve shape than the characteristic curves 1 and 2.

An actual comparison between the unimodal characteristic shown in FIG. 4 and the constant-voltage control characteristic of the complex resonant converter shown in FIG. 6 indicates that the characteristic shown in FIG. 6 has a considerably gentler slope as a quadratic curve as compared with FIG. 4.

As described above, since the characteristic shown in FIG. 6 has a gentle curve, the necessary range for controlling the switching frequency fs to perform constant-voltage control on the secondary side direct-current output voltage Eo is $\Delta fs=120$ kHz or more with fs=80 kHz to 200 kHz or higher even under the condition of a single range, for example. It is therefore very difficult to be ready for a wide range by only constant-voltage control by switching frequency control, as described above.

In addition, when the switching frequency is varied in such a wide range, each of a common mode noise filter for common mode noise and a normal mode noise filter for normal mode noise needs to be a wide-band filter ready for the switching frequency in such a wide range. It is therefore difficult to realize the filters. Further, the switching device Q1 and the switching device Q2 for power need to be operated at higher frequencies, which is not desirable from the viewpoint of switching loss.

Figure 5:
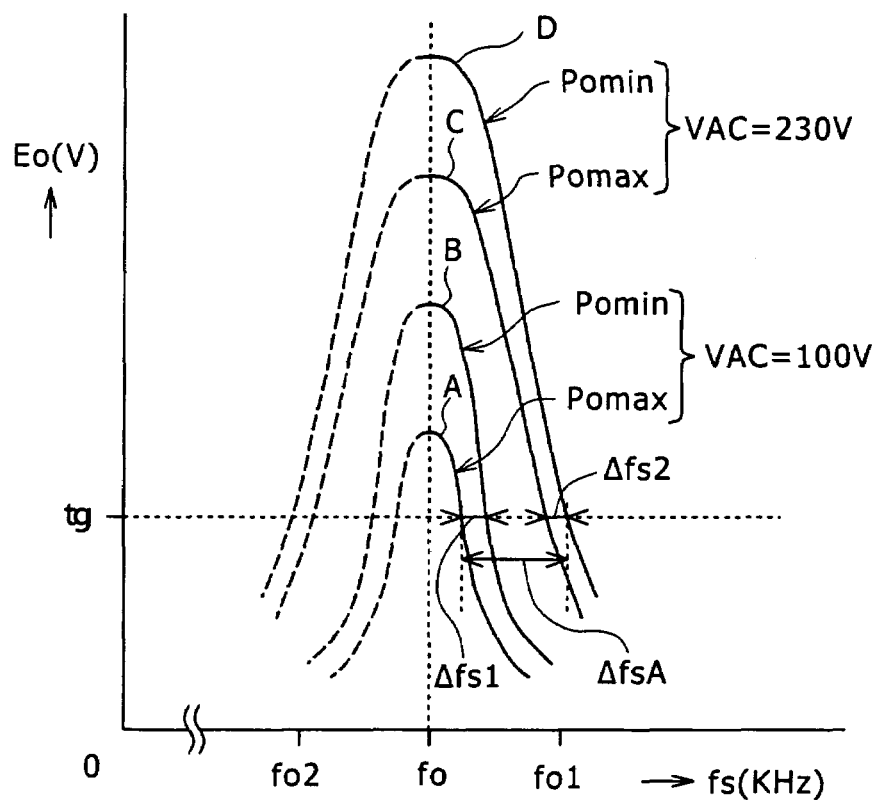
FIG. 5 is a diagram showing switching frequency control ranges (necessary control ranges) corresponding to alternating input voltage conditions and load variations, as constant-voltage control operations of the power supply circuit according to the embodiment.

On the other hand, the constant-voltage control characteristic of embodiment 1-1 is a unimodal characteristic represented by the characteristic curve 3 in FIG. 4, and thus constant-voltage control operations of embodiment 1-1 are as shown in FIG. 5. FIG. 5 shows four characteristic curves of the power supply circuit according to the embodiment 1-1 shown in FIG. 1. That is, characteristic curves A and B at the time of maximum load power (Pomax) and at the time of minimum load power (Pomin), respectively, when the alternating input voltage VAC=100 V (AC 100 V system), and characteristic curves C and D at the time of maximum load power (Pomax) and at the time of minimum load power (Pomin), respectively, when the alternating input voltage VAC=230 V (AC 200 V system).

As is clear from FIG. 5, $\Delta fs1$ denotes the variable control range (necessary control range) of the switching frequency which is necessary to hold the secondary side direct-current output voltage Eo constant at a required rated level tg when the alternating input voltage VAC=100 V corresponding to the input of the AC 100 V system. That is, the variable control range (necessary control range) of the switching frequency is a frequency range from the switching frequency fs at the level tg in the characteristic curve A to the switching frequency fs at the level tg in the characteristic curve B.

In addition, $\Delta fs2$ denotes the variable control range (necessary control range) of the switching frequency which is necessary to hold the secondary side direct-current output voltage Eo constant at the required rated level tg when the alternating input voltage VAC=230 V corresponding to the input of the AC 200 V system. That is, the variable control range (necessary control range) of the switching frequency is a frequency range from the switching frequency fs at the level tg in the characteristic curve C to the switching frequency fs at the level tg in the characteristic curve D.

As described above, the unimodal characteristic as the characteristic of control of the secondary side direct-current output voltage Eo in embodiment 1-1 has a considerably steeper slope as a quadratic curve than the control characteristic shown in FIG. 6. Therefore, the above-described necessary control ranges $\Delta fs1$ and $\Delta fs2$ when the alternating input voltage VAC=100 V and VAC=230 V are considerably reduced as compared with the $\Delta fs$ shown in FIG. 6.

The frequency variable range ($\Delta fsA$) from the lowest switching frequency in $\Delta fs1$ (the switching frequency fs at the level tg in the characteristic curve A) to the highest switching frequency in $\Delta fs2$ (the switching frequency fs at the level tg in the characteristic curve D) is correspondingly narrowed.

The actual frequency variable range $\Delta fsA$ in the power supply circuit according to the embodiment 1-1 shown in FIG. 1 easily falls within the variable range of the switching frequency dealt with by the switching-driving IC (oscillation and drive circuit 2) in the present situation. Further, the switching device Q1 and the switching device Q2 operate with a small loss in the frequency variable range $\Delta fsA$.

That is, the power supply circuit shown in FIG. 1 can actually control the switching frequency variably in the frequency variable range $\Delta fsA$. This means that the power supply circuit shown in FIG. 1 can stabilize the secondary side direct-current output voltage Eo while dealing with the commercial alternating-current power supply input of each of the AC 100 V system and the AC 200 V system. In other words, the power supply circuit shown in FIG. 1 can be wide range-ready by only switching frequency control. In addition, reducing the necessary control range results in an improvement in quick response characteristics in stabilizing the secondary side direct-current output voltage Eo. Therefore, excellent constant-voltage control performance dealing with a load variation referred to as a switching load as described above is obtained.

Incidentally, an electromagnetic coupling type resonant circuit is already known as a technique for expanding the amplification bandwidth of an amplifier circuit formed by a transistor in communication technology, as in an intermediate-frequency transformer amplifier, for example. In such a field, however, a bimodal characteristic in close coupling or a flat characteristic in critical coupling is used, but a unimodal characteristic in loose coupling is not used. It can be said that in the technique of such an electromagnetic coupling type resonant circuit, the unimodal characteristic in loose coupling which is not used in the field of communication technology is aggressively used in embodiment 1-1 in a field of resonant switching converters. As a result, as described above, the variable range (necessary control range) of the switching frequency which is necessary to stabilize the secondary side direct-current output voltage Eo is reduced, and a wide range capability can be achieved by only constant-voltage control by switching frequency control.

Generally, as the degree of loose coupling between the primary side and the secondary side of the isolated converter transformer PIT is increased, the power loss in the isolated converter transformer PIT tends to increase, and the power conversion efficiency is correspondingly decreased. However, embodiment 1-1 provides a practically sufficient power conversion efficiency characteristic as later described. This is because a series resonant circuit (the secondary side series resonant circuit) is also formed on the secondary side.

That is, the secondary side series resonant circuit makes it possible to supply power as the secondary side direct-current output voltage Eo, including an energy increase obtained by resonant operation of the secondary side series resonant circuit, thus compensating for the decrease in efficiency due to loose coupling. Further, the secondary side partial voltage resonant circuit is formed on the secondary side, as described above, to reduce the switching loss at the rectifier diodes on the secondary side. This also contributes greatly to improvement in the power conversion efficiency.

Figure 7:
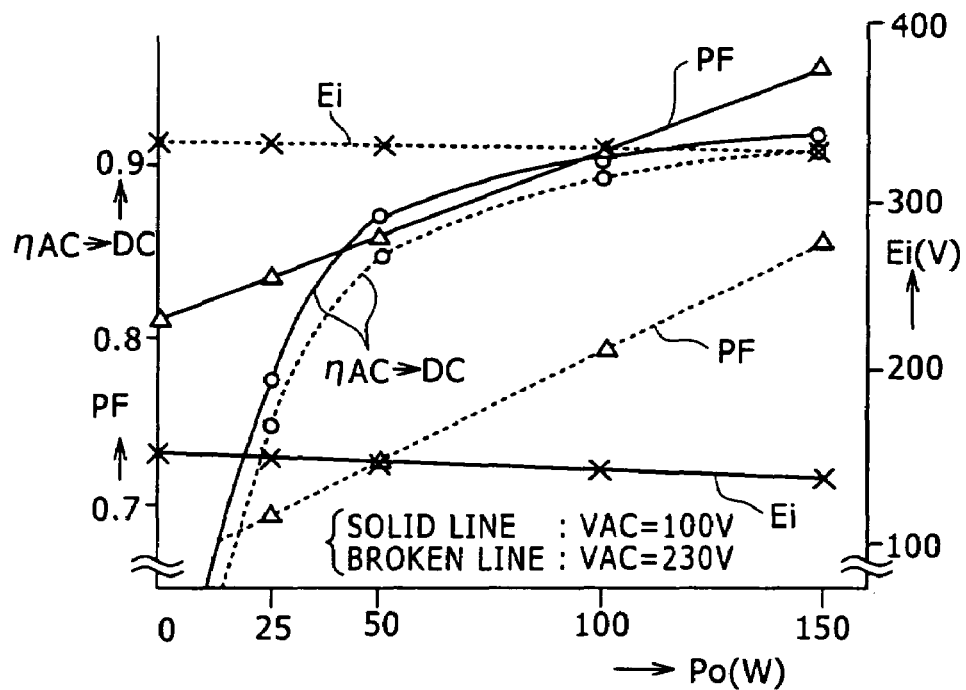
FIG. 7 is a diagram showing the characteristics of a rectified and smoothed voltage, power factor, and AC→DC power conversion efficiency with respect to the load variation in the power supply circuit according to embodiment 1-1.
Figure 8:
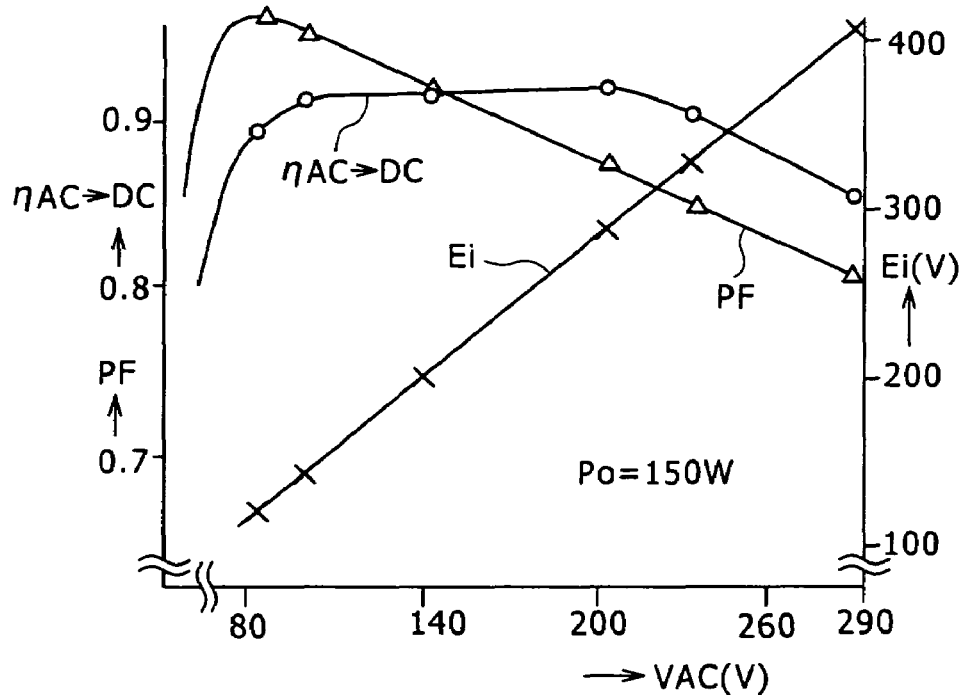
FIG. 8 is a diagram showing the characteristics of the rectified and smoothed voltage, power factor, and AC→DC power conversion efficiency with respect to the variation in an alternating input voltage in the power supply circuit according to embodiment 1-1.

FIG. 7 and FIG. 8 show the characteristics of the power supply circuit according to the embodiment 1-1 shown in FIG. 1.

FIG. 7 shows the characteristics of the rectified and smoothed voltage Ei (direct-current input voltage), power factor PF, and AC→DC power conversion efficiency ($\eta$AC→DC) with respect to load power variation in the power supply circuit shown in FIG. 1. In this figure, the characteristics at the time of the alternating input voltage VAC=100 V of the AC 100 V system are represented by solid lines, and the characteristics at the time of the alternating input voltage VAC=230 V of the AC 200 V system are represented by broken lines.

FIG. 8 shows the characteristics of the rectified and smoothed voltage Ei, power factor PF, and AC→DC power conversion efficiency ($\eta$AC→DC) with respect to the alternating input voltage. The characteristics shown in this figure are experimental results when the alternating input voltage VAC is varied in a range of 80 V to 288 V under a condition of maximum load power Pomax=150 W (maximum load condition).

Incidentally, the characteristics shown in these figures were obtained by conducting an experiment after selecting the principal parts of the power supply circuit shown in FIG. 1 as follows.

An EER-35 type ferrite core was selected for the isolated converter transformer PIT, and the gap length of the gap G was set to 2.8 mm. As for the number of turns (T) of each winding, the primary winding N1=40 T and the secondary winding N2=50 T. A coupling coefficient k=0.63 between the primary winding N1 and the secondary winding N2 in the isolated converter transformer PIT is obtained by this structure.

Incidentally, as is well known, the EER core is a standard core type as a product. It is known that the core type includes an EE type. In the present application, both the EER type and the EE type will be treated as the EE type core because the EER type and the EE type have an E-E-shaped section.

The resonant capacitors for forming the multiple complex resonant converter were selected as follows.

Primary side series resonant capacitor C1=0.039 µF
Secondary side series resonant capacitor C2=0.15 µF
Primary side partial resonant capacitor Cp=330 pF
Secondary side partial resonant capacitor Cp2=330 pF As for the inductance of the high-frequency inductor L10, L10=30 µH was selected, and 1 µF was selected for the filter capacitor CN.

As a condition of commercial alternating-current power supply input, a wide range input of the alternating input voltage VAC=85 V to 290 (288) V was set. As a load condition, a range from the maximum load power Pomax=150 W to the minimum load power Pomax=0 W (no load) was set.

The AC→DC power conversion efficiency in FIG. 7 is increased both when the alternating input voltage VAC=100 V and 230 V as the load power Po is increased. When the alternating input voltage VAC=100 V, the AC→DC power conversion efficiency reaches a maximum of $\eta$AC→DC=about 90.5% at the load power Po=150 W.

When the alternating input voltage VAC=230 V, the AC→DC power conversion efficiency reaches a maximum value of $\eta$AC→DC=about 90.4% at the load power Po=150 W.

It is to be understood from the results that according to the embodiment, a wide range-ready configuration using switching frequency control can be realized as a sufficiently practical configuration.

As shown in FIG. 8, the AC→DC power conversion efficiency in this case increases with an increase in the alternating input voltage VAC from 85 V to about 200 V. That is, in the range of the AC 100 V system, the AC→DC power conversion efficiency becomes higher with an increase in the load power Po and an increase in the alternating input voltage VAC.

The power factor PF is increased for both the alternating input voltage VAC=100 V and 230 V as the load power Po is increased, as shown in FIG. 7. According to the experiment, when the alternating input voltage VAC=100 V, a power factor PF of 0.8 or more is obtained with respect to variations of the load power Po=150 W to 0 W, and a maximum power factor PF=0.94 is obtained at the load power Po=150 W.

When the alternating input voltage VAC=230 V, a power factor PF of 0.75 or more is obtained with respect to variations of the load power Po=150 W to 70 W, and a maximum power factor PF=0.85 is obtained at the load power Po=150 W.

As shown in FIG. 8, while the power factor PF with respect to variations of the alternating input voltage VAC is decreased as the alternating input voltage VAC is increased from 85 V to 288 V, PF=0.8 or more is maintained even at the maximum alternating input voltage VAC=288 V.

As shown in FIG. 7, the rectified and smoothed voltage Ei as the direct-current input voltage of the switching converter is at a level around 140 V when the alternating input voltage VAC=100 V, and is at a level around 340 V when the alternating input voltage VAC=230 V. In both cases of the alternating input voltage VAC=100 V and 230 V, the level of current flowing through the circuit is increased as the load becomes heavier, and thus the level of the rectified and smoothed voltage Ei is lowered.

As shown in FIG. 8, the rectified and smoothed voltage Ei is increased as the alternating input voltage VAC is increased. The rectified and smoothed voltage Ei has such a characteristic because the rectified and smoothed voltage Ei is obtained as the voltage across the smoothing capacitor Ci by rectifying the operation of the full-wave rectifier circuit supplied with the commercial alternating-current power AC (VAC), the full-wave rectifier circuit including the bridge rectifier circuit Di and the smoothing capacitor Ci.

Figure 9:
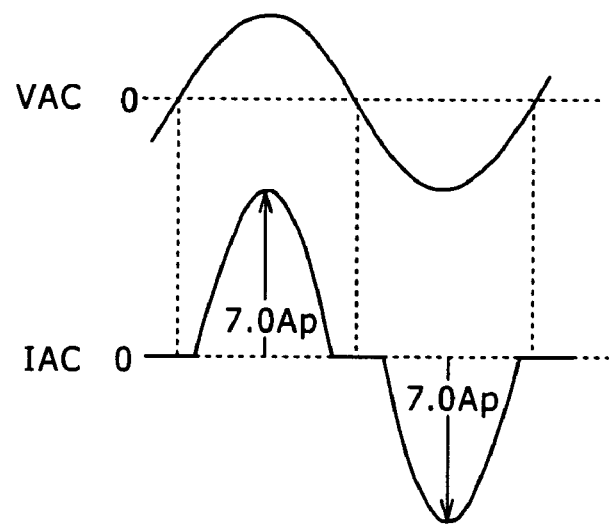
FIG. 9 is a waveform chart representing the power factor improving operation of power supply circuits according to first and second embodiments.
Figure 10:
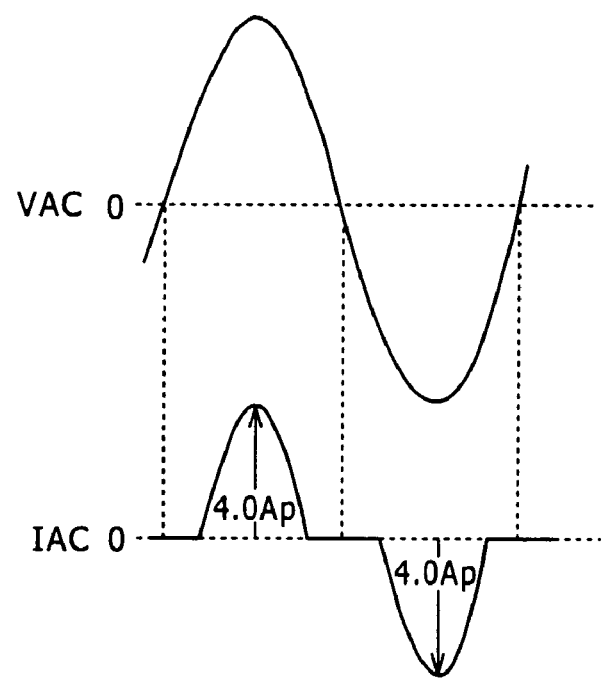
FIG. 10 is a waveform chart representing the power factor improving operation of the power supply circuits according to the first and second embodiments.

The waveform charts of FIG. 9 and FIG. 10 indicate the power factor improving operation by the power factor improving circuit 11 for obtaining the above-described power factor characteristics. FIG. 9 and FIG. 10 show the alternating input current IAC in conjunction with the alternating input voltage VAC. FIG. 9 and FIG. 10 show waveforms when the alternating input voltage VAC=100 V and VAC=230 V, respectively, under the load condition of the maximum load power Pomax=150 W.

As shown in these figures, the waveforms of the alternating input current IAC show that the alternating input current IAC flows in periods when the alternating input voltage VAC is at a predetermined level or higher. In fact, the alternating input current IAC is closer to a sinusoidal wave than when the power factor improving circuit 11 is not provided, and the conduction angle of the alternating input current IAC is increased. That is, FIG. 9 and FIG. 10 show the result of power factor improvement.

Incidentally, the level of the alternating input current IAC in the case of the circuit according to embodiment 1-1 is 7 Ap when the alternating input voltage VAC=100 V and is 4 Ap when the alternating input voltage VAC=230 V.

Though not shown in FIG. 7 or FIG. 8, the necessary control range ΔfsA of the switching frequency fs which corresponds to a change from the alternating input voltage VAC=100 V/maximum load power Pomax to the alternating input voltage VAC=230 V/minimum load power Pomin in the power supply circuit shown in FIG. 1 is about 4 kHz. Thus, the necessary control range ΔfsA is reduced to about ⅓₀ of the conventional 120 kHz.

The following can be said from a comparison of the power supply circuit according to the embodiment described thus far with the power supply circuit having the active filter shown in FIG. 36 as the related art for the same purposes of improving the power factor and being ready for a wide range.

Experimental results described with reference to FIG. 7 and FIG. 8 indicate that the power conversion efficiency of the circuit shown in FIG. 1 for the AC 100 V system is improved over that of the circuit of FIG. 36. The power conversion efficiency of the circuit of FIG. 1 for the AC 200 V system is substantially equal to that of the circuit of FIG. 36. This is because the configuration having the power factor improving circuit of the power regeneration system and the wide range-ready configuration that achieves stabilization by only variable control of the switching frequency obviate the need for the active filter. That is, there is no decrease in total efficiency resulting from multiplication of two values of power conversion efficiency in a preceding stage and a following stage as in the circuit having the active filter, and thus a decrease in the power conversion efficiency of the power supply circuit as a whole is correspondingly reduced.

In addition, since the circuit shown in FIG. 1 does not need the active filter, the number of circuit components is reduced. Specifically, the active filter forms one converter set, and as is understood from FIG. 36, the active filter actually includes many parts, such as one switching device, an IC for driving the switching device, and the like.

On the other hand, it suffices to provide the power supply circuit shown in FIG. 1 with at least the high-frequency inductor L10, the filter capacitor CN, the switching diode D1, and the secondary side series resonant capacitor C2 as additional parts necessary for power factor improvement and wide range capability. Thus, the power supply circuit shown in FIG. 1 requires a very small number of parts as compared with the circuit having the active filter.

Hence, the power supply circuit shown in FIG. 1 requires far lower cost than the circuit shown in FIG. 36 as a power supply circuit that has a power factor improving function and is ready for a wide range. In addition, since the number of parts is greatly reduced, the circuit board can be effectively reduced in size and weight.

Furthermore, in the power supply circuit shown in FIG. 1, the resonant converter and the power factor improving circuit 11 perform a so-called soft switching operation, and thus the level of switching noise is greatly lowered as compared with the active filter shown in FIG. 36.

Thus, a power supply interference standard can be easily met when one stage of the noise filter formed by a set of one common mode choke coil CMC and the two filter capacitors CL and CL is provided as shown in FIG. 1. A measure against normal mode noise of the rectification output line is provided by only one filter capacitor CN, as shown in FIG. 1.

Reducing the number of parts of the noise filter also contributes to a reduction in the cost of the power supply circuit and a decrease in the size and weight of the circuit board.

The switching devices Q1 and Q2 forming the switching converter on the primary side in the power supply circuit shown in FIG. 1 perform switching operations in synchronization with each other at a timing in which the switching devices Q1 and Q2 are turned on and off alternately. Therefore, interference between ground potentials of the active filter side and the switching converter in a stage succeeding the active filter side as in the power supply circuit of FIG. 36 does not occur, so that stabilization can be achieved regardless of a change of the switching frequency. It is thereby possible to suppress abnormal oscillation, which is a problem in the circuit of FIG. 36 having the conventional active filter.

As to the power factor PF in the circuit shown in FIG. 1, as described earlier with reference to FIG. 7 and FIG. 8, a power factor PF=0.8 or more is obtained with respect to variations of the load power Po=150 W to 0 W at AC 100 V, and a power factor PF=0.75 or more is obtained with respect to variations of the load power Po=150 W to 70 W at AC 230 V. With such values of the power factor PF, a power supply harmonic distortion regulation, for example, can be met, and it can be said that practically sufficient power factors are obtained.

It can be said from these comparisons that the circuit according to the embodiment shown in FIG. 1 solves various problems of the circuit of FIG. 36 having the active filter, provides practically sufficient power factors, and provides power conversion efficiency equal to or higher than that of the circuit of FIG. 36.

As described above, a configuration that switches a rectifying and smoothing circuit supplied with a commercial alternating-current power AC and generating direct-current input voltage (Ei) between a voltage doubler rectifier circuit and a full-wave rectifier circuit according to an input of the AC 100 V system or the AC 200 V system is known as a configuration for a wide range capability of the resonant converter. Alternatively, a configuration that switches the switching circuit between full-bridge coupling and half-bridge coupling is known. The problems of these configurations have been described above.

Embodiment 1-1 described above solves these problems. Specifically, when the configurations for circuit switching as described above are unnecessary, for example, only one smoothing capacitor Ci is required and only two switching devices necessary for at least half-bridge coupling are required, thus correspondingly reducing the circuit components, the circuit scale, and the switching noise, for example.

In addition, when the configurations for circuit switching are unnecessary, a special configuration for preventing erroneous operation due to switching is not required, which also prevents an increase in the components and an increase in the cost. Further, since a standby power supply for preventing erroneous operation is not essential, the range of devices to which the power supply circuit is applicable can be extended.

Moreover, since embodiment 1-1 is made ready for a wide range as a result of a reduction of the necessary control ranges ($\Delta fs1$, $\Delta fs2$, and $\Delta fsA$), a response in constant-voltage control is improved in a single range operation, for example. Therefore, excellent constant-voltage control response performance is obtained even in response to a load variation referred to as a switching load as described above, for example. It can thus be said that the power supply circuit according to embodiment 1-1 is suitable for use as a power supply for devices that perform operations involving a switching load, such as, for example, printers and plasma display devices.

The reasons for the reduction of the necessary control ranges ($\Delta fs1$, $\Delta fs2$, and $\Delta fsA$) by setting the coupling coefficient k between the primary side and the secondary side of the isolated converter transformer PIT in embodiment 1-1 to a certain value or lower include the following reason in addition to the electromagnetic coupling type resonant circuit described above with reference to FIGS. 3 to 5.

For example, when the secondary side series resonant capacitor C2 is omitted from the configuration of the power supply circuit according to embodiment 1-1 and about 0.8 or higher is set as the coupling coefficient k by setting the gap of the isolated converter transformer PIT to about 1.5 mm or more, which is equal to the conventional length, it is confirmed by experiment that the switching frequency fs increases steeply from a few ten kHz to about 200 kHz, for example, in response to variations in a range from a certain light load to no load (a range of load power Po=25 W to 0 W, for example). Such a characteristic of the change of the switching frequency is a factor in extending the necessary control ranges ($\Delta fs1$, $\Delta fs2$, and $\Delta fsA$) of the switching frequency.

It is also confirmed by experiment that the steep increase in the switching frequency fs in the range of the light load to no load as described above is suppressed by a state of loose coupling in which the coupling coefficient k between the primary side and the secondary side of the isolated converter transformer PIT is set to a certain value or lower, as in embodiment 1-1. Such a characteristic of the switching frequency fs is also a factor in reducing the necessary control ranges ($\Delta fs1$, $\Delta fs2$, and $\Delta fsA$) in embodiment 1-1.

Generally, however, as the degree of loose coupling between the primary side and the secondary side of the isolated converter transformer PIT is increased, the power loss in the isolated converter transformer PIT tends to increase, and the power conversion efficiency is correspondingly decreased. However, embodiment 1-1 provides a practically sufficient power conversion efficiency characteristic as later described. This is because a series resonant circuit (the secondary side series resonant circuit) is also formed on the secondary side.

That is, the secondary side series resonant circuit makes it possible to supply power as the secondary side direct-current output voltage Eo including an energy increase obtained by the resonant operation of the secondary side series resonant circuit, thus compensating for the decrease in the efficiency due to loose coupling. Further, the secondary side partial voltage resonant circuit is formed on the secondary side, as described above, to reduce the switching loss at the rectifier diodes on the secondary side. This also contributes greatly to preventing a decrease in the power conversion efficiency and improving the power conversion efficiency.

Embodiment 1-1 also provides the following effect by setting the coupling coefficient k (degree of coupling) between the primary side and the secondary side of the isolated converter transformer PIT to a certain value or lower and thereby realizing looser coupling.

Embodiment 1-1 has the power factor improving circuit of the power regeneration system for power factor improvement. It is known that when a power factor improving configuration of the power regeneration system is employed, a ripple having a period of the commercial alternating-current power which is superimposed on the primary side series resonance current is superimposed on the secondary side direct-current output voltage Eo. Hence, generally, when a power factor improving configuration of the power regeneration system is employed, a measure against the ripple is taken by increasing the capacitance of the secondary side smoothing capacitor Co about fivefold as compared with an ordinary case where the power factor improving circuit is not provided. However, the increase in the capacitance of the smoothing capacitor Co greatly increases the cost, which has been an obstacle to practical application.

In embodiment 1-1, since the degree of coupling between the primary side and the secondary side of the isolated converter transformer PIT is lowered, the amount of the alternating voltage component having the period of the commercial alternating-current power which is transmitted from the primary side to the secondary side is reduced. Therefore, the ripple having the period of the commercial alternating-current power which is superimposed on the secondary side direct-current output voltage Eo is suppressed. For example, in embodiment 1-1, the capacitance of the secondary side smoothing capacitor Co is increased only about twofold as compared with the case where the power factor improving circuit is not provided. Thus, practical application of the power factor improving circuit of the power regeneration system is made possible.

Figure 11:
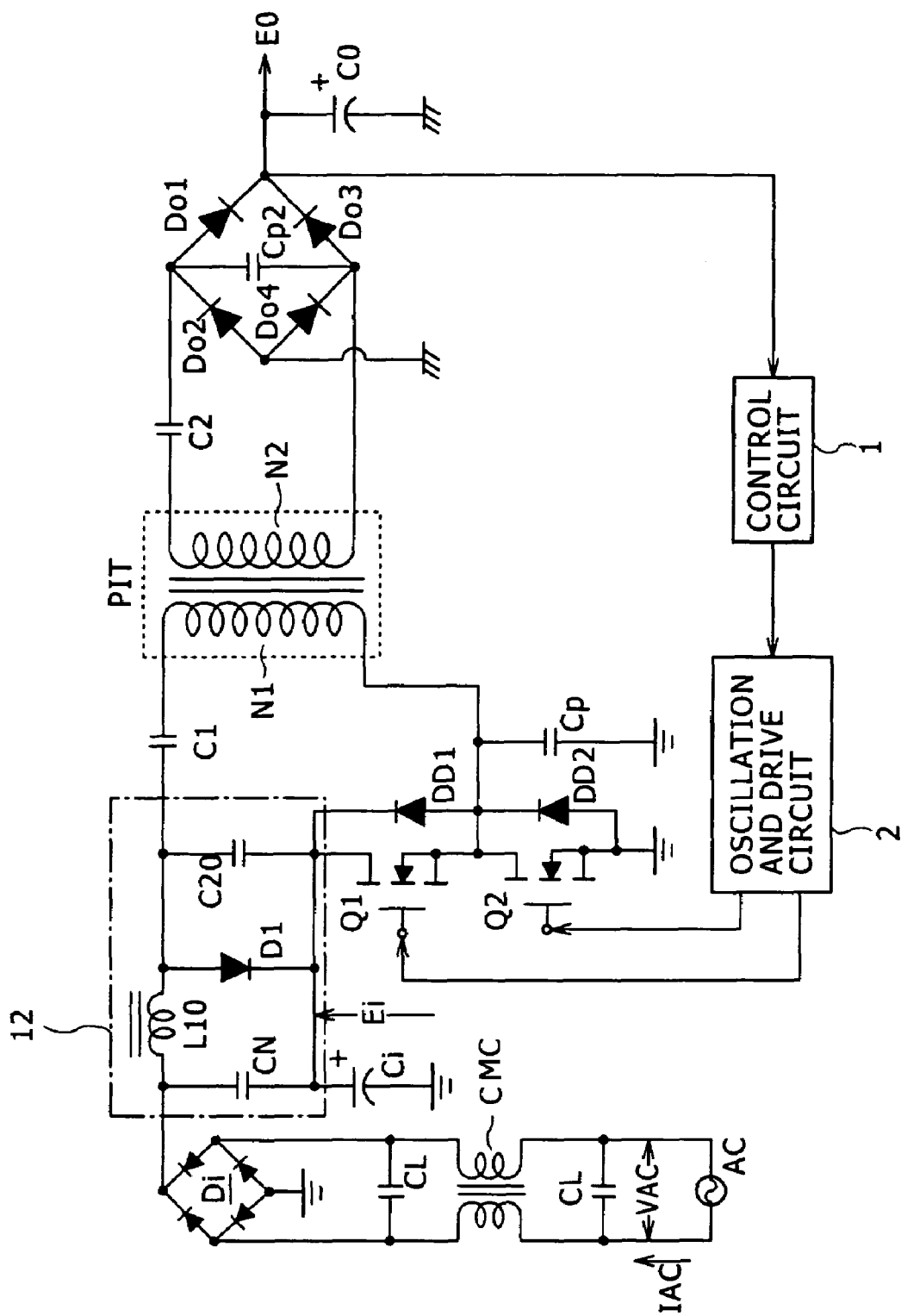
FIG. 11 is a circuit diagram showing an example of the configuration of a power supply circuit according to an embodiment 1-2.

FIG. 11 shows an example of the configuration of a switching power supply circuit according to an embodiment 1-2.

Embodiment 1-2 has an electrostatic coupling type power factor improving circuit 12 in place of the electromagnetic coupling type power factor improving circuit 11 in embodiment 1-1.

Incidentally, in FIG. 11, parts already described with reference to FIG. 1 are identified by the same reference numerals, and a description thereof will be omitted.

The power factor improving circuit 12 in this case is also provided so as to be inserted in a rectified current path in a rectifying and smoothing circuit for generating a direct-current input voltage (Ei) from a commercial alternating input voltage VAC.

In the power factor improving circuit 12, one terminal of a high-frequency inductor L10 is connected to the positive electrode output terminal of a bridge rectifier circuit Di. The other terminal of the high-frequency inductor L10 is connected to the anode of a switching diode D1. The cathode of the switching diode D1 is connected to the positive electrode terminal of a smoothing capacitor Ci. That is, also in this case, a series connection circuit of the high-frequency inductor L10 and the switching diode D1 is inserted between the positive electrode output terminal of the bridge rectifier circuit Di and the positive electrode terminal of the smoothing capacitor Ci.

Also in this case, a filter capacitor CN is connected in parallel with the series connection circuit of the high-frequency inductor L10 and the switching diode D1.

Further, a power factor improving series resonant capacitor C20 is connected in parallel with the switching diode D1. In this case, the power factor improving series resonant capacitor C20 is connected in series with the high-frequency inductor L10. The capacitance of the power factor improving series resonant capacitor C20 and the inductance of the high-frequency inductor L10 thereby form a series resonant circuit within the power factor improving circuit 12 (within the rectified current path of the commercial alternating input voltage).

A primary side series resonant circuit (L1-C1) is connected to a point of connection between the high-frequency inductor L10, the anode of the switching diode D1, and the power factor improving series resonant capacitor C20, as shown in the figure.

With such a circuit configuration of the power factor improving circuit 12, in this case, the switching output (primary side series resonance current) obtained in the primary side series resonant circuit is regenerated as power and fed back to the smoothing capacitor Ci via the parallel connection of the switching diode D1 and the power factor improving series resonant capacitor C20. At this time, the power regeneration can be considered to be performed by electrostatic coupling because the capacitance of the power factor improving series resonant capacitor C20 is interposed between the smoothing capacitor Ci and the primary side series resonant circuit.

The switching diode D1 in the thus formed power factor improving circuit 12 also performs a switching operation during a period when the level of the absolute value of the alternating input voltage VAC is lower than the level of the voltage across the smoothing capacitor Ci. As in the case of FIG. 1, the conduction angle of the alternating input current IAC is increased, and therefore the power factor is improved.

Figure 12:
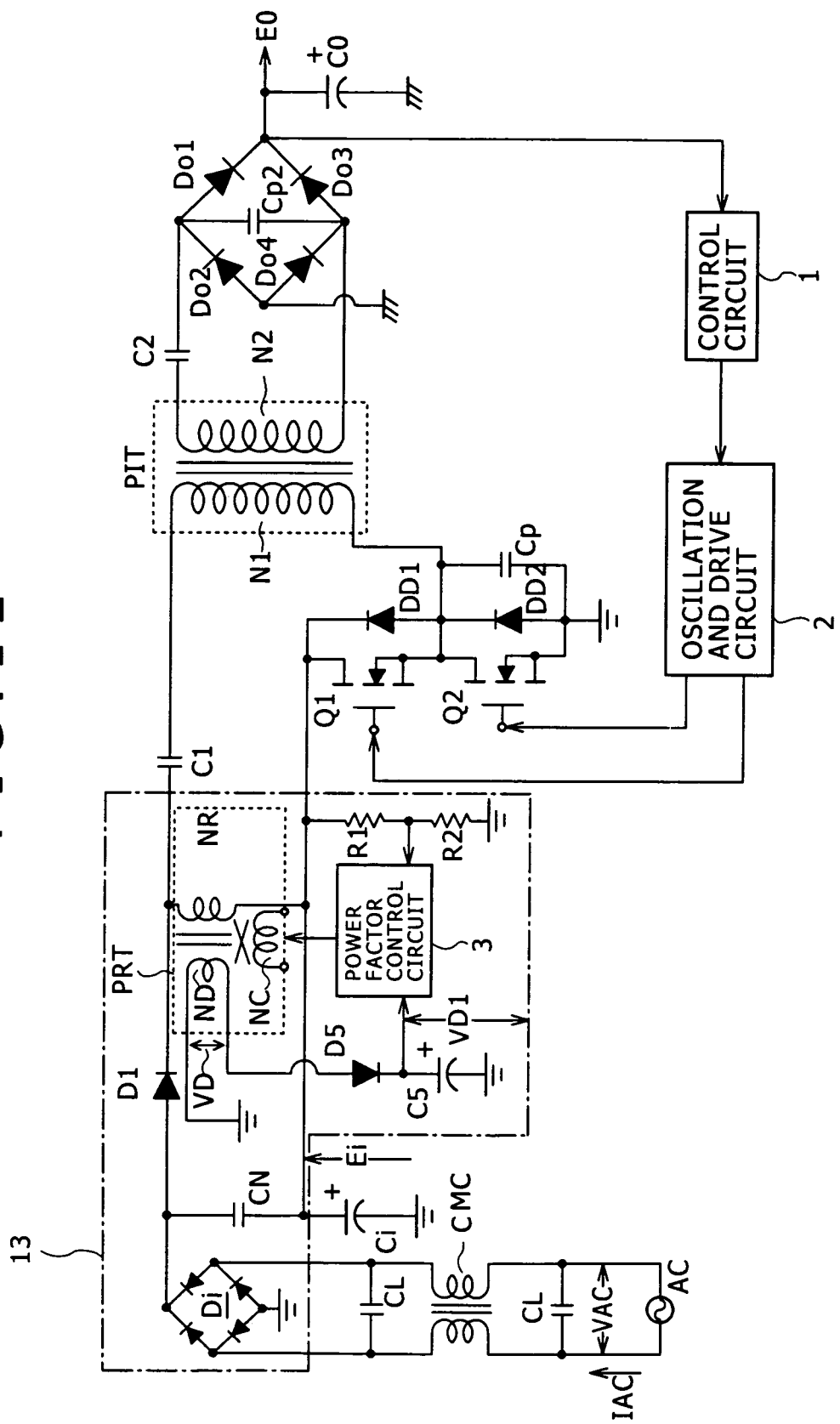
FIG. 12 is a circuit diagram showing an example of the configuration of a power supply circuit according to an embodiment 1-3.

FIG. 12 shows an example of the configuration of a power supply circuit according to an embodiment 1-3. Incidentally, in this figure, the same parts as in FIG. 1 and FIG. 11 are identified by the same reference numerals, and a description thereof will be omitted.

Embodiment 1-3 has a wide range-ready configuration similar to that of embodiment 1-1. A power factor improving circuit 13 provided in this power supply circuit is of a magnetic coupling type using a power regeneration system.

As shown in FIG. 7 and FIG. 8, the value of the improved power factor PF in the power supply circuit shown in FIG. 1 is lowered as the load becomes lighter or as the level of the alternating input voltage is increased. As the load becomes lighter, the amount of current flowing within the power supply circuit is decreased. Accordingly, the conduction angle of the alternating input current IAC is decreased, and therefore the power factor is decreased. Also, as the level of the alternating input voltage is raised, the lower limit of the level of the alternating input voltage VAC necessary for the switching diode D1 to switch (rectify) the rectified current is increased. Thus, the conduction angle of the alternating input current IAC is decreased, and therefore the power factor is decreased.

While the power supply circuit shown in FIG. 1 has practically sufficient power factor characteristics, it is desirable to obtain more stable power factor values with respect to variations in the level of the alternating input voltage and the load, depending on the alternating input voltage condition and the load condition. Accordingly, the power supply circuit according to the embodiment 1-3 shown in FIG. 12 is configured to make the improved power factor constant on the basis of the power factor improving circuit 11 shown in FIG. 1.

In the power factor improving circuit 13 shown in FIG. 12, a controlled winding NR of a control transformer PRT is connected to the positive electrode output terminal of a bridge rectifier circuit Di via a switching diode D1 connected in series with the controlled winding NR of the control transformer PRT. The cathode of the switching diode D1 is connected to the positive electrode terminal of a smoothing capacitor Ci. That is, in this case, a series connection circuit of the switching diode D1 and the controlled winding NR is inserted in a line between the positive electrode output terminal of the bridge rectifier circuit Di and the positive electrode terminal of the smoothing capacitor Ci in a rectified current path for generating a rectified and smoothed voltage Ei. In this case, the controlled winding NR functions as a high-frequency inductor for receiving the feedback of a primary side series resonance current regenerated as power.

A point of connection between the switching diode D1 and the controlled winding NR within the power factor improving circuit 13 is connected with a primary side series resonant capacitor C1, and thus is connected with a terminal part of a primary side series resonant circuit.

In this case, a filter capacitor CN is connected in parallel with the series connection circuit of the switching diode D1 and the controlled winding NR.

The control transformer PRT provided within the power factor improving circuit 13 is formed by winding the controlled winding NR and winding a control winding NC such that the winding direction of the control winding NC is orthogonal to that of the controlled winding NR, for example. The control transformer PRT thereby functions as a saturable reactor. Specifically, the control transformer PRT varies a leakage inductance therein according to the level of a direct current (control current Ic) flowing through the control winding NC.

A power factor control circuit 3 is configured to variably control the level of the control current Ic flowing through the control winding NC according to variations in the load power Po and variations in an alternating input voltage VAC. The power factor control circuit 3 thus performs control to make the power factor constant against variations in the alternating input voltage and variations in the load.

As a control system responding to variations in the alternating input voltage VAC, a series connection circuit formed by voltage dividing resistors R1 and R2 shown in the figure is provided. The series connection circuit of the voltage dividing resistors R1 and R2 is connected in parallel with the smoothing capacitor Ci. The rectified and smoothed voltage Ei divided by the voltage dividing resistors R1 and R2 is input to the power factor control circuit 3. That is, the divided voltage output from the voltage dividing resistors R1 and R2 is input to the power factor control circuit 3 so that the power factor control circuit 3 detects the level of the rectified and smoothed voltage Ei. The level of the rectified and smoothed voltage Ei is in accordance with the level of the alternating input voltage VAC. Thus, the power factor control circuit 3 detects the level of the alternating input voltage VAC (commercial alternating-current power AC) on the basis of the detection output (divided voltage output) from the voltage dividing resistors R1 and R2.

The power factor control circuit 3 controls the level of the current flowing through the control winding NC such that the level of the control current Ic is lowered as the thus detected level of the alternating input voltage VAC is raised. The power factor control circuit 3 operates such that the level of the control current Ic is raised as the level of the alternating input voltage VAC is lowered.

The control transformer PRT as a saturable reactor operates such that the inductance of the controlled winding NR is increased as the level of the control current Ic flowing through the control winding NC is lowered. Thus, the inductance of the controlled winding NR is increased as the power factor control circuit 3 lowers the level of the control current Ic flowing through the control winding NC in response to an increase in the level of the alternating input voltage VAC as described above.

The increase in the inductance of the controlled winding NR functioning as the high-frequency inductor within the power factor improving circuit 13 correspondingly increases the energy stored in the inductor as the controlled winding NR according to a certain amount of power fed back from the primary side series resonant circuit. That is, control is effected so that an amount of power feedback for power factor improvement is increased as the alternating input voltage VAC is raised. Such an increase in the amount of power feedback for power factor improvement increases the effect of the power factor improvement.

Embodiment 1-3 thus controls the power factor with a tendency to raise the value of the improved power factor as the alternating input voltage VAC is raised. Embodiment 1-3 can thereby control the power factor so that the power factor is substantially constant against variations in the alternating input voltage VAC.

As a control system responding to load variations in the power factor improving circuit 13, a detection winding ND wound together with the controlled winding NR in the control transformer PRT, and a rectifying and smoothing circuit (half-wave rectifier circuit) formed by a rectifier diode D5 and a smoothing capacitor C5 are provided.

The detection winding ND is wound in the control transformer PRT in the same winding direction as the above-described controlled winding NR so as to be closely coupled with the controlled winding NR. One end of the detection winding ND is connected to a primary side ground. The other end of the detection winding ND is connected to the anode of the rectifier diode D5. The cathode of the rectifier diode D5 is connected to the positive electrode terminal of the smoothing capacitor C5. The negative electrode terminal of the smoothing capacitor C5 is connected to the primary side ground. Thus, the rectifier diode D5 and the smoothing capacitor C5 form a half-wave rectifier circuit. This half-wave rectifier circuit provides a voltage VD1 obtained by rectifying and smoothing an alternating voltage VD obtained in the detection winding ND into a direct-current voltage as the voltage across the smoothing capacitor C5. This detection voltage VD1 is input to the power factor control circuit 3.

Since, as described above, the controlled winding NR is an inductor inserted between a primary winding N1 and the smoothing capacitor Ci, a current having a level corresponding to the primary side series resonance current flows through the controlled winding NR, and therefore a voltage having a level corresponding to the primary side series resonance current is obtained across the controlled winding NR. The level of the primary side series resonance current varies according to the level of the load current flowing through a load connected to the secondary side direct-current output voltage Eo. That is, the level of the voltage VD induced in the detection winding ND represents the level of the load current.

Since the secondary side direct-current output voltage Eo is stabilized in embodiment 1-3, the level of the load current is obtained as a load power value as it is. That is, it can be said that the detection winding ND detects load power. Incidentally, the voltage across the detection winding ND will hereinafter be referred to as the detection voltage VD. The voltage obtained by converting the detection voltage VD into a direct-current voltage by the half-wave rectifier circuit is input as the direct-current detection voltage VD1 indicating the load power to the power factor control circuit 3.

The power factor control circuit 3 performs control so as to lower the level of the control current Ic as the level of the direct-current detection voltage VD1 is lowered.

The level of the load current is decreased as the load power is lowered. Therefore, the level of the primary side series resonance current indicating a level change corresponding to the load current is decreased as the load power is lowered. Thus, the level of the detection voltage VD is lowered as the load power is decreased.

Thus, lowering the level of the control current Ic flowing through the control winding NC as the level of the direct-current detection voltage VD1 is lowered as described above is equivalent to lowering the level of the control current Ic as the level of the load current is lowered (light load tendency).

When the level of the control current Ic flowing through the control winding NC is lowered, the control transformer PRT as a saturable reactor increases the inductance of the controlled winding NR as described above.

Then, the increase in the inductance of the controlled winding NR correspondingly increases the amount of power feedback from the primary side series resonant circuit. Therefore, control is effected so as to raise the value of the power factor as the load power is lowered.

Thus, control is effected so as to cancel the decrease in the power factor as the load power is lowered. As a result, control can be effected so as to make the power factor constant regardless of variations in the load power.

Incidentally, the power factor control circuit 3 in embodiment 1-3 can in practice be configured as an amplifier circuit formed so as to vary the level of the control current Ic flowing through the control winding NC according to the respective detection outputs from the half-wave rectifier circuit including the rectifier diode D5 and the capacitor C5, and the voltage dividing resistors R1 and R2. Such an amplifier circuit can be formed simply and inexpensively by a few parts such as, for example, a bipolar transistor, a peripheral resistive element, and a capacitor.

Figure 13:
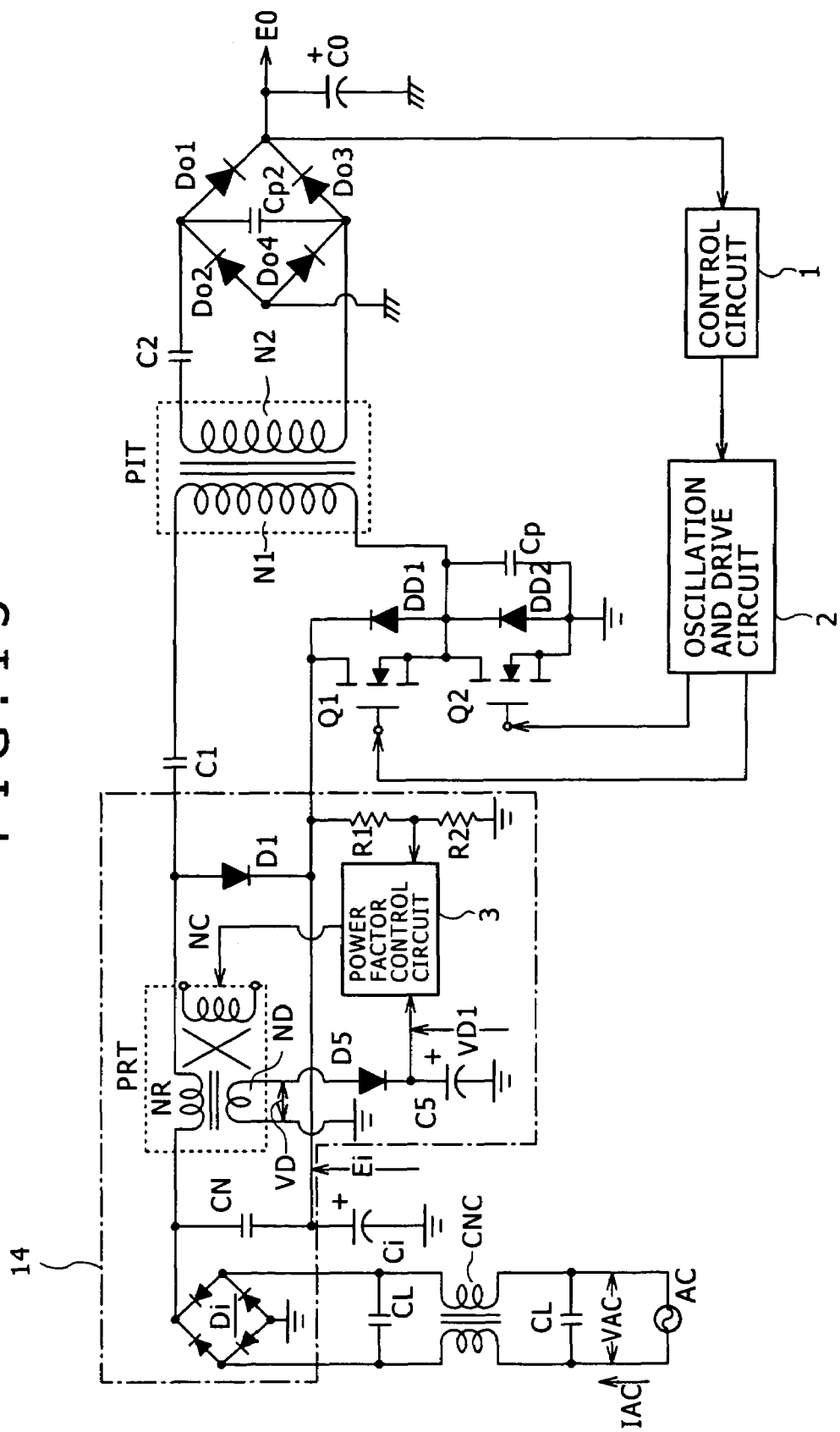
FIG. 13 is a circuit diagram showing an example of the configuration of a power supply circuit according to an embodiment 1-4.

The circuit diagram of FIG. 13 shows the configuration of an embodiment 1-4. Incidentally, in this figure, the same parts as in FIG. 1, FIG. 11, and FIG. 12 are identified by the same reference numerals, and a description thereof will be omitted.

As with the power factor improving circuit 13 shown in FIG. 12, a power factor improving circuit 14 provided in a power supply circuit shown in this figure is configured to perform control so as to make an improved power factor constant despite variations in load and variations in an alternating input voltage. The power factor improving circuit 14 has a control transformer PRT of a similar configuration to that of the power factor improving circuit 13 shown in FIG. 12.

In the case of the power factor improving circuit 14 in the embodiment 1-4, however, a controlled winding NR of the control transformer PRT and a switching diode D1 are in an opposite connected relationship from the power factor improving circuit 13. Specifically, the controlled winding NR is inserted in series between the positive electrode output terminal of a bridge rectifier circuit Di and the anode of the switching diode D1. The cathode of the switching diode D1 is connected to the positive electrode terminal of a smoothing capacitor Ci.

The power factor improving circuit of a power regeneration system having such a connection form is referred to as a diode coupling type because the switching output obtained in a primary side series resonant circuit can be considered to be fed back as power to the smoothing capacitor Ci via the switching diode D1.

As in the power factor improving circuit 13 of the foregoing embodiment 1-3, a power factor control circuit 3 in the thus formed power factor improving circuit 14 operates to control an inductance in the control transformer PRT. Thus, embodiment 1-4 also performs a power factor improving operation to make the power factor constant against variations in the load and variations in the alternating input voltage.

Figure 14:
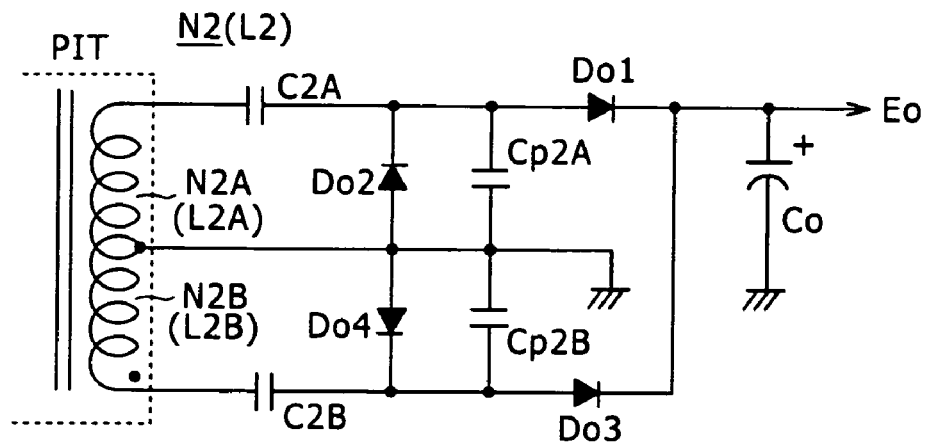
FIG. 14 is a circuit diagram showing an example of the configuration of a power supply circuit according to an embodiment 1-5, 2-4, 3-6, or 4-6.
Figure 15:
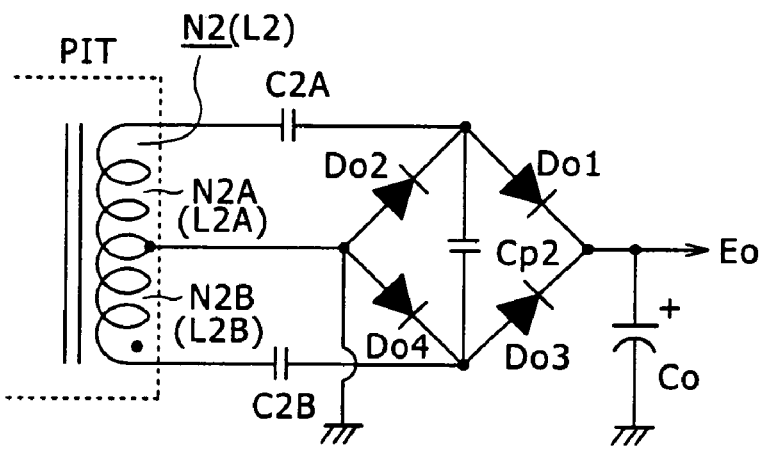
FIG. 15 is a circuit diagram showing an example of the configuration of a power supply circuit according to an embodiment 1-6, 2-5, 3-7, or 4-7.
Figure 16:
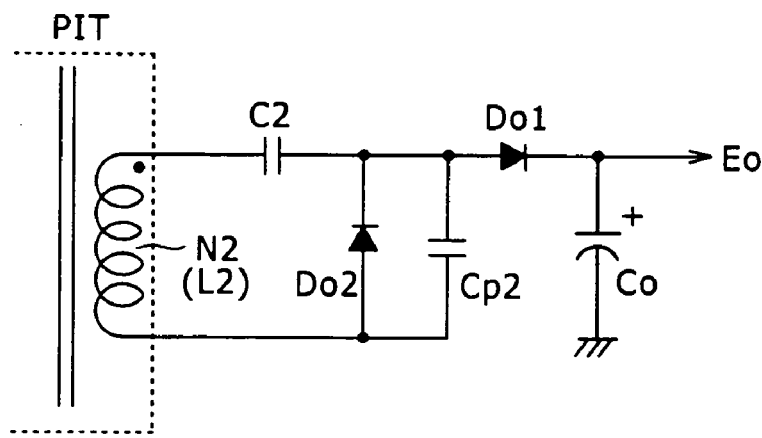
FIG. 16 is a circuit diagram showing an example of the configuration of a power supply circuit according to an embodiment 1-7, 2-6, 3-8, or 4-8.

Modifications of the secondary side of the power supply circuits according to embodiments 1-1 to 1-4 will be described as embodiments 1-5, 1-6, and 1-7 with reference to FIGS. 14 to 16. Incidentally, while only the configuration on the secondary side of an isolated converter transformer PIT is shown in FIGS. 14 to 16, the components on the primary side of any one of the above-described embodiments 1-1 to 1-4, for example, may be combined with the configuration on the secondary side of the isolated converter transformer PIT.

The embodiment 1-5 shown in FIG. 14 will first be described.

A power supply circuit according to embodiment 1-5 employs the configuration of a multiple complex resonant converter. The power supply circuit according to embodiment 1-5 therefore has a secondary side series resonant circuit including a secondary winding N2 and a secondary side resonant capacitor. However, the power supply circuit according to embodiment 1-5 is provided with a voltage doubler full-wave rectifier circuit as a rectifier circuit connected to the secondary winding N2.

The secondary winding N2 in the voltage doubler full-wave rectifier circuit is provided with a center tap to be divided into secondary winding parts N2A and N2B. In this case, the center tap of the secondary winding N2 is connected to a secondary side ground.

An end part on the secondary winding part N2A side as a winding end part of the secondary winding N2 in this case is connected to a point of connection between the anode of a rectifier diode Do1 and the cathode of a rectifier diode Do2 via a secondary side series resonant capacitor C2A connected in series with the secondary winding part N2A.

An end part on the secondary winding part N2B side as a winding start part of the secondary winding N2 is connected to a point of connection between the anode of a rectifier diode Do3 and the cathode of a rectifier diode Do4 via a secondary side series resonant capacitor C2B connected in series with the secondary winding part N2B.

A point of connection between the anodes of the rectifier diodes Do2 and Do4 is connected to the secondary side ground. A point of connection between the cathodes of the rectifier diode Do1 and the rectifier diode Do3 is connected to the positive electrode terminal of a smoothing capacitor Co. The negative electrode terminal of the smoothing capacitor Co is connected to the secondary side ground.

In addition, in this case, two secondary side partial resonant capacitors Cp2A and Cp2B are provided. The secondary side partial resonant capacitor Cp2A is inserted between the secondary side ground and the point of connection between the anode of the rectifier diode Do1 and the cathode of the rectifier diode Do2. The secondary side partial resonant capacitor Cp2B is inserted between the secondary side ground and the point of connection between the anode of the rectifier diode Do3 and the cathode of the rectifier diode Do4. The rectifying operation of the voltage doubler full-wave rectifier circuit formed by the above connection mode is as follows.

This voltage doubler full-wave rectifier circuit can be divided into a first voltage doubler half-wave rectifier circuit formed by the secondary winding part N2A, the secondary side series resonant capacitor C2A, the rectifier diodes Do1 and Do2, and the secondary side partial resonant capacitor Cp2A, and a second voltage doubler half-wave rectifier circuit formed by the secondary winding part N2B, the secondary side series resonant capacitor C2B, the rectifier diodes Do3 and Do4, and the secondary side partial resonant capacitor Cp2B.

In the first voltage doubler half-wave rectifier circuit, a series connection circuit of the secondary winding part N2A and the secondary side series resonant capacitor C2A is formed. The leakage inductance component (L2A) of the secondary winding part N2A and the capacitance of the secondary side series resonant capacitor C2A thereby form a first secondary side series resonant circuit.

Similarly, in the second voltage doubler half-wave rectifier circuit, a series connection circuit of the secondary winding part N2B and the secondary side series resonant capacitor C2B is formed. The leakage inductance component (L2B) of the secondary winding part N2B and the capacitance of the secondary side series resonant capacitor C2B thereby form a second secondary side series resonant circuit.

The secondary side partial resonant capacitor Cp2A inserted as described above is connected in parallel with the series connection of the secondary winding part N2A and the secondary side series resonant capacitor C2A. Therefore, the capacitance of the secondary side partial resonant capacitor Cp2A and the leakage inductance L2A of the secondary winding part N2A form a secondary side partial voltage resonant circuit corresponding to the first voltage doubler half-wave rectifier circuit. Similarly, the secondary side partial resonant capacitor Cp2B is connected in parallel with the series connection of the secondary winding part N2B and the secondary side series resonant capacitor C2B. Therefore, the capacitance of the secondary side partial resonant capacitor Cp2B and the leakage inductance L2B of the secondary winding part N2B form a secondary side partial voltage resonant circuit corresponding to the second voltage doubler half-wave rectifier circuit.

The rectifying operation of the first voltage doubler half-wave rectifier circuit is as follows.

In a period of one half cycle of an alternating voltage induced in the secondary winding N2, a rectification current flows through a path of the secondary winding part N2A, the rectifier diode Do2, and the secondary side series resonant capacitor C2A in that order, whereby the secondary side series resonant capacitor C2A is charged with the rectified current. As a result of the rectifying operation at this time, a voltage having a level corresponding to the alternating voltage induced in the secondary winding part N2A is obtained across the secondary side series resonant capacitor C2A.

In a subsequent period of the other half cycle of the alternating voltage induced in the secondary winding N2, a rectification current flows through a path of the secondary winding part N2A, the secondary side series resonant capacitor C2A, the rectifier diode Do1, and the smoothing capacitor Co in that order. At this time, the smoothing capacitor Co is charged with a voltage induced in the secondary winding part N2A on which is superimposed the voltage across the secondary side series resonant capacitor C2A, which voltage is obtained by the rectifying operation during the previous period of one half cycle of the alternating voltage in the secondary winding N2. Thereby, a voltage having a level twice the alternating voltage of the secondary winding part N2A is generated across the smoothing capacitor Co.

That is, the first voltage doubler half-wave rectifier circuit performs a voltage doubler half-wave rectifier operation in which a voltage having a level corresponding to the alternating voltage of the secondary winding part N2A is generated across the secondary side series resonant capacitor C2A in the period of one half cycle of the alternating voltage of the secondary winding part N2A, and the smoothing capacitor Co is charged with a voltage having a level obtained by superimposing the voltage across the secondary side series resonant capacitor C2A on the voltage of the secondary winding part N2A in the period of the other half cycle of the alternating voltage of the secondary winding part N2A, whereby a voltage having a level corresponding to twice the alternating voltage of the secondary winding part N2A is obtained as the voltage across the smoothing capacitor Co.

In the voltage doubler half-wave rectifier operation, the current flows through the secondary side series resonant capacitor C2A in each of the half cycles with each of a positive and a negative polarity. According to this, the first secondary side series resonant circuit performs a resonant operation.

With the rectifying operation of the first voltage doubler half-wave rectifier circuit, the secondary side partial voltage resonant circuit having the secondary side partial resonant capacitor Cp2A performs a partial voltage resonant operation in timings in which the rectifier diodes Do1 and Do2 are turned off.

The second voltage doubler half-wave rectifier circuit with the secondary winding part N2B, the secondary side series resonant capacitor C2B, and the rectifier diodes Do3 and Do4 performs a voltage doubler half-wave rectifier operation similar to that of the first voltage doubler half-wave rectifier circuit in cycle timings shifted by a half cycle from the rectifying operation of the first voltage doubler half-wave rectifier circuit. By this rectifying operation, the second secondary side series resonant circuit obtains a resonant operation. Further, with the rectifying operation, the secondary side partial voltage resonant circuit having the secondary side partial resonant capacitor Cp2B performs a partial voltage resonant operation in timings in which the rectifier diodes Do3 and Do4 are turned off.

By performing such rectifying operation, the smoothing capacitor Co is charged by the first voltage doubler half-wave rectifier circuit or charged by the second voltage doubler half-wave rectifier circuit repeatedly in each half cycle of the alternating voltage of the secondary winding N2. That is, the rectifier circuit as a whole connected to the secondary winding N2 performs a voltage doubler full-wave rectifier operation in which the smoothing capacitor Co is charged with a charging potential corresponding to twice the alternating voltage induced in the secondary winding part N2A or N2B in each of a positive and a negative half-wave period of the alternating voltage of the secondary winding N2. As a result of the rectifying operation, a secondary side direct-current output voltage Eo as the rectified and smoothed voltage corresponding to twice the alternating voltage induced in the secondary winding part N2A or N2B is obtained across the smoothing capacitor Co.

When the power supply circuit according to the embodiment 1-5 shown in FIG. 14 is combined with a primary side configuration similar to that of the power supply circuit according to the embodiment 1-1 shown in FIG. 1, for example, and an alternating input voltage condition, a load condition, and a level of the secondary side direct-current output voltage Eo equal to those of the power supply circuit (embodiment 1-1) of FIG. 1 are set, the principal part elements and the like can be selected as follows.

An EER-35 type ferrite core is selected for the isolated converter transformer PIT, and a gap length of the gap G is set to 2.8 mm. As for the number of turns (T) of each winding, the primary winding N1=40 T, and the secondary winding N2A=N2B=25 T. That is, since the secondary side rectifier circuit in the case of embodiment 1-5 is a voltage doubler full-wave rectifier circuit, as for the number of turns of each of the secondary winding parts N2A and N2B, each of the secondary winding parts N2A and N2B can be set to 25 T, which is ½ of the number of turns of the secondary winding N2 in FIG. 1 (embodiment 1-1) provided for the bridge full-wave rectifier circuit. A coupling coefficient k=0.63 between the primary winding N1 and the secondary winding N2 in the isolated converter transformer PIT is obtained by this structure.

The resonant capacitors for forming a multiple complex resonant converter are selected as follows.

Primary side series resonant capacitor C1=0.039 µF
Secondary side series resonant capacitor C2=0.15 µF
Primary side partial resonant capacitor Cp=330 pF
Secondary side partial resonant capacitor Cp2=1000 pF As for the inductance of the high-frequency inductor L10, L10=30 µH is selected, and 1 µF is selected for the filter capacitor CN.

An experiment conducted on the power supply circuit configured as described above provides results substantially equal to those of FIG. 7, FIG. 8, FIG. 9, and FIG. 10, which show the results of experiments on the power supply circuit according to embodiment 1-1.

Specifically, as for the AC→DC power conversion efficiency ($\eta$AC→DC), $\eta$AC→DC=90.3% at the time of a maximum load power Pomax=150 W and an alternating input voltage VAC=100 V, and $\eta$AC→DC=90.2% at the time of the maximum load power Pomax=150 W and the alternating input voltage VAC=230 V. It is thus understood that excellent characteristics are obtained as in embodiment 1-1.

The power factor PF is PF=0.94 at the time of the maximum load power Pomax=150 W and the alternating input voltage VAC=100 V, and is 0.8 or more in a range of the maximum load power Pomax=150 W to a minimum load power Pomin=0 W. The power factor PF is PF=0.85 at the time of the maximum load power Pomax=150 W and the alternating input voltage VAC=230 V, and is 0.75 or more in a range of the maximum load power Pomax=150 W to a load power Po=70 W.

Also, ΔfsA corresponding to the range from the alternating input voltage VAC=100 V/the maximum load power Pomax=150 W to the alternating input voltage VAC=230 V/the minimum load power Pomin=0 W in the power supply circuit according to embodiment 1-5 is 4 kHz or less as in the foregoing embodiments 1-1 to 1-4. Thus, a wide range capability is achieved by only switching frequency control.

While in FIG. 14, the two partial voltage resonant circuits are provided so as to correspond to the first and second voltage doubler half-wave rectifier circuits by inserting the two secondary side partial resonant capacitors Cp2A and Cp2B as shown in the figure, the partial voltage resonant circuits of the first and second voltage doubler half-wave rectifier circuits can be formed by one secondary side partial resonant capacitor.

Such a configuration is shown in FIG. 15 as an embodiment 1-6. Incidentally, in this figure, the same parts as in FIG. 14 are identified by the same reference numerals, and a description thereof will be omitted.

In this figure, one secondary side partial resonant capacitor Cp2 is inserted between a point of connection between the anode of a rectifier diode Do1 and the cathode of a rectifier diode Do2 and a point of connection between the anode of a rectifier diode Do3 and the cathode of a rectifier diode Do4. By being inserted in such a form, the secondary side partial resonant capacitor functions as a common capacitor for forming a partial voltage resonant circuit corresponding to each of a first and a second voltage doubler half-wave rectifier circuit.

A description will next be made of a power supply circuit according to an embodiment 1-7 shown in FIG. 16. This figure shows a voltage doubler half-wave rectifier circuit as a rectifier circuit provided for a secondary winding N2.

In the voltage doubler half-wave rectifier circuit in this case, the anode of a rectifier diode Do1 is connected to one end part of the secondary winding N2 via a series connection with a secondary side series resonant capacitor C2. The cathode of the rectifier diode Do1 is connected to the positive electrode terminal of a smoothing capacitor Co. The negative electrode terminal of the smoothing capacitor Co is connected to a secondary side ground.

The other end part of the secondary winding N2 is connected to the secondary side ground, and is also connected to the anode of a rectifier diode Do2. The cathode of the rectifier diode Do2 is connected to a point of connection between the anode of the rectifier diode Do1 and the secondary side series resonant capacitor C2.

A secondary side partial resonant capacitor Cp2 is connected in parallel with a series connection circuit of the secondary winding N2 and the secondary side series resonant capacitor C2 forming a secondary side series resonant circuit. The secondary side partial resonant capacitor Cp2 forms a secondary side partial voltage resonant circuit (parallel resonant circuit) in conjunction with the leakage inductance L2 of the secondary winding N2.

The rectifying operation of the above-described voltage doubler half-wave rectifier circuit is similar to that of the first or second voltage doubler half-wave rectifier circuit described with reference to FIG. 14, for example, and therefore a detailed description thereof will be omitted. The secondary side partial voltage resonant circuit having the secondary side partial resonant capacitor Cp2 performs a partial voltage resonant operation in timings in which the rectifier diodes Do1 and Do2 are each turned off.

When the power supply circuit according to the embodiment 1-7 shown in FIG. 16 is combined with a primary side configuration similar to that of the power supply circuit according to the embodiment 1-1 shown in FIG. 1, for example, and an alternating input voltage condition, a load condition, and a level of a secondary side direct-current output voltage Eo equal to those of the power supply circuit of FIG. 1 are set, the principal part elements and the like can be selected as follows.

An EER-35 type ferrite core is selected for the isolated converter transformer PIT, and a gap length of the gap G is set to 2.8 mm. As for the number of turns (T) of each winding, the primary winding N1=40 T, and the secondary winding N2=25 T. The secondary side rectifier circuit of embodiment 1-7 is a voltage doubler half-wave rectifier circuit, whereas the secondary side rectifier circuit of the embodiment 1-1 shown in FIG. 1 is a bridge full-wave rectifier circuit. Thus, as for the number of turns of the secondary winding part N2 in this case, the secondary winding part N2 can be set to 25 T, which is ½ of the number of turns of the secondary winding N2 in FIG. 1. A coupling coefficient k=0.63 between the primary winding N1 and the secondary winding N2 in the isolated converter transformer PIT is obtained by this structure.

The resonant capacitors for forming a multiple complex resonant converter are selected as follows.

Primary side series resonant capacitor C1=0.039 μF
Secondary side series resonant capacitor C2=0.39 μF.
Primary side partial resonant capacitor Cp=330 pF
Secondary side partial resonant capacitor Cp2=1000 pF As for the inductance of the high-frequency inductor L10, L10=30 μH is selected, and 1 μF is selected for the filter capacitor CN.

An experiment conducted on the power supply circuit configured as described above provides results substantially equal to those of FIG. 7, FIG. 8, FIG. 9, and FIG. 10, which show the results of experiments on the power supply circuit according to embodiment 1-1.

Specifically, as for the AC→DC power conversion efficiency (ηAC→DC), ηAC→DC=90.1% at the time of a maximum load power Pomax=150 W and the alternating input voltage VAC=100 V, and ηAC→DC=90.0% at the time of the maximum load power Pomax=150 W and the alternating input voltage VAC=230 V. It is thus understood that excellent characteristics are obtained.

The power factor PF is PF=0.94 at the time of the maximum load power Pomax=150 W and the alternating input voltage VAC=100 V, and is 0.8 or more in a range of the maximum load power Pomax=150 W to a minimum load power Pomin=0 W. The power factor PF is PF=0.85 at the time of the maximum load power Pomax=150 W and the alternating input voltage VAC=230 V, and is 0.75 or more in a range of the maximum load power Pomax=150 W to a load power Po=70 W.

Also, ΔfsA corresponding to the range from the alternating input voltage VAC=100 V/the maximum load power Pomax=150 W to the alternating input voltage VAC=230 V/the minimum load power Pomin=0 W in the power supply circuit according to embodiment 1-7 is 4 kHz or less as in the foregoing embodiments 1-1 to 1-4.

The power supply circuits according to the embodiments 1-5, 1-6, and 1-7 shown in FIG. 14, FIG. 15, and FIG. 16, respectively, have the circuit configuration of a multiple complex resonant converter similar to that of the foregoing embodiments 1-1 to 1-4, except for the differences in the form and configuration of the rectifier circuit system provided for the secondary winding N2. Therefore, the power supply circuits according to embodiments 1-5, 1-6, and 1-7 have similar effects to those described in each of the foregoing embodiments, as well as a wide range capability and a power factor improving function, for example.

Figure 17:
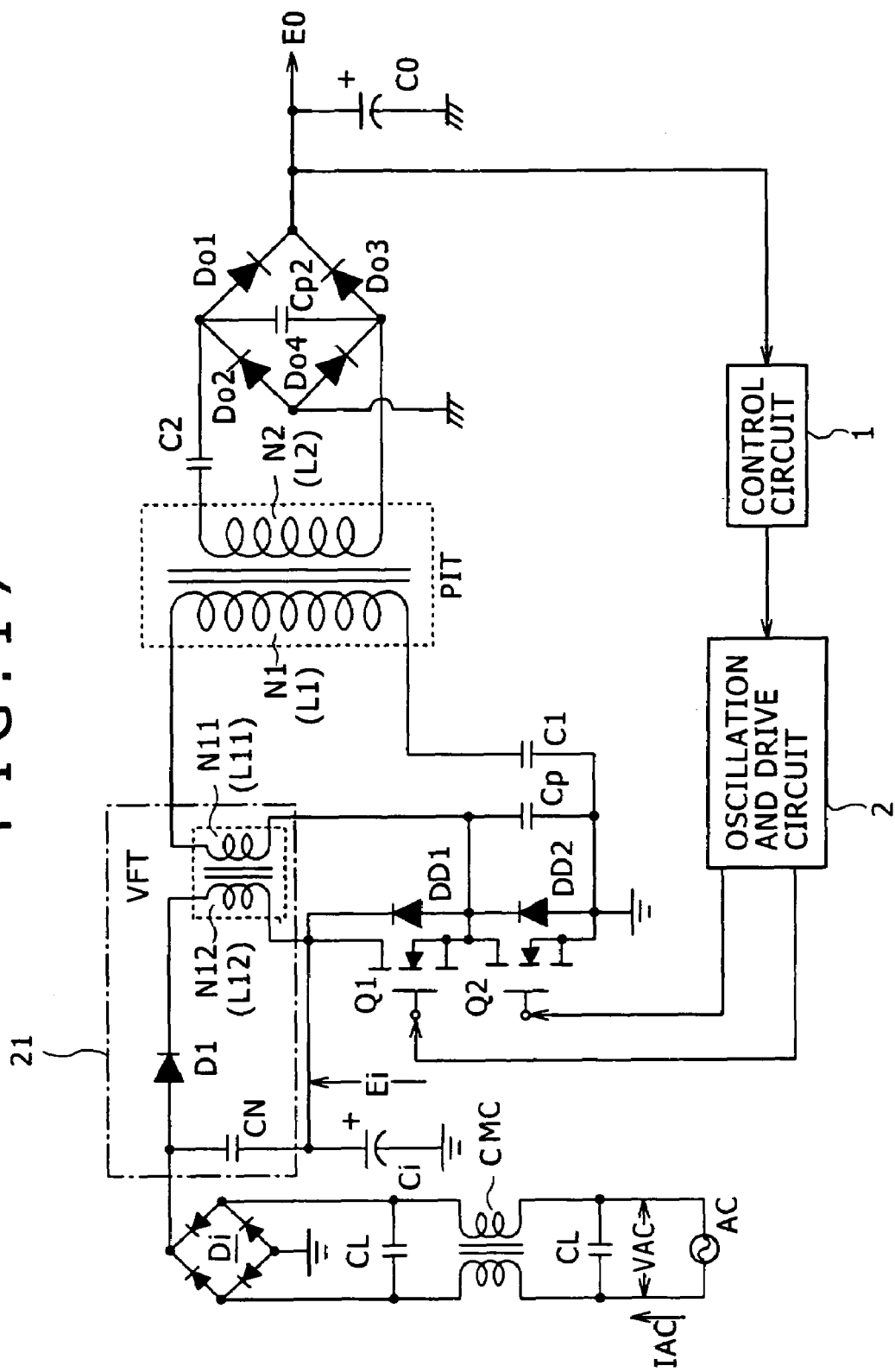
FIG. 17 is a circuit diagram showing an example of the configuration of a power supply circuit according to an embodiment 2-1.

The circuit diagram of FIG. 17 shows an example of the configuration of a power supply circuit according to an embodiment 2-1. Incidentally, in this figure, the same parts as in the figures showing the configurations of the foregoing first embodiments are identified by the same reference numerals, and a description thereof will be omitted. The fundamental configuration of the power supply circuit shown in FIG. 17 is similar to that of FIG. 1, for example.

Specifically, a bridge full-wave rectifier circuit including a bridge rectifier circuit Di and a smoothing capacitor Ci generates a rectified and smoothed voltage Ei (direct-current input voltage). A power factor improving circuit 21 is interposed in a line as a rectified current path between the output of the bridge rectifier circuit Di and the positive electrode terminal of the smoothing capacitor Ci. However, the configuration of the power factor improving circuit 21 is different from that of FIG. 1, as later described.

A switching converter operating with the direct-current input voltage input to the switching converter is a multiple complex resonant converter based on a current resonant converter of a similar circuit configuration to that of FIG. 1. Specifically, a current resonant converter having switching devices Q1 and Q2 coupled to each other by half-bridge coupling is provided. Also, a primary side partial resonant capacitor Cp is connected in parallel with the switching device Q2, whereby a primary side partial voltage resonant circuit is formed. Also, on the secondary side, in a connection mode similar to that of FIG. 1, a secondary side series resonant capacitor C2 is connected to a secondary winding N2 to form a secondary side series resonant circuit, and a bridge full-wave rectifier circuit including rectifier diodes Do1 to Do4 and a smoothing capacitor Co is provided as a rectifier circuit. A secondary side partial resonant capacitor Cp2 is provided to thereby form a secondary side partial voltage resonant circuit.

An isolated converter transformer PIT has a structure similar to that of FIG. 2. The gap length of a gap G and the like are set so as to obtain a state of loose coupling at a certain coupling coefficient k or lower.

In embodiment 2-1, as in the first embodiment, the oscillation frequency fo1 of a primary side series resonant circuit and the oscillation frequency fo2 of the secondary side series resonant circuit should satisfy a relationship represented by fo1>fo2

Further, the oscillation frequency fo2 of the secondary side series resonant circuit is set to about ½ of the oscillation frequency fo1 of the primary side series resonant circuit. In the actual power supply circuit shown in FIG. 17, about 70 kHz is set as the oscillation frequency fo1 of the primary side series resonant circuit, and about 35 kHz is set as the oscillation frequency fo2 of the secondary side series resonant circuit.

Thus, a state of loose coupling at a certain coupling coefficient or lower is set for the isolated converter transformer PIT, and the primary side series resonant circuit and the secondary side series resonant circuit are provided, whereby a wide range-ready power supply circuit ready for input level ranges of both an AC 100 V system and an AC 200 V system is formed.

The power supply circuit according to the first embodiment described above has a power factor improving circuit of a power regeneration system. On the other hand, the second embodiment has a power factor improving circuit of a voltage feedback system. The power factor improving circuit 21 provided in the power supply circuit according to embodiment 2-1 has a power factor improving transformer VFT for the voltage feedback system.

As shown in the figure, the anode of a fast recovery type switching diode (power factor improving switching device) D1 in the power factor improving circuit 21 is connected to the positive electrode output terminal of the bridge rectifier circuit Di. The cathode of the switching diode D1 is connected to the positive electrode terminal of the smoothing capacitor Ci via a series connection with the secondary winding N12 of the power factor improving transformer VFT. That is, in this case, a series connection circuit of the switching diode D1 and the secondary winding N12 is inserted in a line between the positive electrode output terminal of the bridge rectifier circuit Di and the positive electrode terminal of the smoothing capacitor Ci in a rectified current path for generating a rectified and smoothed voltage Ei. In this case, the secondary winding N12 functions as an inductor for receiving an alternating voltage having a switching period, which voltage is obtained by voltage feedback of a switching output.

A filter capacitor CN is provided to suppress normal mode noise by absorbing an alternating component having the switching period, which component is produced by the switching operation of the switching diode D1. In this case, the filter capacitor CN is connected in parallel with the series connection circuit of the switching diode D1 and the secondary winding N12.

The power factor improving transformer VFT has a structure in which a primary winding N11 and the secondary winding N12 are wound around a core in such a manner as to be magnetically coupled to each other. Incidentally, the power factor improving transformer VFT in this case has a so-called divided bobbin having divided winding positions formed therein. The primary winding N11 and the secondary winding N12 are wound in their respective different winding positions in the divided bobbin. As a result, a predetermined coupling coefficient of loose coupling is obtained as the degree of coupling between the primary side and the secondary side.

In the thus formed power factor improving circuit 21, when a switching output (primary side series resonance current) is obtained in the primary side series resonant circuit, a current as the switching output flows through the primary winding N11 of the power factor improving transformer VFT, the primary winding N11 being considered to be included in the primary side series resonant circuit. Then, the power factor improving transformer VFT induces an alternating voltage in the secondary winding N12 according to the alternating current flowing through the primary winding N11.

In this case, the secondary winding N12 of the power factor improving transformer VFT is inserted in the rectified current path of a commercial alternating-current power supply AC in the form of being connected in series with the switching diode D1. Thus, the alternating voltage induced in the secondary winding N12 is superimposed on the rectified and smoothed voltage. That is, the power factor improving transformer VFT feeds back the primary side series resonance current as voltage to the rectified current path via the magnetic coupling of the power factor improving transformer VFT. The system of the power factor improving circuit in which the switching output is thus fed back as voltage for power factor improvement is referred to herein as a voltage feedback system.

The switching diode D1 operates so as to switch (interrupt) a rectified current according to the superimposed component of the above-described alternating voltage. As a result of such an operation, the rectified current also flows during a period when the level of the alternating input voltage VAC is lower than the voltage across the smoothing capacitor Ci. That is, the conduction angle of the rectified current is increased.

With the increase in the conduction angle of the rectified current, the conduction angle of an alternating input current IAC is also increased. Thereby, the average waveform of the alternating input current IAC approximates the waveform of the alternating input voltage VAC. Hence, the power factor is improved.

The power supply circuit according to embodiment 2-1 has the filter capacitor CN, the switching diode D1, the power factor improving transformer VFT, and the secondary side series resonant capacitor C2 as additional parts necessary for power factor improvement and wide range capability. Thus, embodiment 2-1 also achieves power factor improvement and wide range capability by a very small number of parts as compared with the active filter.

When, for example, a wide range input of the alternating input voltage VAC=85 V to 290 (288) V is set as a condition of the commercial alternating-current power supply input and a range from a maximum load power Pomax=150 W to a minimum load power Pomax=0 W (no load) is set as a corresponding load condition in the power supply circuit according to embodiment 2-1 having the above-described circuit configuration, the principal part elements for forming the power supply circuit can be selected as follows.

An EER-35 type ferrite core is selected for the isolated converter transformer PIT, and the gap length of the gap G is set to 2.8 mm. As for the number of turns (T) of each winding, the primary winding N1=45 T, and the secondary winding N2=50 T. A coupling coefficient k=0.63 between the primary winding N1 and the secondary winding N2 in the isolated converter transformer PIT is obtained by this structure.

As for the inductance L11 of the primary winding N11 of the power factor improving transformer VFT, L11=47 μH is selected, and for the inductance L12 of the secondary winding N12 of the power factor improving transformer VFT, L12=30 μH is selected.

The resonant capacitors for forming a multiple complex resonant converter are selected as follows.
Primary side series resonant capacitor C1=0.033 μF
Secondary side series resonant capacitor C2=0.15 μF
Primary side partial resonant capacitor Cp=330 pF
Secondary side partial resonant capacitor Cp2=330 pF
For the filter capacitor CN, 1 μF is selected. An experiment conducted on the power supply circuit configured as described above provides results substantially equal to those in the above descriptions with reference to FIG. 7, FIG. 8, FIG. 9, and FIG. 10.

Specifically, as for the AC→DC power conversion efficiency (ηAC→DC), ηAC→DC=90.3% at the time of the maximum load power Pomax=150 W and the alternating input voltage VAC=100 V, and ηAC→DC=90.5% at the time of the maximum load power Pomax=150 W and the alternating input voltage VAC=230 V. Thus, excellent characteristics are obtained.

The power factor PF is PF=0.94 at the time of the maximum load power Pomax=150 W and the alternating input voltage VAC=100 V, and is 0.8 or more in a range of the maximum load power Pomax=150 W to the minimum load power Pomin=0 W. The power factor PF is PF=0.85 at the time of the maximum load power Pomax=150 W and the alternating input voltage VAC=230 V, and is 0.75 or more in a range of the maximum load power Pomax=150 W to a load power Po=70 W.

Also, ΔfsA corresponding to the range from the alternating input voltage VAC=100 V/the maximum load power Pomax=150 W to the alternating input voltage VAC=230 V/the minimum load power Pomin=0 W is 4 kHz or less. Thus, a wide range capability is achieved by only switching frequency control.

Figure 18:
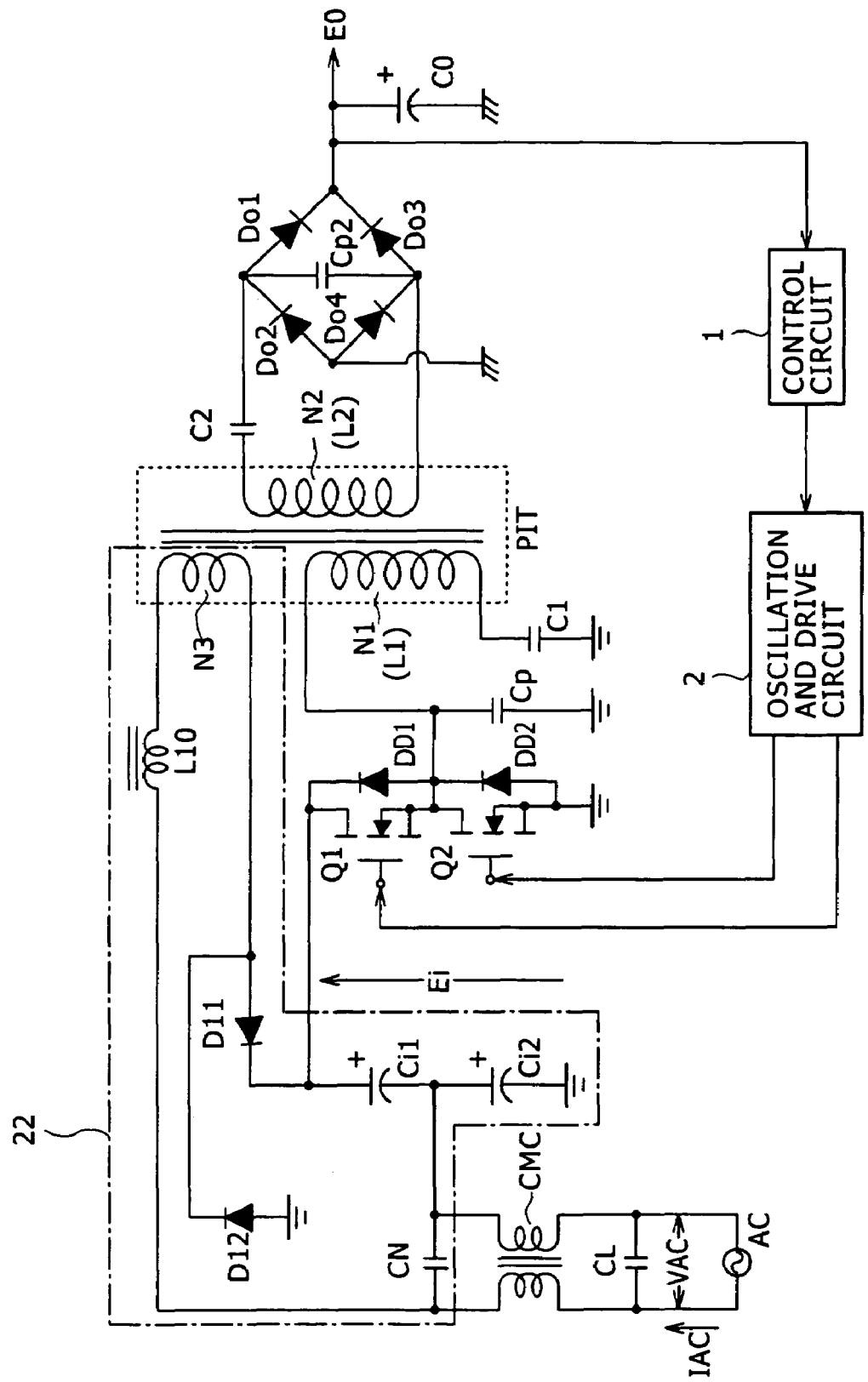
FIG. 18 is a circuit diagram showing an example of the the configuration of a power supply circuit according to an embodiment 2-2.

FIG. 18 is a circuit diagram showing an example of the configuration of a power supply circuit according to an embodiment 2-2. Incidentally, in this figure, the same parts as in the figures showing the circuit configurations of the foregoing embodiments are identified by the same reference numerals, and a description thereof will be omitted.

The power supply circuit according to the embodiment 2-2 shown in this figure has a power factor improving circuit 22 formed by changing the rectifying and smoothing circuit for generating the rectified and smoothed voltage Ei from the commercial alternating-current power AC (VAC) in the power supply circuit according to the embodiment 2-1 shown in FIG. 17, for example, to a voltage doubler rectifier circuit, and by combining a circuit configuration for power factor improvement by a voltage feedback system with the voltage doubler rectifier circuit.

A switching converter operating with a direct-current input voltage input to the switching converter employs a circuit configuration as a multiple complex resonant converter as in each of the foregoing embodiments.

An isolated converter transformer PIT has a structure similar to that of FIG. 2. The gap length of a gap G and the like are set so as to obtain a state of loose coupling at a certain coupling coefficient k similar to that in embodiment 2-1, for example.

In embodiment 2-2, as in the first embodiment, the oscillation frequency fo1 of a primary side series resonant circuit and the oscillation frequency fo2 of a secondary side series resonant circuit should satisfy a relation represented by $$fo1 > fo2$$

Further, the oscillation frequency fo2 of the secondary side series resonant circuit is set to about ½ of the oscillation frequency fo1 of the primary side series resonant circuit. Also, in the power supply circuit shown in FIG. 18, about 70 kHz is set as the oscillation frequency fo1 of the primary side series resonant circuit, and about 35 kHz is set as the oscillation frequency fo2 of the secondary side series resonant circuit.

Thus, a state of loose coupling at a certain coupling coefficient or lower is set for the isolated converter transformer PIT, and the primary side series resonant circuit and the secondary side series resonant circuit are provided, whereby a wide range-ready power supply circuit ready for input level ranges of both an AC 100 V system and an AC 200 V system is formed.

A description will next be made of the power factor improving circuit 22.

As described above, a voltage doubler rectifier circuit is combined in the power factor improving circuit 22. The voltage doubler rectifier circuit included in the power factor improving circuit 22 is formed by rectifier diodes D11 and D12 and two smoothing capacitors Ci1 and Ci2 connected in series with each other. In this case, the rectifier diodes D11 and D12 function as power factor improving switching devices. Therefore, a fast recovery type rectifier diode is selected as the rectifier diodes D11 and D12.

A high-frequency inductor L10 is connected to the positive electrode line of a commercial alternating-current power supply AC in a stage succeeding a common mode noise filter (CMC and CL). Further, a tertiary winding N3 of the isolated converter transformer PIT is connected in series with the high-frequency inductor L10. The tertiary winding N3 is wound by a predetermined number of turns on a secondary side (the same winding position as a secondary winding N2) of the isolated converter transformer PIT.

An end part of the tertiary winding N3 on the side not connected to the high-frequency inductor is connected to a point of connection between the anode of the rectifier diode D11 and the cathode of the rectifier diode D12.

The cathode of the rectifier diode D11 is connected to the positive electrode terminal of the smoothing capacitor Ci1. The anode of the rectifier diode D12 is connected to a primary side ground.

A point of connection between the smoothing capacitors Ci1 and Ci2 connected in series with each other is connected to the negative electrode line of the commercial alternating-current power supply AC in a stage succeeding the common mode noise filter (CMC and CL). The negative electrode terminal of the smoothing capacitor Ci2 is connected to the primary side ground.

A filter capacitor CN is inserted between a point of connection between the positive electrode line of the commercial alternating-current power supply AC and the high-frequency inductor L10 and the point of connection between the smoothing capacitors Ci1 and Ci2.

As for the operation of the voltage doubler rectifier circuit in the thus formed power factor improving circuit 22, in a period of one half cycle (positive polarity) of the commercial alternating-current power AC, a rectification current path of the commercial alternating-current power supply AC→(CMC winding)→the high-frequency inductor L10→the tertiary winding N3→the rectifier diode D11→the smoothing capacitor Ci1→(CMC winding)→the commercial alternating-current power supply AC is formed. Thus, the rectifier diode D11 rectifies the commercial alternating-current power AC, and the smoothing capacitor Ci1 smoothes the rectified output.

In a period of another half cycle (negative polarity) of the commercial alternating-current power AC, a rectification current path of the commercial alternating-current power supply AC→(CMC winding)→the smoothing capacitor Ci2→the rectifier diode D12→the tertiary winding N3→the high-frequency inductor L10→(CMC)→the commercial alternating-current power supply AC is formed. Thus, the rectifier diode D12 rectifies the commercial alternating-current power AC, and the smoothing capacitor Ci2 smoothes the rectified output.

As a result, a rectified and smoothed voltage having a level corresponding to the alternating input voltage VAC is obtained as the voltage across each of the smoothing capacitors Ci1 and Ci2. Hence, a rectified and smoothed voltage Ei having a level corresponding to twice the level of the alternating input voltage VAC is obtained as a voltage across the series connection circuit of the smoothing capacitors Ci1 and Ci2. That is, a voltage doubler rectifier operation is obtained.

According to the above-described rectification current paths, a series connection circuit of the high-frequency inductor L10, the tertiary winding N3, and the rectifier diode D11 is formed in the half cycle period in which the commercial alternating-current power AC is of positive polarity, and a series connection circuit of the rectifier diode D12, the tertiary winding N3, and the high-frequency inductor L10 is formed in the half cycle period in which the commercial alternating-current power AC is of negative polarity. That is, the tertiary winding N3 is inserted in the rectification current path in each positive/negative period of the commercial alternating-current power AC. Accordingly, an alternating voltage induced in the tertiary winding N3 is superimposed on the rectified output voltage in each positive/negative period of the commercial alternating-current power AC. That is, in this case, the switching output of switching devices Q1 and Q2 is fed back as voltage to the rectification current paths via a magnetic coupling between a primary winding N1 and the tertiary winding N3.

Since the rectified output voltage on which the alternating voltage component is superimposed as described above is applied to the rectifier diodes D11 and D12, the rectifier diodes D11 and D12 operate so as to switch (interrupt) a rectified current obtained by the rectifying operation also during a period when the absolute value of the alternating input voltage VAC is lower the voltage across the smoothing capacitors Ci1 and Ci2. Thus, in the power factor improving circuit 22, a charging current also flows during a period when the level of the rectified output voltage is lower than the voltage across the smoothing capacitors Ci1 and Ci2. Hence, the conduction angle of the alternating input current IAC is increased to improve the power factor.

Incidentally, the configuration of the power factor improving circuit of the system in which voltage feedback is performed by the tertiary winding N3 also can be used in cases where, for example, a rectifier circuit system for generating the rectified and smoothed voltage Ei is an ordinary full-wave rectifier circuit having a bridge rectifier circuit and the like. Conversely, it is possible to combine the configuration of the power factor improving circuit having the power factor improving transformer VFT shown in FIG. 17 with the voltage doubler rectifier circuit.

The rectifier circuit system for generating the rectified and smoothed voltage Ei is a voltage doubler rectifier circuit as in the embodiment 2-2 of FIG. 18 in a case of a single range in which the commercial alternating-current power supply AC is of a 100 V system, and a condition of relatively heavy load with a maximum load power of 150 W or higher, for example. Under such a condition, the current flowing through the switching converter is increased, and the power loss is increased. However, when the rectified and smoothed voltage Ei is generated so as to be increased twofold by the voltage doubler rectifier circuit, the amount of current flowing through the switching converter is reduced under the same load condition, and thus the power loss is reduced.

For confirmation, while the power factor improving circuit 21 having the power factor improving transformer VFT shown in FIG. 17 and the power factor improving circuit 22 having the tertiary winding N3 shown in FIG. 18 are power factor improving circuits of the voltage feedback system, the voltage feedback system is originally the configuration of a power factor improving circuit intended to effectively suppress a ripple having a period of the commercial alternating-current power, which ripple is superimposed on a secondary side direct-current output voltage.

In a configuration referred to a power regeneration system, for example, as a feedback type power factor improving circuit, a resonant circuit of a primary side resonant converter is directly connected to a rectification current path of a commercial alternating-current power supply. Thereby, a current obtained in the resonant circuit is fed back as power to the rectification current path to improve the power factor.

With such a circuit configuration, a current having the period of a commercial alternating current tends to be superimposed on the current flowing through the primary winding of an isolated converter transformer as the inductance of the resonant circuit. A rectifying and smoothing circuit on the secondary side operates with the superimposed component transmitted to the secondary side of the isolated converter transformer, thus resulting in an increase in ripple voltage having a period of commercial power on the secondary side direct-current output voltage. When the power factor PF=about 0.8, for example, the ripple voltage increases five- to six-fold.

As one measure against this, setting a control gain for stabilization control high is conceivable. However, when the level of the ripple voltage is increased five- to six-fold as described above, the control gain raised to a limit is not sufficient to effectively suppress the ripple. Accordingly, it is conceivable that the control gain is raised to a certain limit, and further the capacitance of a smoothing capacitor for smoothing the secondary side direct-current output voltage is increased five- to six-fold. However, the selection of such a smoothing capacitor greatly increases the cost, and is thus impractical.

On the other hand, the power factor improving configuration of the voltage feedback system greatly suppresses the above-described ripple voltage.

That is, in the case of the configuration of the power factor improving circuit 21 shown in FIG. 17, the switching output of the primary side switching converter is fed back to the rectified current path via the magnetic coupling of the power factor improving transformer VFT. In this case, since the power factor improving transformer VFT is formed with loose coupling, the ripple component having a period of the commercial alternating-current power is not easily induced in the primary winding N11 from the secondary winding N12. That is, it can be said that the switching output obtained in the primary side switching converter is indirectly fed back to the rectified current path for the commercial alternating-current power via the loose magnetic coupling of the power factor improving transformer VFT. Thus, the voltage component having the period of the commercial alternating-current power, which component is transmitted from the side of a commercial alternating-current power line to the primary winding N1 of the isolated converter transformer PIT, is reduced in amount, whereby the ripple voltage having the period of the commercial alternating-current power, which voltage is superimposed on the secondary side direct-current output voltage, is suppressed.

It can be said that the power factor improving circuit 22 shown in FIG. 18 also performs voltage feedback of the switching output to the rectification current path indirectly via the tertiary winding N3 in which an alternating voltage is induced by the primary winding N1. Thus, a ripple component having a period of the commercial alternating-current power is not easily induced in the primary winding N1 from the tertiary winding N3. Further, in the configuration shown in FIG. 18, the high-frequency inductor L10 is connected in series with the tertiary winding N3. Hence, the combined inductance of the tertiary winding N3 and the high-frequency inductor L10 equivalently means a low degree of coupling of the tertiary winding to the primary winding. Thus, the ripple component having the period of the commercial alternating-current power is even less easily induced in the primary winding. As a result, the ripple voltage having the period of the commercial alternating-current power, which voltage is superimposed on the secondary side direct-current output voltage, is effectively suppressed.

In addition, as described above, the coupling coefficient k of the isolated converter transformer PIT in the power supply circuit according to embodiment 2-2 is lowered to k=0.63 to obtain a state of loose coupling for the purpose of reducing the necessary control range $\Delta fs$ of the switching frequency for stabilizing the secondary side direct-current output voltage Eo. This reduces the amount of an alternating voltage component having the period of the commercial alternating-current power, which component is transmitted from the primary side to the secondary side of the isolated converter transformer PIT. Embodiment 2-2 effectively suppresses the ripple having the period of the commercial alternating-current power, which ripple is superimposed on the secondary side direct-current output voltage Eo, by having the power factor improving circuit of the voltage feedback system and having looser coupling in the isolated converter transformer PIT.

Incidentally, for confirmation, the above-described problem of the power factor improving circuit of the power regeneration system occurs when the switching converter is a conventional one having a certain coupling coefficient k or higher.

While the power supply circuits corresponding to the foregoing first embodiments have the power factor improving circuits 11 to 15 of the power regeneration system, a state of loose coupling at a certain coupling coefficient k or lower is obtained for the isolated converter transformer PIT, thus solving the above-described problem of an increase in the ripple voltage having the period of the commercial alternating-current power on the secondary side direct-current output voltage.

Figure 19:
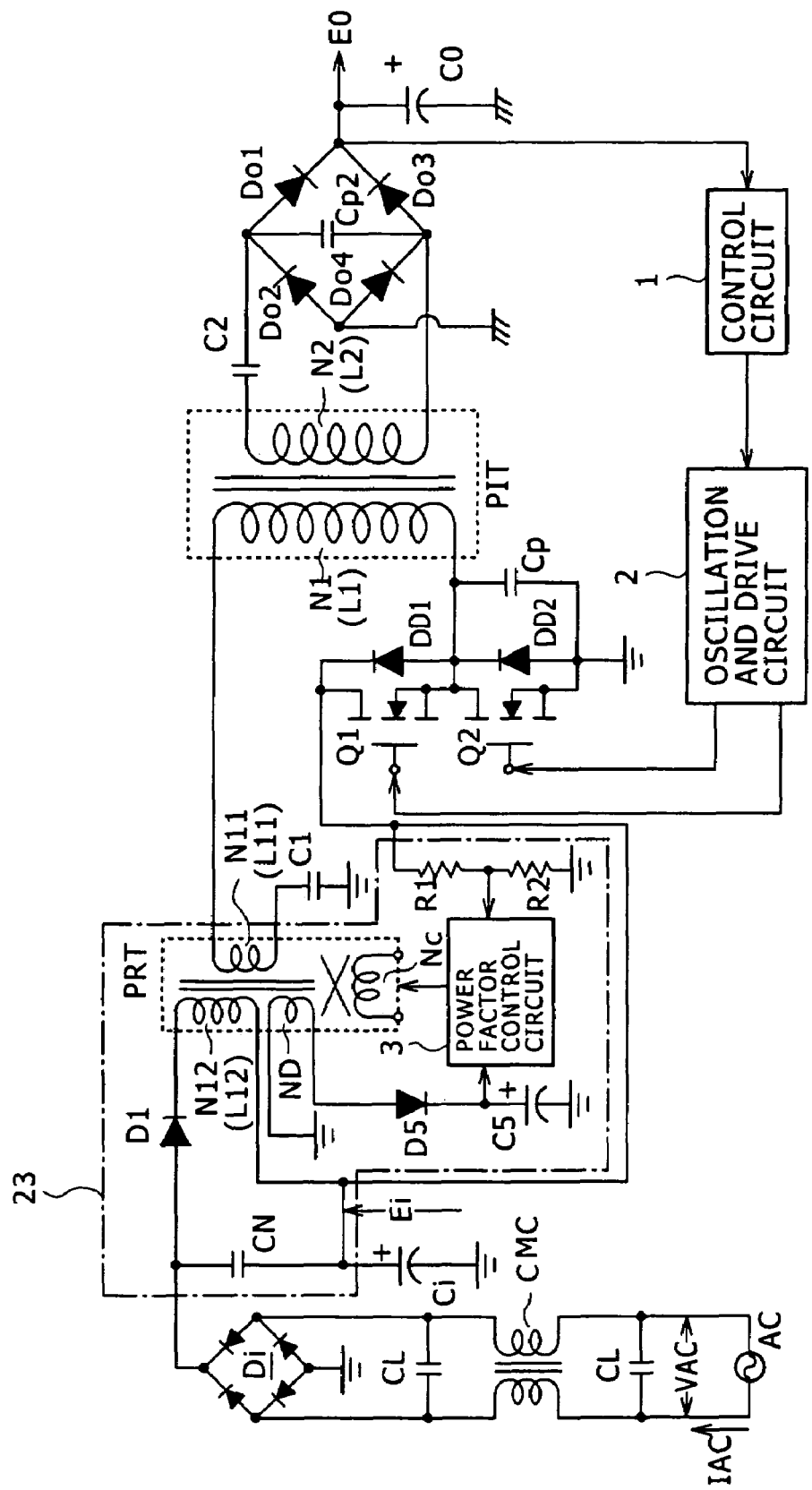
FIG. 19 is a circuit diagram showing an example of the configuration of a power supply circuit according to an embodiment 2-3.

FIG. 19 is a circuit diagram showing an example of the configuration of a power supply circuit according to an embodiment 2-3. Incidentally, in this figure, the same parts as in the figures showing the circuit configurations of the foregoing embodiments are identified by the same reference numerals, and a description thereof will be omitted.

The power supply circuit according to the embodiment 2-3 shown in this figure has a power factor improving circuit 23 configured to make an improved power factor constant despite variations in load and variations in an alternating input voltage as later described on the basis of the configuration of the power supply circuit according to the embodiment 2-1 shown in FIG. 17.

An isolated converter transformer PIT in embodiment 2-3 has a structure similar to that of FIG. 2. The gap length of a gap G and the like are set so as to obtain a state of loose coupling at a certain coupling coefficient k similar to that in embodiment 2-1, for example.

As in the foregoing embodiments, the oscillation frequency $fo1$ of a primary side series resonant circuit and the oscillation frequency $fo2$ of a secondary side series resonant circuit should satisfy a relation represented by $$fo1 > fo2$$

Further, the oscillation frequency $fo2$ of the secondary side series resonant circuit is set to about ½ of the oscillation frequency $fo1$ of the primary side series resonant circuit. Also, in the power supply circuit shown in FIG. 19, about 70 kHz is set as the oscillation frequency $fo1$ of the primary side series resonant circuit, and about 35 kHz is set as the oscillation frequency $fo2$ of the secondary side series resonant circuit.

Thus, a state of loose coupling at a certain coupling coefficient or lower is set for the isolated converter transformer PIT, and the primary side series resonant circuit and the secondary side series resonant circuit are provided, whereby a wide range-ready power supply circuit ready for input level ranges of both an AC 100 V system and an AC 200 V system is also formed in embodiment 2-3.

As shown as characteristics in FIG. 7 and FIG. 8, for example, the power supply circuit according to the embodiment 2-1 shown in FIG. 17 decreases the value of the improved power factor PF as the load becomes lighter or as the level of the alternating input voltage is raised. As the load becomes lighter, the amount of current flowing within the power supply circuit is reduced, and accordingly, the conduction angle of the alternating input current IAC is decreased, thus reducing the power factor. Also, as the level of the alternating input voltage is raised, the lower limit of the level of the alternating input voltage VAC necessary for the switching diode D1 to switch (rectify) the rectified current is increased. Thus, the conduction angle of the alternating input current IAC is decreased, and therefore the power factor is decreased.

While the power supply circuit according to the foregoing embodiment 2-1 or the like has practically sufficient power factor characteristics, it is desirable to obtain more stable power factor values with respect to variations in the level of the alternating input voltage and the load, depending on the alternating input voltage condition and the load condition.

Accordingly, the power supply circuit according to the embodiment 2-3 shown in FIG. 19 is configured to make the improved power factor constant on the basis of the configuration of the power factor improving circuit 21 shown in FIG. 17.

The power factor improving circuit 23 of the power supply circuit shown in FIG. 19 has a control transformer PRT in place of the power factor improving transformer VFT in the power factor improving circuit 21 shown in FIG. 17. The control transformer PRT in this case is obtained by forming the power factor improving transformer VFT shown in FIG. 17 as a saturable reactor.

Figure 31:
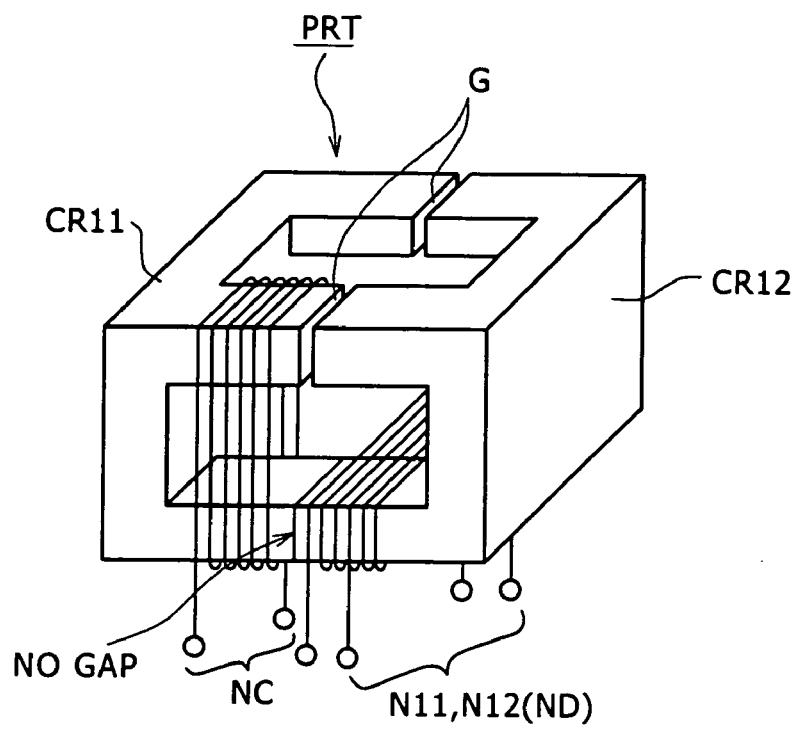
FIG. 31 is a perspective view of an example of the structure of a control transformer provided in a power supply circuit according to an embodiment.
Figure 32:
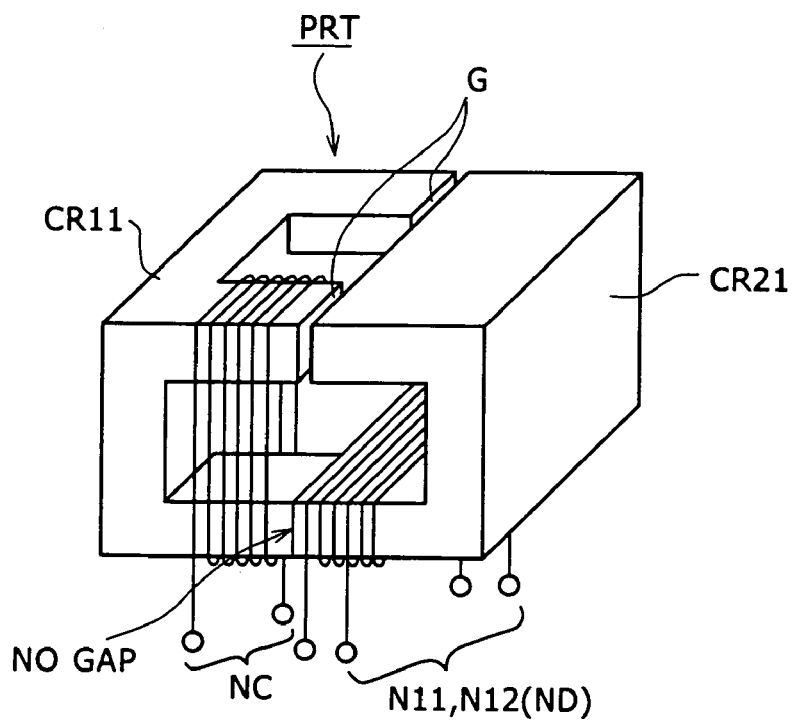
FIG. 32 is a perspective view of an example of the structure of a control transformer provided in a power supply circuit according to an embodiment.
Figure 33:
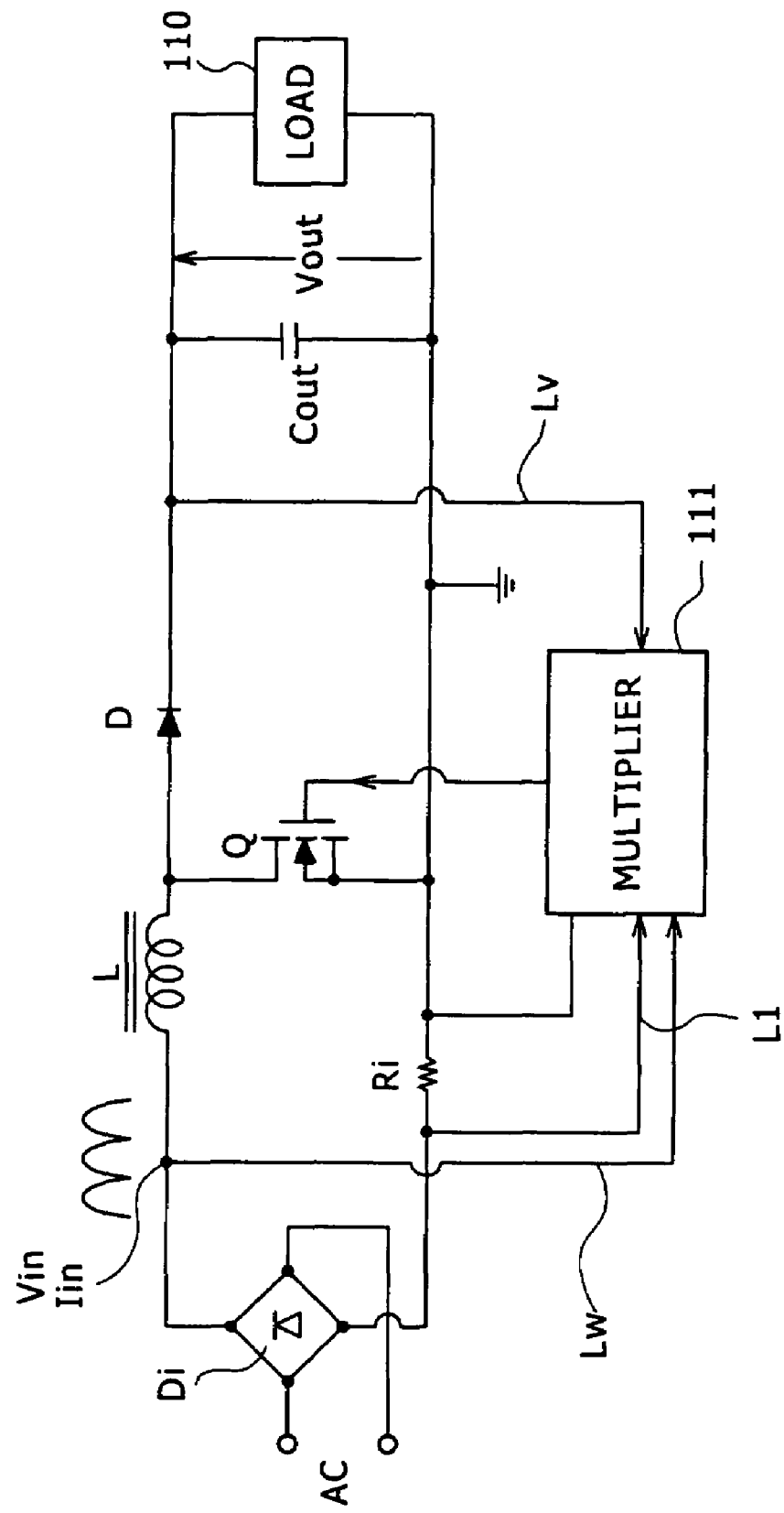
FIG. 33 is a circuit diagram showing a fundamental circuit configuration of an active filter.
Figure 35:
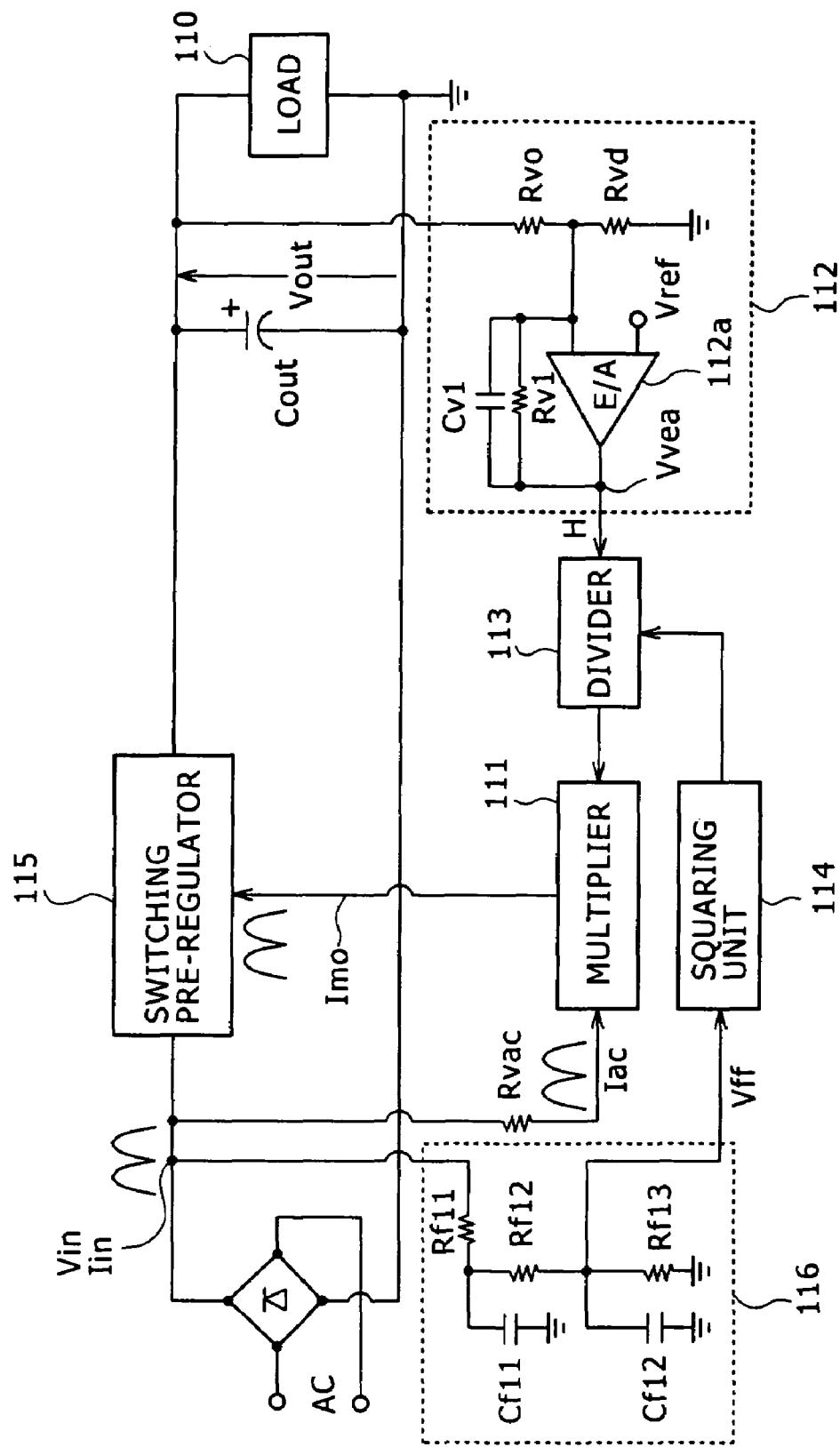
FIG. 35 is a circuit diagram showing the configuration of a control circuit system of an active filter.

Examples of the structure of the control transformer PRT are shown in FIG. 31 and FIG. 32. The control transformer PRT shown in FIG. 31 has two double-U-shaped cores CR11 and CR12 each having four magnetic legs. A cubic core is formed by joining the ends of the magnetic legs of the double-U-shaped core CR11 with the ends of the magnetic legs of the double-U-shaped core CR12.

When the cubic core is thus formed, the double-U-shaped cores CR11 and CR12 have four junction parts corresponding to the four magnetic legs mentioned above. In this case, gaps G and G are respectively formed in two adjacent junction parts of the four junction parts, and no gap is formed in the two other junction parts.

In the thus formed cubic core, a control winding NC is wound by a predetermined number of turns so as to be extended across the magnetic leg at which the gap G is formed and the adjacent magnetic leg at which no gap is formed on a side of the double-U-shaped core CR11.

On another side of the double-U-shaped core CR12, a primary winding N11 and a secondary winding N12 are wound by a predetermined number of turns so as to be extended across two adjacent magnetic legs in a winding direction orthogonal to the winding direction of the control winding NC. Further, in embodiment 2-3, a detection winding ND is wound in the same winding direction as the primary winding N11 and the secondary winding N12 so as to be closely coupled to a side of the primary winding N11 and the secondary winding N12.

With such a structure, the control transformer PRT in this case is formed as a saturable reactor that becomes saturated as a control current Ic flowing through the control winding NC is increased. Also in such a structure, a desired state of loose coupling is obtained between the primary winding N11 and the secondary winding N12.

As shown in FIG. 32, a cubic core in another structure of the control transformer PRT can be formed by combining a double-U-shaped core CR11 having four magnetic legs as one core with a single-U-shaped core CR21 having a U-shape in an arbitrary section as another core in place of the double-U-shaped core CR12.

Also in this case, two gaps G and G are formed in the same positional relationship as in the control transformer PRT of FIG. 31. As in FIG. 31, a control winding NC is wound around two magnetic legs of a double-U-shaped core CR11, and a primary winding N11, a secondary winding N12, and a detection winding ND are wound around a single-U-shaped core CR21 as shown in the figure.

Incidentally, the control transformer PRT provided in each of the power factor improving circuits 13 and 14 of the embodiments 1-3 and 1-4 shown in FIG. 12 and FIG. 13 may be formed by a structure based on FIG. 31 or FIG. 32. That is, the controlled winding NR (and the detection winding ND) in the control transformer PRT of the power factor improving circuits 13 and 14 may be wound in place of the primary winding N11 and the secondary winding N12 in the structure of FIG. 31 or FIG. 32.

The description will now be returned to FIG. 19.

The primary winding N11 and the secondary winding N12 of the control transformer PRT are in the same connection mode as the primary winding N11 and the secondary winding N12 of the power factor improving transformer VFT in the power factor improving circuit 21 shown in FIG. 17, for example.

Thus, as in the power factor improving circuit 21 in FIG. 17, the fundamental operation for power factor improvement feeds back a switching output as voltage to a rectified current path via magnetic coupling of the primary winding N11 and the secondary winding N12 in a loosely coupled state. That is, a power factor improving operation of the voltage feedback system having the power factor improving transformer VFT is performed.

One end of the detection winding ND is connected to a primary side ground, and the other end of the detection winding ND is connected to the anode of a diode D5. The diode D5 and a capacitor C5 form a half-wave rectifier circuit.

Since the detection winding ND is wound so as to be closely coupled to the primary winding N11 and the secondary winding N12 in the control transformer PRT, as described above, an alternating voltage having a level corresponding to the alternating voltage occurring in the primary winding N11 and the secondary winding N12 is induced in the detection winding ND.

Since the primary winding N11 is an inductor connected in series with the primary winding N1 of the isolated converter transformer PIT, a current having a level corresponding to the primary side series resonance current flowing as the switching output in the primary side series resonant circuit (C1–N1 (L1)) flows through the primary winding N11. Therefore, a voltage having a level corresponding to the primary side series resonance current is obtained across the primary winding N11 (and the secondary winding N12). The level of the primary side series resonance current varies according to the level of load current flowing through a load connected to a secondary side direct-current output voltage Eo. Thus, the level of a voltage VD induced in the detection winding ND represents the level of the load current. Since the secondary side direct-current output voltage Eo is stabilized in embodiment 2-3, the level of the load current is obtained as a load power value as it is. That is, it can be said that the detection winding ND detects load power.

The alternating voltage of the detection winding ND is rectified by the half-wave rectifier circuit including the diode D5 and the capacitor C5. Thus, a direct-current voltage having a level corresponding to the level of the alternating voltage of the detection winding ND is obtained as the voltage across the capacitor C5. That is, the level of the voltage across the capacitor C5 represents the load power. The voltage across the capacitor C5 is supplied as a detection input representing the load power to a power factor control circuit 3.

In addition, voltage dividing resistors R1 and R2 are provided within the power factor improving circuit 23. A series connection circuit of the voltage dividing resistors R1 and R2 is connected in parallel with a smoothing capacitor Ci. That is, the series connection circuit of the voltage dividing resistors R1 and R2 is provided so as to divide a rectified and smoothed voltage Ei (direct-current input voltage Ei). A voltage dividing point of the voltage dividing resistors R1 and R2 is connected to the power factor control circuit 3.

Since the rectified and smoothed voltage Ei is obtained by converting commercial alternating-current power AC (alternating input voltage VAC) into a direct current, the level of the rectified and smoothed voltage Ei is varied in accordance with the level of the alternating input voltage VAC. Thus, the power factor control circuit 3 connected to the voltage dividing point of the voltage dividing resistors R1 and R2 is supplied with the level of the commercial alternating-current power AC detected by the voltage dividing resistors R1 and R2.

The power factor control circuit 3 in this case is formed as a simple amplifier circuit by a class A amplifier, for example. The power factor control circuit 3 is supplied with the level of the voltage across the capacitor C5, which level represents the load power, and the level of the voltage divided by the voltage dividing resistors R1 and R2, which level represents the level of the commercial alternating-current power AC. The power factor control circuit 3 accordingly varies the level of a control current Ic as a direct current to be passed through the control winding Nc of the control transformer PRT. Incidentally, the power factor control circuits 3 shown in FIG. 12 and FIG. 13 can be formed in the same manner as the power factor control circuit 3 in FIG. 19.

As an operation corresponding to the load power, the power factor control circuit 3 varies the level of the control current Ic so as to lower the level of the control current Ic as the level of the voltage across the capacitor C5 becomes lower. The level of the voltage across the capacitor C5 becoming lower means that the load current is decreased and thus that the load becomes lighter.

As an operation corresponding to the level of the commercial alternating-current power AC, the power factor control circuit 3 varies the level of the control current Ic so as to lower the level of the control current Ic as the level of the voltage divided by the voltage dividing resistors R1 and R2 becomes higher.

The control transformer PRT as a saturable reactor operates to increase the inductances L11 and L12 of the primary winding N11 and the secondary winding N12 as controlled windings as the level of the control current Ic flowing through the control winding Nc is lowered.

The increase in the inductance L12 of the secondary winding N12 functioning as an inductor within the power factor improving circuit 23 and the inductance L11 of the primary winding N11 magnetically coupled to the secondary winding N12 correspondingly increases the energy stored in the inductor as the secondary winding N12 (and the primary winding N11) according to a certain amount of power fed back from the primary side series resonant circuit. This means an increase in the amount of power feedback for power factor improvement. This increase in the amount of power feedback lowers the lower limit of the level of the alternating input voltage VAC necessary for the switching diode D1 to switch (rectify) the rectified current, thus canceling a decrease in the power factor (that is, a decrease in the amount of power feedback according to a lighter load and an increase in the alternating input voltage VAC). As a result, the amount of power feedback is maintained at a substantially constant level as the load power is decreased, and thus control is effected to make the power factor constant irrespective of variations in the load power.

Thus, the embodiment 2-3 shown in FIG. 19 can be ready for a wide range by only switching frequency control, and performs control as a multiple complex resonant converter having a power factor improving function of the voltage feedback system so as to make the improved power factor constant despite variations in the alternating input voltage (commercial alternating-current power AC) and variations in the load.

Incidentally, depending on the condition of the alternating input voltage input and the load condition, the power factor stabilizing configuration may be, for example, a power factor stabilizing configuration corresponding to variations in the alternating input voltage or a power factor stabilizing configuration corresponding to variations in the load. This is true for the power factor improving circuits 13 and 14 shown in FIG. 12 and FIG. 13.

As modifications of the secondary side of the power supply circuits according to the foregoing embodiments 2-1 to 2-3, there are the three examples of embodiments 2-4, 2-5, and 2-6. These embodiments 2-4, 2-5, and 2-6 are shown in FIG. 14, FIG. 15, and FIG. 16, respectively. The circuit configuration on the primary side of any one of embodiments 2-1 to 2-3 may be combined as a circuit configuration with the embodiments 2-4, 2-5, and 2-6. Incidentally, the circuit forms of FIG. 14, FIG. 15, and FIG. 16 have been described above, and thus a description thereof will be omitted in the following.

When the power supply circuit according to embodiment 2-4 having the circuit form of FIG. 14 is combined with a primary side configuration similar to that of the power supply circuit according to the embodiment 2-1 shown in FIG. 17, for example, and an alternating input voltage condition, a load condition, and a level of a secondary side direct-current output voltage Eo equal to those of the power supply circuit of FIG. 17 are set, the principal part elements and the like can be selected as follows.

An EER-35 type ferrite core is selected for an isolated converter transformer PIT, and the gap length of a gap G is set to 2.8 mm. As for the number of turns (T) of each winding, the primary winding N1=40 T, and the secondary winding N2A=N2B=25 T. That is, as for the number of turns of each of the secondary winding parts N2A and N2B, each of the secondary winding parts N2A and N2B can be set to 25 T, which is ½ of the number of turns of the secondary winding N2 in FIG. 17 (embodiment 2-1). A coupling coefficient k=0.63 between the primary winding N1 and the secondary winding N2 in the isolated converter transformer PIT is obtained by this structure.

The resonant capacitors for forming a multiple complex resonant converter are selected as follows.

Primary side series resonant capacitor C1=0.033 µF
Secondary side series resonant capacitor C2=0.15 µF
Primary side partial resonant capacitor Cp=330 pF
Secondary side partial resonant capacitor Cp2=1000 pF The inductance L11 of the primary winding N11 in a power factor improving transformer VFT is set at L11=47 µH, and the inductance L12 of the secondary winding N12 in the power factor improving transformer VFT is set at L12=30 µH.

One microfarad is selected for the filter capacitor CN.

An experiment conducted on the power supply circuit configured as described above provides results substantially equal to those of FIG. 7, FIG. 8, FIG. 9, and FIG. 10.

Specifically, as for the AC→DC power conversion efficiency (ηAC→DC), ηAC→DC=90.0% at the time of a maximum load power Pomax=150 W and an alternating input voltage VAC=100 V, and ηAC→DC=90.3% at the time of the maximum load power Pomax=150 W and the alternating input voltage VAC=230 V. It is thus understood that excellent characteristics are obtained.

The power factor PF is PF=0.94 at the time of the maximum load power Pomax=150 W and the alternating input voltage VAC=100 V, and is 0.8 or more in a range of the maximum load power Pomax=150 W to a minimum load power Pomin=0 W. The power factor PF is PF=0.85 at the time of the maximum load power Pomax=150 W and the alternating input voltage VAC=230 V, and is 0.75 or more in a range of the maximum load power Pomax=150 W to a load power Po=70 W.

Also, ΔfsA corresponding to the range from the alternating input voltage VAC=100 V/the maximum load power Pomax=150 W to the alternating input voltage VAC=230 V/the minimum load power Pomin=0 W in the power supply circuit according to embodiment 2-4 is 4 kHz or less as in the foregoing embodiments 2-1 to 2-3.

When the power supply circuit according to embodiment 2-6 having the circuit form of FIG. 16 is combined with a primary side configuration similar to that of the power supply circuit according to the embodiment 2-1 shown in FIG. 17, for example, and an alternating input voltage condition, a load condition, and a level of the secondary side direct-current output voltage Eo equal to those of the power supply circuit of FIG. 17 are set, the principal part elements and the like can be selected as follows.

An EER-35 type ferrite core is selected for an isolated converter transformer PIT, and the gap length of a gap G is set to 2.8 mm. As for the number of turns (T) of each winding, the primary winding N1=40 T, and the secondary winding N2=25 T. In this case, as for the number of turns of the secondary winding part N2, the secondary winding part N2 can be set to 25 T, which is ½ of the number of turns of the secondary winding N2 in FIG. 17 (embodiment 2-1). A coupling coefficient k=0.63 between the primary winding N1 and the secondary winding N2 in the isolated converter transformer PIT is obtained by this structure.

The resonant capacitors for forming a multiple complex resonant converter are selected as follows.

Primary side series resonant capacitor C1=0.033 µF
Secondary side series resonant capacitor C2=0.39 µF
Primary side partial resonant capacitor Cp=330 pF
Secondary side partial resonant capacitor Cp2=1000 pF The inductance L11 of the primary winding N11 in a power factor improving transformer VFT is set at L11=47 µH, and the inductance L12 of the secondary winding N12 in the power factor improving transformer VFT is set at L12=30 µH.

One microfarad is selected for the filter capacitor CN.

An experiment conducted on the power supply circuit configured as described above provides results substantially equal to those of FIG. 7, FIG. 8, FIG. 9, and FIG. 10, which show the experimental results of the foregoing power supply circuits.

Specifically, as for the AC→DC power conversion efficiency (ηAC→DC), ηAC→DC=90.5% at the time of a maximum load power Pomax=150 W and an alternating input voltage VAC=100 V, and ηAC→DC=90.8% at the time of the maximum load power Pomax=150 W and the alternating input voltage VAC=230 V. It is thus understood that excellent characteristics are obtained.

The power factor PF is PF=0.94 at the time of the maximum load power Pomax=150 W and the alternating input voltage VAC=100 V, and is 0.8 or more in a range of the maximum load power Pomax=150 W to a minimum load power Pomin=0 W. The power factor PF is PF=0.85 at the time of the maximum load power Pomax=150 W and the alternating input voltage VAC=230 V, and is 0.75 or more in a range of the maximum load power Pomax=150 W to a load power Po=70 W.

Also, ΔfsA corresponding to the range from the alternating input voltage VAC=100 V/the maximum load power Pomax=150 W to the alternating input voltage VAC=230 V/the minimum load power Pomin=0 W in the power supply circuit according to embodiment 2-6 is 4 kHz or less as in the foregoing embodiments 2-1 to 2-4 (and 2-5).

For confirmation, the power supply circuits according to embodiments 2-4, 2-5, and 2-6 have the configuration of a multiple complex resonant converter similar to that of the foregoing embodiments 2-1 to 2-3, except for a difference in the form and configuration of a rectifier circuit system provided for the secondary winding N2, as described above. Therefore, the power supply circuits according to embodiments 2-4; 2-5, and 2-6 have similar effects to those described in each of the foregoing embodiments 2-1 to 2-3.

Figure 20:
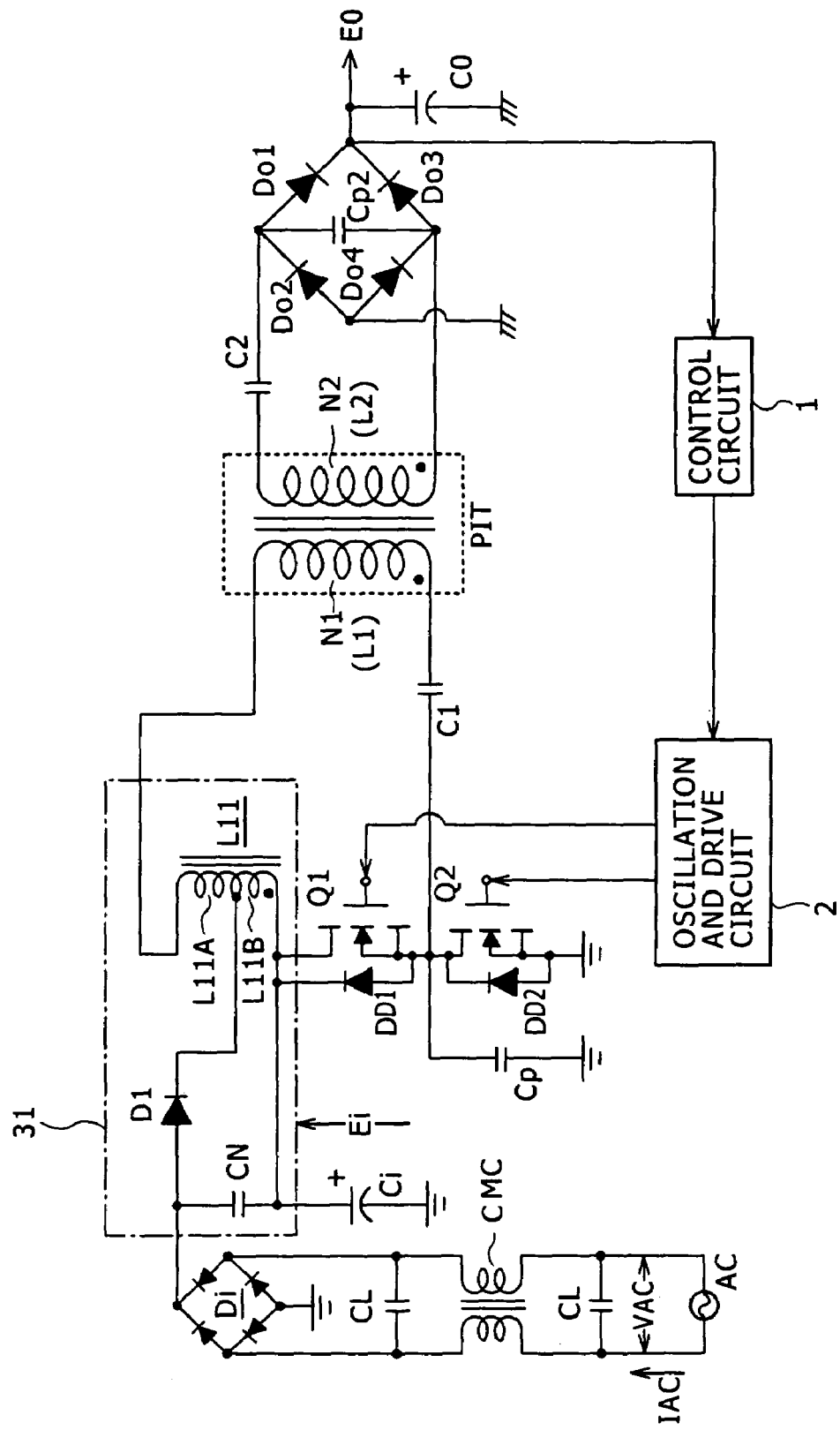
FIG. 20 is a circuit diagram showing an example of the configuration of a power supply circuit according to an embodiment 3-1 (4-1)

The circuit diagram of FIG. 20 shows an example of the configuration of a power supply circuit according to an embodiment 3-1. Incidentally, in this figure, the same parts as in the figures showing the configurations of the foregoing first embodiments are identified by the same reference numerals, and a description thereof will be omitted.

The fundamental circuit configuration of the power supply circuit shown in FIG. 20 is similar to that of FIG. 1 or FIG. 17, for example. Specifically, a bridge full-wave rectifier circuit including a bridge rectifier circuit Di and a smoothing capacitor Ci generates a rectified and smoothed voltage Ei (direct-current input voltage). A power factor improving circuit is interposed in a line as a rectified current path between the output of the bridge rectifier circuit Di and the positive electrode terminal of the smoothing capacitor Ci.

A switching converter operating with the direct-current input voltage input thereto is a multiple complex resonant converter based on a current resonant converter of a similar circuit configuration to that of FIG. 1. Specifically, a current resonant converter having switching devices Q1 and Q2 coupled to each other by half-bridge coupling is provided.

Also, a primary side partial resonant capacitor Cp is connected in parallel with the switching device Q2, whereby a primary side partial voltage resonant circuit is formed. Also, on the secondary side, in a connection mode similar to that of FIG. 1, a secondary side series resonant capacitor C2 is connected to a secondary winding N2 to form a secondary side series resonant circuit, and a bridge full-wave rectifier circuit including rectifier diodes Do1 to Do4 and a smoothing capacitor Co is provided as a rectifier circuit. A secondary side partial resonant capacitor Cp2 is provided to thereby form a secondary side partial voltage resonant circuit.

In embodiment 3-1, as in the first embodiment, the oscillation frequency fo1 of a primary side series resonant circuit and the oscillation frequency fo2 of the secondary side series resonant circuit should satisfy a relation represented by $$fo1 > fo2$$

Further, the oscillation frequency fo2 of the secondary side series resonant circuit is set to about ½ of the oscillation frequency fo1 of the primary side series resonant circuit. In the actual power supply circuit shown in FIG. 20, about 70 kHz is set as the oscillation frequency fo1 of the primary side series resonant circuit, and about 35 kHz is set as the oscillation frequency fo2 of the secondary side series resonant circuit.

While the general structure of the isolated converter transformer PIT in embodiment 3-1 may be the same as in FIG. 2, the gap length of the gap G is set to about 1.6 mm, for example. Thereby, a coupling coefficient k of about 0.75, for example, is obtained between the primary side and the secondary side of the isolated converter transformer PIT. Therefore, the degree of coupling of the isolated converter transformer PIT is the same as in the related art power supply circuit shown in FIG. 36. Incidentally, the actual coupling coefficient k of the power supply circuit according to embodiment 3-1 is set at k=0.74.

Incidentally, the structure itself including the gap length set in the above-described isolated converter transformer PIT is similar to that employed in power supply circuits having a related art current resonant converter, including the power supply circuit shown in FIG. 36, for example. That is, the coupling coefficient k of the isolated converter transformer PIT in embodiment 3-1 is set to substantially the same value as in the related art. The setting of the coupling coefficient k of the isolated converter transformer PIT itself also applies to third embodiments (3-2 to 3-8) to be described later.

Thus, in the third embodiments, while a higher degree of coupling than in the foregoing first and second embodiments is set for the isolated converter transformer PIT, a wide range-capable power supply circuit is obtained, which circuit deals with input level ranges of both an AC 100 V system and an AC 200 V system, as later described.

Hence, a power factor improving circuit of a power regeneration system or a voltage feedback system in the third embodiments has a configuration different from those of the first and second embodiments. A description will be made of a power factor improving circuit 31 provided in the power supply circuit according to the embodiment 3-1 shown in FIG. 20.

This power factor improving circuit 31 includes a high-frequency inductor (high-frequency choke coil) L11 as an inductance element, a switching diode D1 (power factor improving switching device), and a filter capacitor CN.

The high-frequency inductor L11 in this case is provided with a tap at a predetermined winding position. The high-frequency inductor L11 is thereby divided into a high-frequency winding part L11A (first winding part) and a high-frequency winding part L11B (second winding part). In this case, the winding start point of the high-frequency inductor L11 as a whole is the winding start point of a side of the high-frequency winding part L11B. Therefore, the winding end point of the high-frequency winding part L11B and the winding start point of the high-frequency winding part L11A are the tap position. The winding end point of a side of the high-frequency winding part L11A is the winding end point of the high-frequency inductor L11 as a whole.

The tap as a point of connection between the high-frequency winding part L11A and the high-frequency winding part L11B in the high-frequency inductor L11 is connected with the cathode of the switching diode D1. The anode of the switching diode D1 is connected to the positive electrode output terminal of the bridge rectifier circuit Di.

The winding end point of the high-frequency winding part L11A in the high-frequency inductor L11 is connected to an end of a primary winding N1. The winding start point of the high-frequency winding part L11B in the high-frequency inductor L11 is connected to the positive electrode terminal of the smoothing capacitor Ci.

In the above-described connection form, the high-frequency winding part L11B is connected in series with the switching diode D1 in a rectified current path formed in each half cycle in which a commercial alternating-current power AC is of positive polarity/negative polarity in a rectifier circuit system for generating a rectified and smoothed voltage Ei from the commercial alternating-current power AC.

A series connection circuit of a primary side series resonant capacitor C1 and the primary winding N1, which circuit forms the primary side series resonant circuit, is also connected to the positive electrode terminal of the smoothing capacitor Ci via a series connection with the high-frequency inductor L11. The high-frequency winding part L11B is inserted in the rectified current path for sending a rectified current to the smoothing capacitor Ci in a state of being connected to the switching diode D1. This means that, as viewed from the power factor improving circuit 31 receiving the feedback of a switching output via the primary side series resonant circuit, the primary side series resonant circuit includes the inductance of the high-frequency winding part L11A as well as the capacitance of the primary side series resonant capacitor C1 and the leakage inductance of the primary winding N1.

A filter capacitor CN in this case is inserted between the positive electrode output terminal of the bridge rectifier circuit Di and the positive electrode terminal of the smoothing capacitor Ci. In this inserted position, the filter capacitor CN is connected in parallel with a series connection circuit of the switching diode D1 and the high-frequency winding part L11B. This filter capacitor CN suppresses normal mode noise occurring in the rectified current path with the switching operation of a switching converter.

According to the circuit configuration of the power factor improving circuit 31, an inductance component as the high-frequency winding part L11B and a device for switching (interrupting) the current as the switching diode D1 are connected in series with each other and inserted in the rectified current path. A point of connection of the series connection circuit is supplied with the switching output (primary side series resonance current) obtained in the primary side series resonant circuit. According to an alternating voltage thereby occurring within the rectified current path, the switching diode D1 performs a switching operation so as to interrupt the rectified current. The rectified current flows to the smoothing capacitor Ci. That is, the power factor improving circuit 31 regenerates the primary side series resonance current obtained in the primary side series resonant circuit as power, and feeds back the primary side series resonance current to the smoothing capacitor via the rectified current path.

In this case, in regenerating the primary side series resonance current as power, and feeding back the primary side series resonance current to the smoothing capacitor Ci, it can be considered that the high-frequency winding part L11B is inserted in the rectified current path, as described above. That is, the power regeneration can be considered to be performed by magnetic coupling of the high-frequency winding part L11B.

The conduction period of an envelope waveform of the rectified current flowing in an interrupted state as described above includes a period when the level of the rectified output voltage from the bridge rectifier circuit Di is lower than the level of the voltage across the smoothing capacitor Ci. The conduction period of the alternating input current IAC substantially coincides with the conduction period of the rectified current. That is, the conduction angle of the alternating input current IAC is increased as compared with a case in which no power factor improving circuit is provided, and the conduction angle is increased such that the waveform of the alternating input current IAC approximates the waveform of the alternating input voltage VAC. That is, the power factor is improved.

Since the high-frequency inductor L11 is in series with the primary winding N1, the inductance of the high-frequency inductor L11 can be considered to be equivalent to a leakage inductance component of the primary winding N1. However, the high-frequency winding part L11B in the high-frequency inductor L11 is connected in series with the switching diode D1 in the rectified current path, and thereby functions mainly as a high-frequency inductor supplied with the switching output for power factor improvement. The inductance of the high-frequency inductor L11 to be included as the leakage inductance component of the primary winding N1 is mainly the high-frequency winding part L11A. The primary winding N1 can be considered to be connected to a point of connection between the cathode of the switching diode D1 and the high-frequency winding part L11B in a line with the rectified current path via the series connection of the high-frequency inductor L11. Thus, the leakage inductance on the primary side of the isolated converter transformer PIT can be considered to be represented by L1+L11A (L1 denotes the leakage inductance component of the primary winding N1 itself in the isolated converter transformer PIT).

Therefore, while the coupling coefficient k of the isolated converter transformer PIT itself is k=0.74 as described above, the apparent leakage inductance on the primary side increases due to the contribution of the inductance of the high-frequency inductor L11 (the high-frequency winding part L11A), as described above. Hence, a value lower than 0.74 is obtained as the total coupling coefficient kt between the primary side and the secondary side of the isolated converter transformer PIT within the power supply circuit. That is, the degree of coupling of the isolated converter transformer PIT in the power supply circuit is set lower than the coupling coefficient k obtained by the structure itself of the isolated converter transformer PIT itself. In embodiment 3-1, by setting a predetermined inductance value for the high-frequency inductor L11, the total coupling coefficient kt is set to about 0.65 or lower, and is in practice set to kt=0.61. Thus, the value of the total coupling coefficient kt between the primary side and the secondary side and the value of the coupling coefficient k of the converter transformer PIT itself differ from each other when an inductance is added to the primary winding of the converter transformer PIT.

As in embodiment 3-1, when an inductance is added to the isolated converter transformer PIT, the above-described total coupling coefficient kt is used in place of the coupling coefficient k used in the description with reference to FIGS. 3 to 5. Therefore, because of the setting of the total coupling coefficient kt=0.61 in embodiment 3-1, constant-voltage control operation is performed on the basis of the unimodal characteristic shown as the characteristic curve 3 in FIG. 4.

Thus, the power supply circuit according to embodiment 3-1 is also ready for the wide range by only switching frequency control.

When a state of loose coupling similar to the total coupling coefficient kt=about 0.65 or lower in embodiment 3-1 is to be obtained by the structure of the isolated converter transformer PIT alone with the high-frequency inductor L11 being omitted, it is conceivable that, for example, the gap G of the inner magnetic leg in an EE type core of the isolated converter transformer PIT is increased to about 2.8 mm and that the isolated converter transformer PIT itself is formed as a loosely coupled transformer with a coupling coefficient k=about 0.65 or lower.

With such a formation, the unimodal characteristic described with reference to FIG. 4 can be obtained. Therefore, the necessary control range of switching frequency is reduced as described with reference to FIG. 5, and the secondary side direct-current voltage can be stabilized while dealing with commercial alternating-current power inputs of an AC 100 V system and an AC 200 V system.

In the case of such a structure of the isolated converter transformer PIT, however, the eddy-current loss increases in the vicinity of the gap G in the core of the isolated converter transformer PIT, thus decreasing the AC→DC power conversion efficiency (ηAC→DC) correspondingly. This decrease in the AC→DC power conversion efficiency caused by the eddy-current loss becomes noticeable as the level of the alternating input voltage VAC is raised. The wide range-ready power supply circuit therefore has a problem of lower AC→DC power conversion efficiency when used in the AC 200 V system than when used in the AC 100 V system.

However, since the above-described increase in the eddy-current loss is in a tolerable range under a load condition up to a maximum load power Pomax=about 150 W or lower, for example, a practicable wide range-ready power supply circuit can be obtained even when the high-frequency inductor L11 is omitted and a state of loose coupling at the coupling coefficient k=0.65 or lower is set by only the isolated converter transformer PIT, as described above. When provision is to be made for maximum load power Pomax=about 200 W, however, the above-described increase in the eddy-current loss becomes too noticeable to be ignored. It is therefore difficult to put the wide range-ready power supply circuit to practical use with the isolated converter transformer PIT itself set at a coupling coefficient k=0.65 or lower.

Accordingly, in embodiment 3-1, for the purpose of putting the wide range-ready power supply circuit to practical use with the maximum load power Pomax raised to about 200 W, for example, the high-frequency inductor L11 is connected to the primary winding N1 as described above, and thereby the equivalent leakage inductance of the primary winding N1 is increased by the inductance of the high-frequency inductor L11. The total coupling coefficient kt of the isolated converter transformer PIT within the power supply circuit is thereby set to kt=about 0.65 or lower.

In this case, since the coupling coefficient k of the isolated converter transformer PIT itself can be set to k=about 0.75, which is equal to the coupling coefficient of the related art power supply circuit, the gap length of the gap G can be set to about 1.6 mm, as described above. That is, the gap length can be reduced to a certain value where the problem of an increase in eddy current does not occur.

The power supply circuit according to embodiment 3-1 thereby solves the above-described problem of an increase in the eddy-current loss, and therefore does not cause a decrease in the AC-to-DC power conversion efficiency ($\eta AC \rightarrow DC$), which decrease is caused by the problem of the increase in the eddy-current loss. Thus, even when used in an AC 200 V system, the power supply circuit has an excellent AC-to-DC power conversion efficiency characteristic ($\eta AC \rightarrow DC$) such as to make the power supply circuit practical as a wide range-ready power supply circuit.

As described above, a series resonant circuit (the secondary side series resonant circuit) is also formed on the secondary side, which is one factor in improving the power conversion efficiency. That is, the secondary side series resonant circuit makes it possible to supply power as the secondary side direct-current output voltage Eo including an energy increase obtained by the resonant operation of the secondary side series resonant circuit, thus compensating for the decrease in the power conversion efficiency due to loose coupling. Further, the secondary side partial voltage resonant circuit is formed on the secondary side, as described above, to reduce the switching loss at rectifier diodes on the secondary side. This also contributes to improving the power conversion efficiency.

Figure 21:
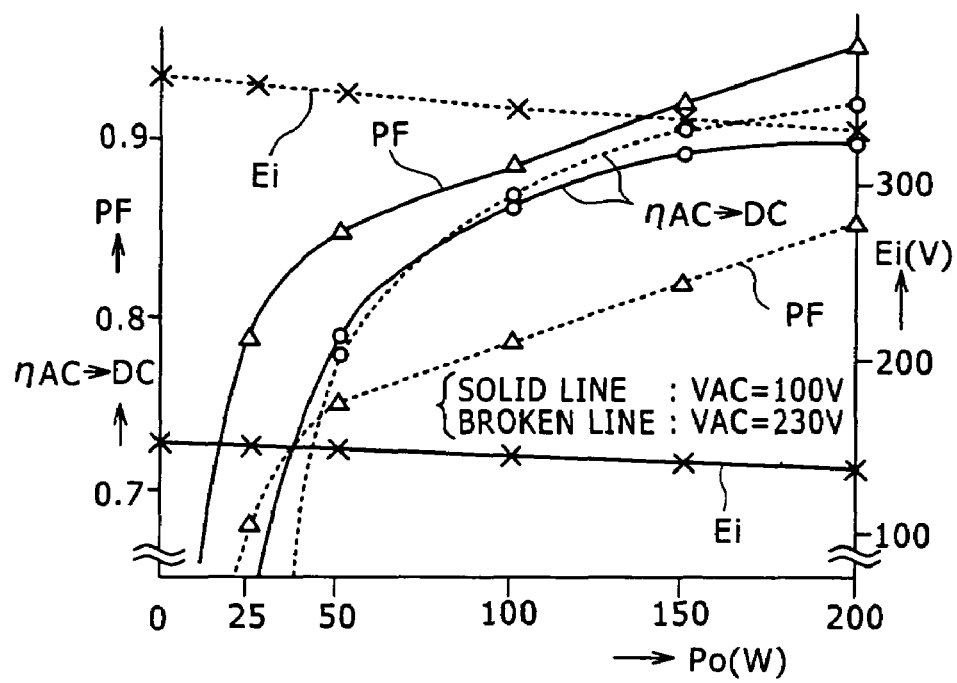
FIG. 21 is a diagram showing characteristics of a rectified and smoothed voltage, power factor, and AC→DC power conversion efficiency with respect to the load variation in the power supply circuit according to embodiment 3-1.

FIG. 21 shows the rectified and smoothed voltage (direct-current input voltage) Ei, power factor PF, and AC→DC power conversion efficiency ($\eta AC \rightarrow DC$) with respect to load variations in a range of maximum load power Pomax=200 W to minimum load power Pomin=0 W (no load), as results of an experiment on the power supply circuit according to the embodiment 3-1 shown in FIG. 20. In this figure, the characteristics when the alternating input voltage VAC=100 V corresponding to the AC 100 V system are represented by solid lines, and the characteristics when the alternating input voltage VAC=230 V corresponding to the AC 200 V system are represented by broken lines.

Figure 22:
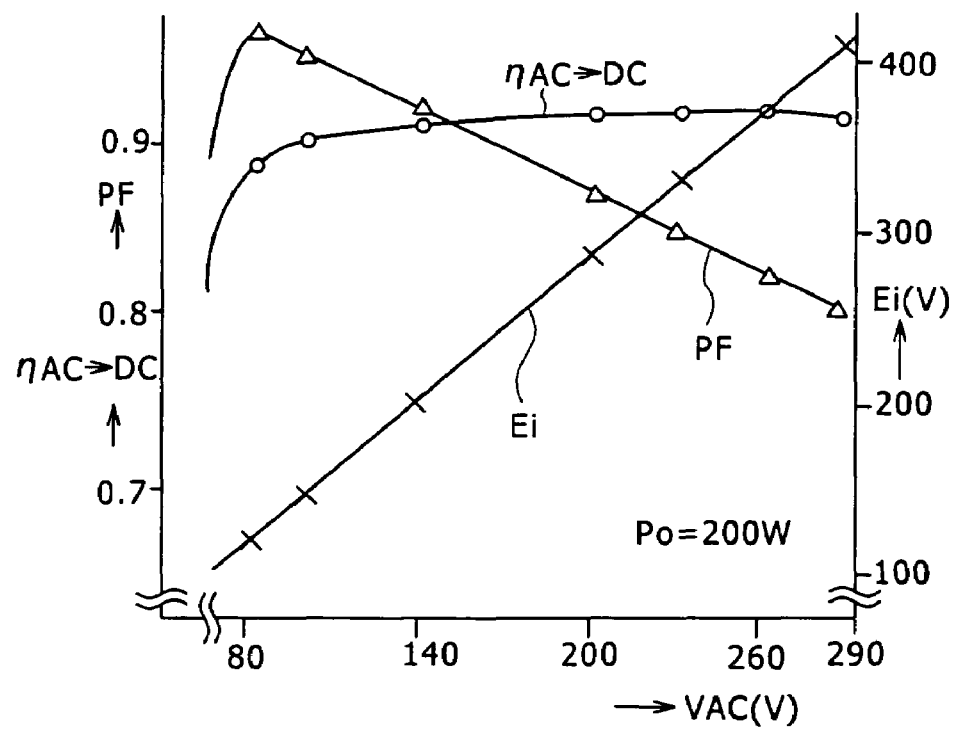
FIG. 22 is a diagram showing the characteristics of the rectified and smoothed voltage, power factor, and AC→DC power conversion efficiency with respect to the variation in an alternating input voltage in the power supply circuit according to embodiment 3-1.

FIG. 22 shows the rectified and smoothed voltage Ei, power factor PF, and AC→DC power conversion efficiency ($\eta AC \rightarrow DC$) with respect to variations of the alternating input voltage in a range of 85 V to 288 V, as results of an experiment on the power supply circuit shown in FIG. 20. Incidentally, the load condition is fixed at Po=200 W, which is the maximum load power.

In obtaining the characteristics shown in FIG. 21 and FIG. 22, the principal parts of the power supply circuit shown in FIG. 20 were selected as follows.

As for the isolated converter transformer PIT, the gap length of the gap G in the EE type core was set to 1.6 mm, and the primary winding N1=26 T and the secondary winding N2=26 T were wound. By this structure, k=0.74 is obtained as the coupling coefficient k of the isolated converter transformer PIT itself. In addition, as for the high-frequency inductor L11, the high-frequency winding part L11A=10 µH and the high-frequency winding part L11B=30 µH were selected, whereby a total coupling coefficient kt=0.61 is set.

The resonant capacitors for forming the primary side series resonant circuit, the secondary side series resonant circuit, the primary side partial voltage resonant circuit, and the secondary side partial voltage resonant circuit, and the filter capacitor CN were selected as follows.

Primary side series resonant capacitor C1=0.039 µF
Secondary side series resonant capacitor C2=0.15 µF
Primary side partial resonant capacitor Cp=1000 pF
Secondary side partial resonant capacitor Cp2=1000 pF
Filter capacitor CN=1 µF The rated level of the secondary side direct-current output voltage Eo is set to 135 V.

As shown in FIG. 21, the rectified and smoothed voltage Ei as the direct-current input voltage of the switching converter is at a level around 140 V when the alternating input voltage VAC=100 V, and is at a level around 340 V when the alternating input voltage VAC=230 V. In both cases of the alternating input voltage VAC=100 V and 230 V, the level of current flowing through the circuit increases as the load becomes heavier, and thus the level of the rectified and smoothed voltage Ei is slightly lowered.

The power factor PF obtained according to the operation of the power factor improving circuit 31 increases both when the alternating input voltage VAC=100 V and 230 V as the load becomes heavier. When the alternating input voltage VAC=100 V, the power factor PF is 0.75 or more in the range of the load power Po=20 W to 200 W, and thus a practically sufficient power factor value is obtained. When the maximum load power Pomax=200 W, PF=0.95 was obtained. When the alternating input voltage VAC=230 V, the power factor PF is 0.75 or more in the range of the load power Po=50 W to 200 W, and PF=0.85 was obtained when the maximum load power Pomax=200 W.

The AC→DC power conversion efficiency ($\eta AC \rightarrow DC$) increases as the load power Po is increased. Under a load condition of the maximum load power Pomax=200 W, $\eta AC \rightarrow DC$=90.1% when the alternating input voltage VAC=100 V, and $\eta AC \rightarrow DC$=92.0% when the alternating input voltage VAC=230 V. Thus, both measurement results obtained exceed 90%.

According to FIG. 22, the rectified and smoothed voltage Ei increases as the alternating input voltage VAC is increased because the rectified and smoothed voltage Ei is obtained as the voltage across the smoothing capacitor Ci by the rectifying operation of the full-wave rectifier circuit supplied with the commercial alternating-current power AC (VAC), the full-wave rectifier circuit including the bridge rectifier circuit Di and the smoothing capacitor Ci.

While the power factor PF decreases with an increase in the alternating input voltage VAC, a PF≧0.8 is maintained even at the maximum alternating input voltage VAC=288 V.

While the AC→DC power conversion efficiency ($\eta AC \rightarrow DC$) is slightly decreased in a low level range of the alternating input voltage VAC, the power conversion efficiency is maintained at 90% or more in a level range of the alternating input voltage VAC=100 V or higher, as is also shown in the characteristics in FIG. 21.

Figure 23:
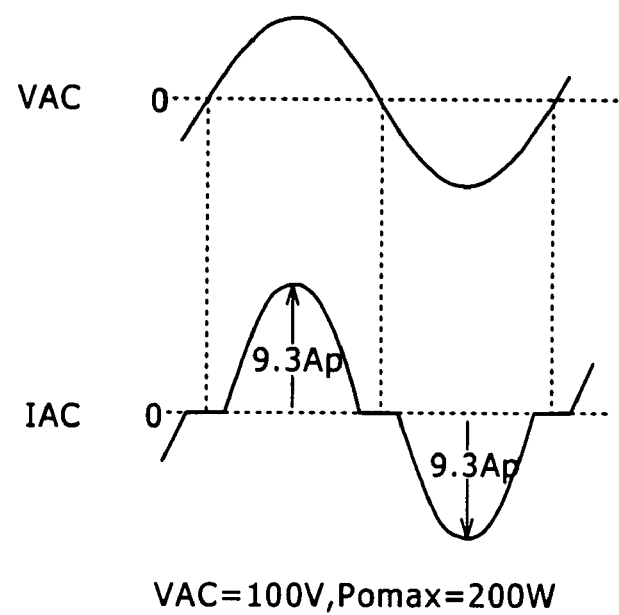
FIG. 23 is a waveform chart representing the power factor improving operation of power supply circuits according to third and fourth embodiments.
Figure 24:
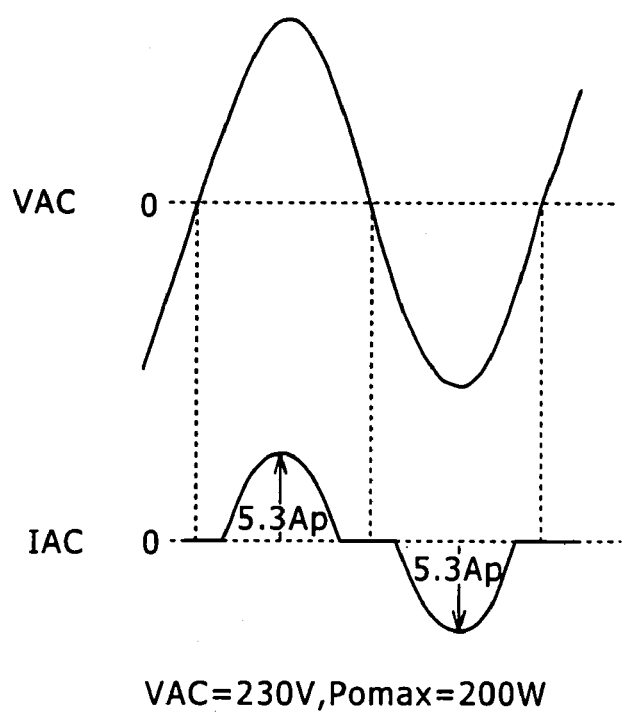
FIG. 24 is a waveform chart representing the power factor improving operation of the power supply circuits according to the third and fourth embodiments.

The waveform charts of FIG. 23 and FIG. 24 indicate the power factor improving operation by the power factor improving circuit 31 for obtaining the above-described power factor characteristics. FIG. 23 and FIG. 24 show the alternating input current IAC in conjunction with the alternating input voltage VAC. FIG. 23 represents an operation when the alternating input voltage VAC=100 V (AC 100 V system) and the maximum load power Pomax=200 W. FIG. 24 represents an operation when the alternating input voltage VAC=230 V (AC 200 V system) and the maximum load power Pomax=200 W.

As shown in these figures, the alternating input current IAC flows in the same polarity as the alternating input voltage VAC with a conduction angle corresponding to a period when the absolute value level of the alternating input voltage VAC is higher than a predetermined value in each positive/negative half-wave period of the alternating input voltage VAC. The power factor improving circuit 31 performs the above-described power factor improving operation to increase the conduction angle of the alternating input current IAC as compared with a case in which the power factor improving circuit 31 is not provided. That is, FIG. 23 and FIG. 24 show a result of power factor improvement.

Incidentally, the level of the alternating input current IAC in this case is 9.3 Ap when the alternating input voltage VAC=100 V and is 5.3 Ap when the alternating input voltage VAC=230 V.

Also in embodiment 3-1, $\Delta$fsA corresponding to a range from the alternating input voltage VAC=100 V/the maximum load power Pomax=200 W to the alternating input voltage VAC=230 V/the minimum load power Pomin=0 W is about 4 kHz or less.

In embodiment 3-1, the high-frequency winding part L11B of the high-frequency inductor L11 functions as a high-frequency inductor (power factor improving inductor) to be connected in series with the switching diode D1 and inserted in the rectified current path for power factor improvement. Thus, the value of the power factor PF to be obtained in the power factor improving circuit 31 can be set mainly by the inductance of the high-frequency winding part L11B.

On the other hand, the high-frequency winding part L11A (coupling coefficient setting inductor) constitutes an inductance component forming the leakage inductance on the primary side together with the leakage inductance L1 of the primary winding N1 itself. Thus, the total coupling coefficient kt can be set mainly by the inductance of the high-frequency winding part L11A.

Figure 25:
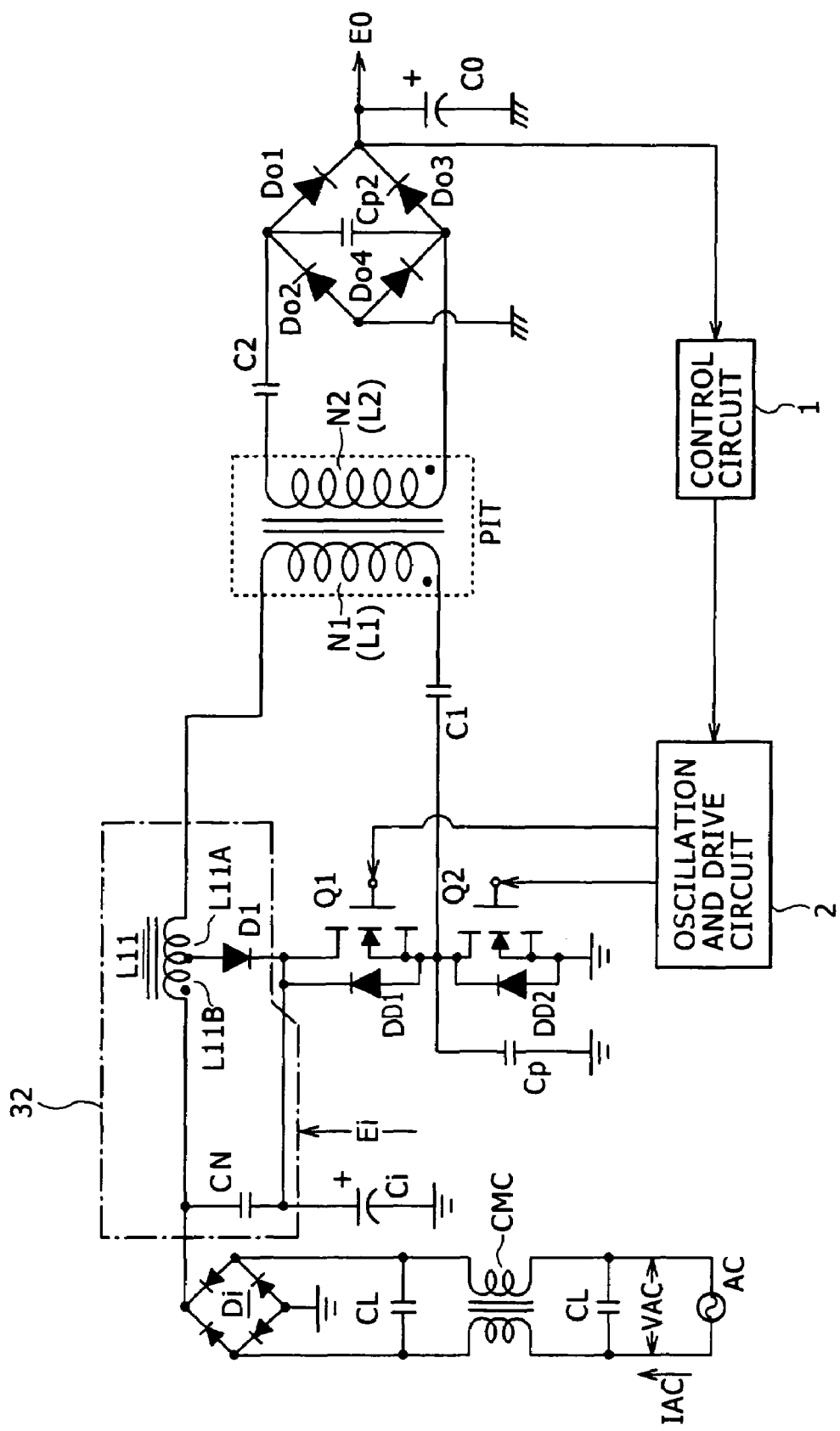
FIG. 25 is a circuit diagram showing an example of the configuration of a power supply circuit according to an embodiment 3-2 (4-2)

The circuit diagram of FIG. 25 shows an example of the configuration of a power supply circuit according to an embodiment 3-2. Incidentally, in this figure, the same parts as in FIG. 1 are identified by the same reference numerals, and a description thereof will be omitted.

The power supply circuit shown in this figure has a power factor improving circuit 32 in place of the power factor improving circuit 31 in the embodiment 3-1 shown in FIG. 20.

The power factor improving circuit 32 also includes a high-frequency inductor L11, a switching diode D1, and a filter capacitor CN. Also in this case, the high-frequency inductor L11 is provided with a tap at a predetermined winding position. The high-frequency inductor L11 is thereby divided into a high-frequency winding part L11A on the winding end side and a high-frequency winding part L11B.

In this case, the tap of the high-frequency inductor L11 is connected with the anode of the switching diode D1. The cathode of the switching diode D1 is connected to the positive electrode output terminal of a smoothing capacitor Ci.

An end part on the winding end side of the high-frequency winding part L11A in the high-frequency inductor L11 is connected to one end of a primary winding N1. An end part on the winding start side of the high-frequency winding part L11B in the high-frequency inductor L11 is connected to the positive electrode output terminal of the bridge rectifier circuit Di.

Also in the above-described connection form, a series connection circuit of a primary side series resonant capacitor C1 and the primary winding N1, which circuit forms a primary side series resonant circuit, is connected to the positive electrode terminal of the smoothing capacitor Ci via a serial connection with the high-frequency inductor L11. Thus, also in this case, the primary side series resonant circuit includes the inductance of the high-frequency inductor L11 as well as the capacitance of the primary side series resonant capacitor C1 and the leakage inductance of the primary winding N1.

Also in this case, the high-frequency winding part L11B is connected in series with the switching diode D1 in a rectified current path formed in each half cycle in which a commercial alternating-current power AC is of positive polarity/negative polarity in a rectifier circuit system for generating a rectified and smoothed voltage Ei from a commercial alternating-current power line AC. That is, also in the power factor improving circuit 32, the high-frequency winding part L11B functions as a high-frequency inductor supplied with a switching output for power factor improvement.

The power factor improving circuit 32 is thus configured to perform a power regenerating operation in which the switching output (primary side series resonance current) obtained in the primary side series resonant circuit (C1–L1–L11A) is fed back to the smoothing capacitor Ci via the switching diode D1. That is, a diode coupling type power regenerating operation is obtained.

Also, when such a diode coupling type power factor improving circuit 32 is provided, the switching diode D1 switches and interrupts the rectified current according to the regenerated power. As a result, as in the magnetic coupling type power factor improving circuit 31 shown in FIG. 20, the conduction angle of the alternating input current IAC is increased to improve the power factor.

Also in this case, the primary winding N1 is connected in series with the high-frequency winding part L11A, and is further connected to the rectified current path (the point of connection of a series connection circuit of the high-frequency winding part L11B and the switching diode D1) in the rectifying and smoothing circuit system for generating the rectified and smoothed voltage Ei. As a result, as for the total coupling coefficient kt, as in embodiment 3-1, a state of loose coupling is set so as to obtain a unimodal characteristic as described with reference to FIG. 4 and FIG. 5, for example, so that the necessary control range of the switching frequency can be reduced. Thus, embodiment 3-2 has similar effects to those of the foregoing embodiment 3-1.

Figure 26:
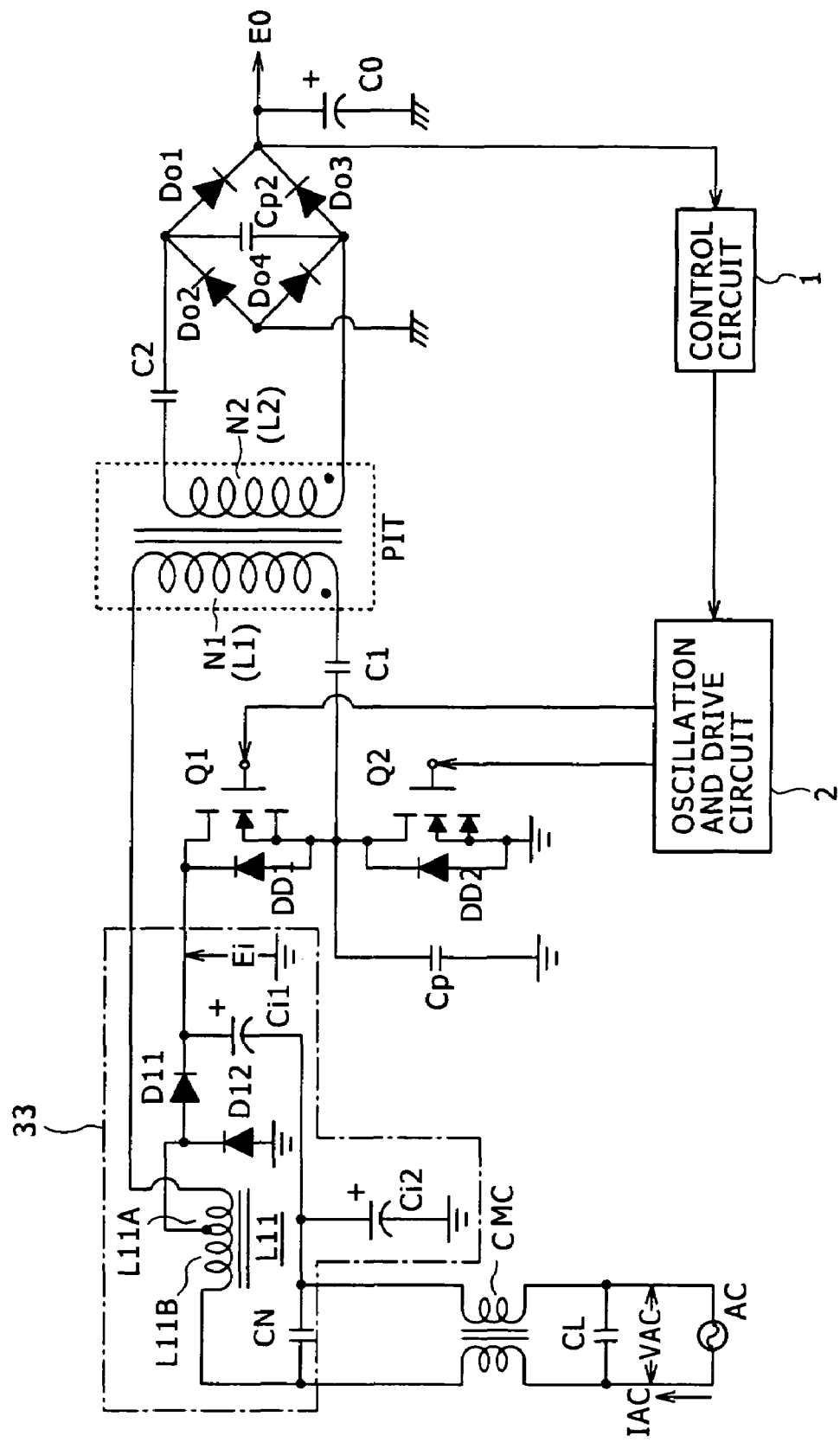
FIG. 26 is a circuit diagram showing an example of the configuration of a power supply circuit according to an embodiment 3-3 (4-3)

The circuit diagram of FIG. 26 shows an example of the configuration of a power supply circuit according to an embodiment 3-3. Incidentally, in this figure, the same parts as in FIG. 20, FIG. 25 and the like are identified by the same reference numerals, and a description thereof will be omitted.

The power supply circuit shown in this figure has a voltage doubler rectifier circuit for generating a rectified and smoothed voltage Ei having a level corresponding to twice the alternating input voltage VAC as a rectifying and smoothing circuit system supplied with a commercial alternating-current power AC (alternating input voltage VAC) to generate the rectified and smoothed voltage Ei (direct-current input voltage). In addition, the power supply circuit shown in FIG. 26 has a power factor improving circuit 33 formed by combining a circuit configuration for power factor improvement of a power regeneration system with the voltage doubler rectifier circuit, as will be described next.

The power factor improving circuit 33 is formed by a high-frequency inductor L11, a filter capacitor CN, rectifier diodes D11 and D12, and two smoothing capacitors Ci1 and Ci2 connected in series with each other. The voltage doubler rectifier circuit included in the power factor improving circuit 33 is formed by the rectifier diodes D11 and D12 and the two smoothing capacitors Ci1 and Ci2 connected in series with each other. In this case, the rectifier diodes D11 and D12 function as power factor improving switching devices. Therefore, fast recovery type rectifier diodes are selected as the rectifier diodes D11 and D12.

The filter capacitor CN in the configuration of the power factor improving circuit 33 having the voltage doubler rectifier circuit is inserted between the positive electrode line and the negative electrode line of a commercial alternating-current power supply AC in a stage succeeding a common mode noise filter (CMC and CL).

The high-frequency inductor L11 in this case is also provided with a tap. The high-frequency inductor L11 is thus divided into a high-frequency winding part L11A on the winding end side and a high-frequency winding part L11B, with the tap position as the dividing position. An end part on the winding start side of the high-frequency winding part L11B in the high-frequency inductor L11 is connected to the positive electrode line of the commercial alternating-current power supply AC in the stage succeeding the common mode noise filter (CMC and CL). The tap of the high-frequency inductor L11 is connected to a point of connection between the anode of the rectifier diode D11 and the cathode of the rectifier diode D12. An end part on the winding end side of the high-frequency winding part L11A in the high-frequency inductor L11 is connected to one end part of a primary winding N1. The other end part of the primary winding N1 in this case is connected via a primary side series resonant capacitor C1 to a point of connection (a switching output point) between the drain of a switching device Q1 and the source of a switching device Q2.

The cathode of the rectifier diode D11 is connected to the positive electrode terminal of the smoothing capacitor Ci1. The anode of the rectifier diode D12 is connected to a primary side ground.

A point of connection between the smoothing capacitors Ci1 and Ci2 connected in series with each other is connected to the negative electrode line of the commercial alternating-current power supply AC in the stage succeeding the common mode noise filter (CMC and CL). The negative electrode terminal of the smoothing capacitor Ci2 is connected to the primary side ground.

As for the operation of the voltage doubler rectifier circuit in the thus formed power factor improving circuit 33, in a period of one half cycle (positive polarity) of the commercial alternating-current power AC, a rectification current path of the commercial alternating-current power supply AC→(CMC winding)→the high-frequency winding part L11B→the rectifier diode D11→the smoothing capacitor Ci1→(CMC winding)→the commercial alternating-current power supply AC is formed. Thus, the rectifier diode D11 rectifies the commercial alternating-current power AC, and the smoothing capacitor Ci1 is charged with a rectified current as the rectified output of the rectifier diode D11, whereby a rectified voltage smoothing operation is obtained.

In a period of another half cycle (negative polarity) of the commercial alternating-current power AC, a rectification current path of the commercial alternating-current power supply AC→(CMC winding)→the smoothing capacitor Ci2→the rectifier diode D12→the high-frequency winding part L11B→(CMC)→the commercial alternating-current power supply AC is formed. Thus, the rectifier diode D12 rectifies the commercial alternating-current power AC, and the smoothing capacitor Ci2 smoothes the rectified output of the rectifier diode D12.

As a result, a rectified and smoothed voltage having a level corresponding to the alternating input voltage VAC is obtained as the voltage across each of the smoothing capacitors Ci1 and Ci2. Hence, a rectified and smoothed voltage Ei having a level corresponding to twice the level of the alternating input voltage VAC is obtained as the voltage across the series connection circuit of the smoothing capacitors Ci1 and Ci2. That is, a voltage doubler rectifier operation is obtained.

According to the above-described rectification current paths, a series connection circuit of the high-frequency winding part L11B and the rectifier diode D11 is formed in the half cycle period in which the commercial alternating-current power AC is of positive polarity, and a series connection circuit of the rectifier diode D12 and the high-frequency winding part L11B is formed in the half cycle period in which the commercial alternating-current power AC is of negative polarity. That is, also in this case, the high-frequency winding part L11B is connected in series with the rectifier diodes D11 and D12 functioning as a switching device, and the high-frequency winding part L11B functions as a high-frequency inductor supplied with the switching output for power factor improvement in the power factor improving circuit 33.

An end part of a primary side series resonant circuit (C1-L1-L11A) (switching output (primary side series resonance current)) in this case is connected to a point of connection between the high-frequency inductor L11B, the anode of the rectifier diode D11, and the cathode of the rectifier diode D12. Thus, a system for feeding back the primary side switching output to the rectification current path corresponding to each positive/negative period of the commercial alternating-current power AC is formed.

The rectifier diodes D11 and D12 switch (interrupt) the rectified current obtained by the rectifying operation according to the switching output fed back as described above. Thereby, the power factor improving circuit 33 supplies a charging current to the smoothing capacitors Ci1 and Ci2 also during a period when the level of rectified output voltage is lower than the level of voltage across the smoothing capacitors Ci1 and Ci2. Thus, the conduction angle of the alternating input current IAC is increased to improve the power factor.

Incidentally, it can be considered that the power factor improving circuit 33 feeds back the switching output (primary side series resonance current) obtained in the primary side series resonant circuit (C1-L1-L11A) to the smoothing capacitor Ci1 via the rectifier diode D11 and feeds back the switching output to the smoothing capacitor Ci2 via the rectifier diode D12. That is, a diode coupling type power regenerating operation is obtained.

Also in embodiment 3-3, the primary winding N1 is connected in series with the high-frequency winding part L11A, and is further connected to the rectified current path (the point of connection between the high-frequency winding part L11B and the switching diode D1) in the rectifying and smoothing circuit system for generating the rectified and smoothed voltage Ei. As a result, as for the total coupling coefficient kt, a state of loose coupling is set so as to obtain a unimodal characteristic as described with reference to FIG.

4 and FIG. 5, for example, so that the necessary control range of the switching frequency can be reduced. Thus, embodiment 3-3 has similar effects to those of the foregoing embodiments.

Incidentally, the rectifier circuit system for generating the rectified and smoothed voltage Ei is a voltage doubler rectifier circuit as in embodiment 3-3 in the case of a single range in which the commercial alternating-current power supply AC is of a 100 V system and a condition of relatively heavy load with a maximum load power of 200 W or higher, for example. Under such a condition, the current flowing through the switching converter increases, and the power loss is increased. However, when the rectified and smoothed voltage Ei is generated so as to be increased twofold by the voltage doubler rectifier circuit, the amount of current flowing through the switching converter is reduced under the same load condition, and thus the power loss is reduced. For example, the circuit configuration of the embodiment 3-3 in FIG. 26 provides a wide range-ready power supply circuit capable of a maximum load power (Pomax) of about 300 W or higher.

Figure 27:
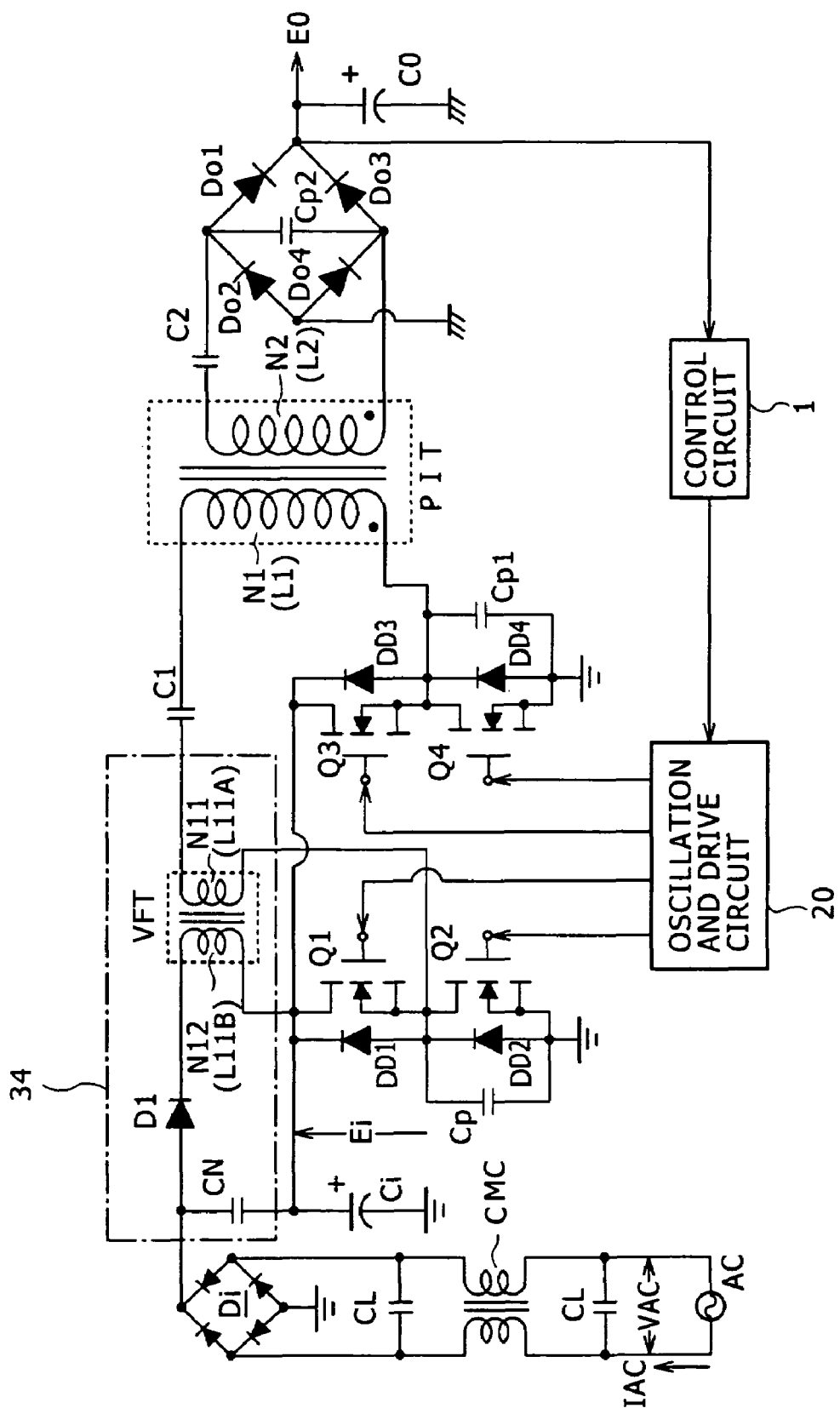
FIG. 27 is a circuit diagram showing an example of the configuration of a power supply circuit according to an embodiment 3-4 (4-4)

The circuit diagram of FIG. 27 shows an example of the configuration of a power supply circuit according to an embodiment 3-4. Incidentally, in this figure, the same parts as in FIG. 20, FIG. 25, FIG. 26 and the like are identified by the same reference numerals, and a description thereof will be omitted.

The power supply circuit shown in this figure employs a full-bridge coupling system having four switching devices Q1 to Q4 for a configuration of a current resonant converter on the primary side.

In the full-bridge coupling system, as shown in the figure, a half-bridge connection of the switching devices Q3 and Q4 is connected in parallel with a half-bridge connection of the switching devices Q1 and Q2.

As with the switching devices Q1 and Q2, a damper diode DD3 and a damper diode DD4 as body diodes are connected in parallel with the switching devices Q3 and Q4 between the drain and the source of the switching devices Q3 and Q4, respectively.

In this case in which the switching devices Q3 and Q4 are provided, a primary side partial resonant capacitor Cp1 is connected in parallel with the switching device Q4 between the drain and the source of the switching device Q4. The capacitance of the primary side partial resonant capacitor Cp1 and the leakage inductance L1 of a primary winding N1 (and the inductance of a high-frequency inductor L11) form a parallel resonant circuit (a partial voltage resonant circuit). A partial voltage resonant operation, in which voltage resonance occurs only when the switching devices Q3 and Q4 are turned off, is thereby obtained.

In this case, one end of the primary winding N1 of an isolated converter transformer PIT is connected to a point of connection between the source of the switching device Q1 and the drain of the switching device Q2 via a series connection of a primary side series resonant capacitor C1 and the primary winding N11 of a power factor improving transformer VFT to be described later. The point of connection between the source of the switching device Q1 and the drain of the switching device Q2 is one switching output point in the full-bridge coupling switching circuit system.

The other end of the primary winding N1 is connected to a point of connection between the source of the switching device Q3 and the drain of the switching device Q4 as another switching output point.

According to the connection mode described above, a series connection of the primary winding N1, the primary side series resonant capacitor C1, and the primary winding N11 is formed in embodiment 3-4. Thus, a primary side series resonant circuit is formed by the combined inductance of the leakage inductance L1 of the primary winding N1 itself and the inductance of the primary winding N11 in the power factor improving transformer VFT and the capacitance of the primary side series resonant capacitor C1.

The primary side series resonant circuit is inserted between the switching output point on the side of the switching devices Q1 and Q2 and the switching output point on the side of the switching devices Q3 and Q4.

An oscillation and drive circuit 20 in this case drives the four switching devices Q1 to Q4. The oscillation and drive circuit 20 performs switching-driving so as to turn on/off the set of switching devices Q1 and Q4 and the set of switching devices Q2 and Q3 alternately. Switching outputs of these switching devices are transmitted to the primary side series resonant circuit inserted between the switching output points as described above, to convert the switching operation into a current resonance type operation.

Incidentally, the oscillation and drive circuit 20 in practice may have two driving circuits (ICs) for driving two switching devices for half-bridge coupling systems, and these driving circuits may each perform a switching operation such that the set of switching devices Q1 and Q2 and the set of switching devices Q3 and Q4 are synchronized with each other, and the above-described switching timing of the set of switching devices Q1 and Q4 and the set of switching devices Q2 and Q3 is obtained.

Incidentally, as in embodiment 3-4, the full-bridge coupling system is employed for the configuration of the current resonant converter on the primary side to deal with a condition of heavy load. As the load becomes heavier, the current flowing through the switching converter increases, the load on the circuit parts becomes heavier, and the power loss is increased.

In the full-bridge coupling, the necessary load current is provided by the four switching devices. Therefore, as compared with the case of a half-bridge coupling system having two switching devices, for example, the load on each part becomes lighter, and the power loss is reduced, so that the full-bridge coupling system is advantageous under a condition of heavy load. For example, the configuration shown in FIG. 27 provides a wide range-ready power supply circuit capable of a maximum load power (Pomax) of about 300 W or higher.

The power supply circuit according to the embodiment 3-4 has a power factor improving circuit 34 for improving the power factor by a voltage feedback system. The power factor improving circuit 34 includes the power factor improving transformer VFT, a switching diode D1, and a filter capacitor CN.

The anode of the switching diode D1 is connected to the positive electrode output terminal of a bridge rectifier circuit Di. The cathode of the switching diode D1 is connected to the positive electrode terminal of the smoothing capacitor Ci via a series connection with the secondary winding N12 of the power factor improving transformer VFT.

In the connection form of the above-described power factor improving circuit 34, a series connection circuit of the switching diode D1 and the secondary winding N12 is inserted in a line between the positive electrode output terminal of the bridge rectifier circuit Di and the positive electrode terminal of the smoothing capacitor Ci in a rectified current path for generating a rectified and smoothed voltage Ei. That is, the secondary winding N12 functions as an inductor for receiving an alternating voltage having a switching period, which voltage is obtained by voltage feedback of a switching output. The secondary winding N12 in this case has a similar function to that of the high-frequency winding part L11B in the high-frequency inductor L11 in the foregoing embodiments.

The filter capacitor CN in this case is connected in parallel with the series connection circuit of the switching diode D1 and the secondary winding N12.

The power factor improving transformer VFT has a structure in which the primary winding N11 and the secondary winding N12 are wound around a core in such a manner as to be magnetically coupled to each other. Incidentally, the power factor improving transformer VFT in this case has a so-called divided bobbin having divided winding positions formed therein. The primary winding N11 and the secondary winding N12 are wound in their respective different winding positions in the divided bobbin. Thereby, a predetermined coupling coefficient of loose coupling is obtained as a degree of coupling between the primary side and the secondary side.

In the thus formed power factor improving circuit 34, when a switching output (primary side series resonance current) is obtained in the primary side series resonant circuit, a current as the switching output flows through the primary winding N11 of the power factor improving transformer VFT, the primary winding N11 being considered to be included in the primary side series resonant circuit. Then, the power factor improving transformer VFT induces an alternating voltage in the secondary winding N12 according to the alternating current flowing through the primary winding N11.

As described above, the secondary winding N12 of the power factor improving transformer VFT is inserted in the rectified current path of a commercial alternating-current power supply AC in a series connection with the switching diode D1. Thus, the alternating voltage induced in the secondary winding N12 is superimposed on the rectified output voltage. That is, the power factor improving transformer VFT feeds back the primary side series resonance current as voltage to the rectified current path via a magnetic coupling of the power factor improving transformer VFT. The system of the power factor improving circuit in which the switching output is thus fed back as voltage for power factor improvement is referred to herein as a voltage feedback system.

Hence, the switching diode D1 in this case also operates so as to switch (interrupt) a rectified current according to the superimposed component of the above-described alternating voltage. As a result of such an operation, the rectified current also flows during a period when the level of an alternating input voltage VAC is lower than the voltage across the smoothing capacitor Ci. As a result, as in the foregoing embodiments, the conduction angle of the alternating input current IAC is increased, and the waveform of the alternating input current IAC approximates the waveform of the alternating input voltage VAC. Hence, the power factor is improved.

In the power supply circuit shown in FIG. 27, the primary winding N11 of the power factor improving transformer VFT is connected in series with the primary winding N1 of the isolated converter transformer PIT via the primary side series resonant capacitor C1, as described above. In this case, where the primary side series resonant capacitor C1 is interposed between the primary winding N1 and the primary winding N11, the leakage inductance component of the primary side series resonant circuit is a combination of the leakage inductance L1 of the primary winding N1 itself in the isolated converter transformer PIT and the inductance of the primary winding N11 in the power factor improving transformer VFT. Thus, the primary winding N1 and the primary winding N11 may be considered to be inductances connected in series with each other within the primary side series resonant circuit. The total coupling coefficient kt between the primary side and the secondary side of the isolated converter transformer PIT therefore has a value corresponding to the total leakage inductance obtained by combining the leakage inductance L1 of the primary winding N1 itself with the inductance of the primary winding N11 in the power factor improving transformer VFT. That is, in embodiment 3-4, the primary winding N11 in the power factor improving transformer VFT has a function of the high-frequency winding part L11A shown in FIG. 1, for example.

With the configuration as in embodiment 3-4, as to the total coupling coefficient kt, a state of loose coupling is set so as to obtain a unimodal characteristic as described with reference to FIG. 4 and FIG. 5, for example, so that the necessary control range of the switching frequency can be reduced. The effects thereby obtained are similar to those of the foregoing embodiments.

The configuration of the power factor improving circuit 34 according to the embodiment 3-4 in FIG. 27 is similar to that of the power factor improving circuit 21 according to the embodiment 2-1 shown in FIG. 17. Also, in the case of the power factor improving circuit 21 according to embodiment 2-1, to be exact, the leakage inductance component of the primary side series resonant circuit is a combination of the leakage inductance L1 of the primary winding N1 itself in the isolated converter transformer PIT and the inductance of the primary winding N11 in the power factor improving transformer VFT, and the total coupling coefficient kt is represented as a value corresponding to the total leakage inductance obtained by combining the leakage inductance L1 of the primary winding N1 itself with the inductance of the primary winding N11 in the power factor improving transformer VFT.

However, the maximum load power dealt with by the power supply circuit according to embodiment 3-4 is 200 W, as in embodiments 3-1 to 3-3, and this indicates a condition of heavier load as compared with the maximum load power of 150 W that is dealt with by the power supply circuit according to embodiment 2-1. For this reason, the current resonant converter of the power supply circuit according to embodiment 3-4 is of the full-bridge coupling system, as described above. On the other hand, a half-bridge coupling system is used in embodiment 2-1. By thus employing the full-bridge coupling system, it is possible to provide a switching current that is increased in correspondence with the heavier load. As the switching current is thus increased, the inductance (leakage inductance) of the primary winding N11 in the power factor improving transformer VFT becomes effective as a primary side leakage inductance component of the primary side series resonant circuit.

Incidentally, for confirmation, the form and the like of the power factor improving circuit to be combined with the configuration of the full-bridge coupling system in the primary side current resonant converter may be arbitrary, and a power factor improving circuit of another voltage feedback system or a power regeneration system may be combined arbitrarily, for example.

Figure 28:
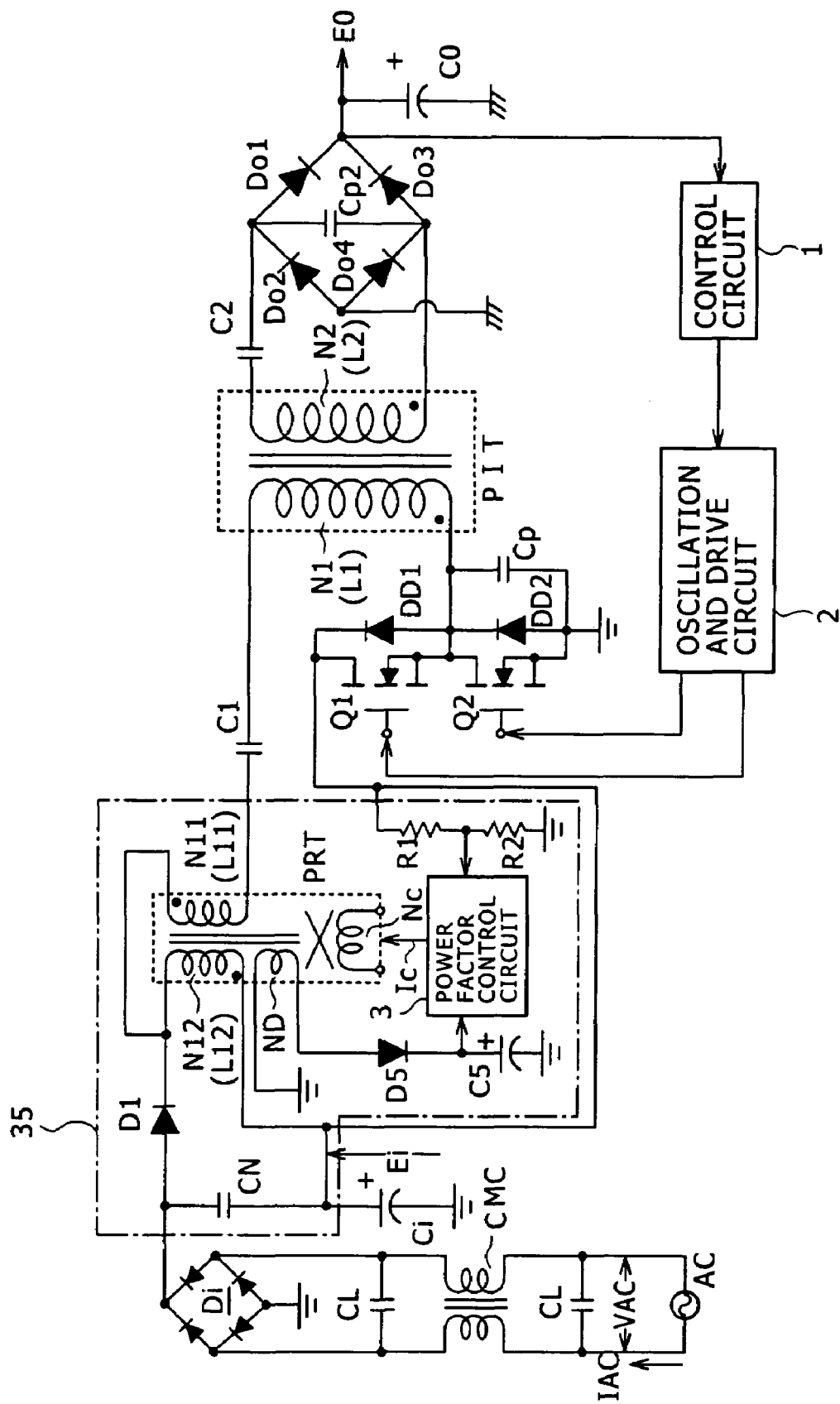
FIG. 28 is a circuit diagram showing an example of the configuration of a power supply circuit according to an embodiment 3-5 (4-5)

The circuit diagram of FIG. 28 shows an example of the configuration of a power supply circuit according to an embodiment 3-5. Incidentally, in this figure, the same parts as in FIG. 1 and FIG. 11 to 13 are identified by the same reference numerals, and a description thereof will be omitted.

As shown in FIG. 21 and FIG. 22, the power supply circuit according to embodiment 3-1 decreases the value of the improved power factor PF as the load becomes lighter or as the level of the alternating input voltage is raised. As the load becomes lighter, the amount of current flowing within the power supply circuit is reduced, and accordingly the conduction angle of the alternating input current IAC is decreased, thus reducing the power factor. Also, as the level of the alternating input voltage is raised, the lower limit of the level of the alternating input voltage VAC necessary for the switching diode D1 to conduct the rectified current is increased. Thus, the conduction angle of the alternating input current IAC is decreased and, therefore, the power factor is decreased. Such characteristics also appear in the power supply circuit according to embodiment 3-4 for similar reasons.

While, for example, the power supply circuit according to the foregoing embodiment 3-1 or the like has practically sufficient power factor characteristics as shown in FIGS. 21 and 22, it may be desirable to obtain more stable power factor values with respect to variations in the level of the alternating input voltage and the load, depending on the alternating input voltage condition and the load condition, for example. Accordingly, the power supply circuit according to embodiment 3-5 is configured to make the improved power factor constant. For this, the embodiment 3-5 has a power factor improving circuit 35.

The power factor improving circuit 35 includes a switching diode D1, a filter capacitor CN, a control transformer PRT, a half-wave rectifier circuit (D5 and C5), resistors R1 and R2, and a power factor control circuit 3. The control transformer PRT is formed by winding a primary winding N11, a secondary winding N12, and a detection winding ND. Incidentally, the structure of the control transformer PRT itself may be the same as that described with reference to FIG. 31 or FIG. 32.

In addition, in the power factor improving circuit 35 of embodiment 3-5, a series connection circuit of the switching diode D1 and the secondary winding N12 of the control transformer PRT is inserted between the positive electrode output terminal of a bridge rectifier circuit Di and the positive electrode terminal of a smoothing capacitor Ci. In this case, the anode of the switching diode D1 is connected to the positive electrode terminal of the bridge rectifier circuit Di, and the cathode of the switching diode D1 is connected to the positive electrode terminal of the smoothing capacitor Ci via a series connection with the secondary winding N12 in the control transformer PRT.

In this case, one end part of the primary winding N11 of the control transformer PRT is connected to a point of connection between the secondary winding N12 and the cathode of the switching diode D1. The other end part of the primary winding N11 in this case is connected to a primary winding N1 via a primary side series resonant capacitor C1.

The mode of other connections in the power factor improving circuit 35 is similar to that of the power factor improving circuit 23 shown in FIG. 19, and therefore a description thereof will be omitted.

It is understood from the connection mode of the above-described power factor improving circuit 35 that the primary winding N11 and the secondary winding N12 of the control transformer PRT are respectively provided within the power factor improving circuit 35 in a connection mode similar to that of the high-frequency winding parts L11A and L11B in the high-frequency inductor L11 of the embodiment 3-1 shown in FIG. 20, for example.

Specifically, the primary winding N11 of the control transformer PRT in this case is connected in series with the primary winding N1 of an isolated converter transformer PIT via the primary side series resonant capacitor C1. Therefore, the primary winding N11 of the control transformer PRT is an inductance component for forming a primary side series resonant circuit. The total coupling coefficient kt is set by the combined inductance of the leakage inductance L1 of the primary winding N1 itself and the inductance of the primary winding N11. Also in embodiment 3-5, the total coupling coefficient kt is set at a predetermined value of about 0.65 or lower, for example, to obtain a unimodal characteristic as described above as a constant-voltage control characteristic.

The secondary winding N12 of the control transformer PRT and the switching diode D1 form a series connection circuit in a rectified current path formed in each positive/negative half-wave period of commercial alternating-current power AC. A point of connection of the series connection circuit is supplied with a switching output (primary side series resonance current) obtained in the primary side series resonant circuit. That is, switching output feedback of a power regeneration system is performed, thereby improving the power factor.

The power factor control circuit 3 operates in the same manner as the power factor improving circuit 23 of FIG. 19 to control the improved power factor at a constant level despite variations in the load and variations in the alternating input voltage. That is, it can be considered that in this case, the control transformer PRT is formed on the basis of the high-frequency inductor L11 shown in FIG. 20 or the like.

Incidentally, also in this case, depending on the condition of the alternating input voltage input and the load condition, the power factor stabilizing configuration may be, for example, a power factor stabilizing configuration corresponding to variations in the alternating input voltage or a power factor stabilizing configuration corresponding to variations in the load.

In addition, for confirmation, as in the embodiment 3-4 shown in FIG. 27, the primary winding N11 of the control transformer PRT in this case has the function of the high-frequency winding part L11A. The total coupling coefficient kt for obtaining the unimodal characteristic described with reference to FIG. 4 and FIG. 5 is set by a total leakage inductance component obtained by combining the leakage inductance L1 of the primary winding N1 itself with the inductance of the primary winding N11 in the control transformer PRT.

As modifications of the secondary side of the power supply circuits according to the foregoing embodiments 3-1 to 3-5, there are the three examples of embodiments 3-6, 3-7, and 3-8. Configurations of these embodiments 3-6, 3-7, and 3-8 are shown in FIG. 14, FIG. 15, and FIG. 16, respectively. The circuit configuration on the primary side of any one of embodiments 3-1 to 3-5 may be combined as a circuit configuration with the embodiments 3-6, 3-7, and 3-8. Incidentally, the circuit forms of FIG. 14, FIG. 15, and FIG. 16 have been described above, and thus a description thereof will be omitted in the following.

When the power supply circuit according to embodiment 3-7 having the circuit form of FIG. 15 is combined with a primary side configuration similar to that of the power supply circuit according to the embodiment 3-1 shown in FIG. 20, for example, and an alternating input voltage condition, a load condition, and a level of a secondary side direct-current output voltage Eo equal to those of the power supply circuit according to embodiment 3-1 are set, the principal part elements and the like can be selected as follows.

An EER-40 type ferrite core is selected for an isolated converter transformer PIT, and the gap length of a gap G is set to 1.6 mm. As for the number of turns (T) of each winding, the primary winding N1=26 T, and the secondary winding N2A=N2B=13 T. That is, as for the number of turns of each of the secondary winding parts N2A and N2B, each of the secondary winding parts N2A and N2B can be set to 13 T, which is ½ of the number of turns of the secondary winding N2 in FIG. 20 (embodiment 3-1), for example. By this structure, k=0.74 is obtained as the coupling coefficient k of the isolated converter transformer PIT itself. In addition, as for a high-frequency inductor L11, a high-frequency winding part L11A=10 μH and a high-frequency winding part L11B=30 μH are selected, whereby a total coupling coefficient kt=0.61 is set.

The resonant capacitors for forming a primary side series resonant circuit, a secondary side series resonant circuit, a primary side partial voltage resonant circuit, and a secondary side partial voltage resonant circuit, and a filter capacitor CN are selected as follows.

Primary side series resonant capacitor C1=0.039 μF
Secondary side series resonant capacitor C2=0.15 μF
Primary side partial resonant capacitor Cp=1000 pF
Secondary side partial resonant capacitor Cp2=1000 pF
Filter capacitor CN=1 μF The rated level of the secondary side direct-current output voltage Eo is set to 135 V.

An experiment conducted on the power supply circuit configured as described above provides results substantially equal to those of FIG. 21, FIG. 22, FIG. 23, and FIG. 24.

Specifically, as for the AC→DC power conversion efficiency (ηAC→DC), ηAC→DC=90.0% at the time of a maximum load power Pomax=200 W and an alternating input voltage VAC=100 V, and ηAC→DC=91.8% at the time of the maximum load power Pomax=200 W and the alternating input voltage VAC=230 V. Thus, excellent characteristics are obtained.

The power factor PF is PF=0.95 at the time of the maximum load power Pomax=200 W and the alternating input voltage VAC=100 V, and is 0.75 or more in a range of the maximum load power Pomax=200 W to Po=20 W. The power factor PF is PF=0.85 at the time of the maximum load power Pomax=200 W and the alternating input voltage VAC=230 V, and is 0.75 or more in a range of the maximum load power Pomax=200 W to a load power Po=50 W.

Also, ΔfsA corresponding to the range from the alternating input voltage VAC=100 V/the maximum load power Pomax=200 W to the alternating input voltage VAC=230 V/the minimum load power Pomin=0 W in the power supply circuit according to embodiment 3-7 is 4 kHz or less as in the foregoing embodiments 3-1 to 3-5. Incidentally, embodiment 3-6 having the circuit configuration of FIG. 14 has similar characteristics to those of embodiment 3-7.

When the power supply circuit according to embodiment 3-8 having the circuit form of FIG. 16 is combined with a primary side configuration similar to that of the power supply circuit according to the embodiment 3-1 shown in FIG. 20, for example, and an alternating input voltage condition, a load condition, and a level of a secondary side direct-current output voltage Eo equal to those of the power supply circuit according to embodiment 3-1 are set, the principal part elements and the like can be selected as follows.

An EER-40 type ferrite core is selected for an isolated converter transformer PIT, and the gap length of a gap G is set to 1.6 mm. As for the number of turns (T) of each winding, the primary winding N1=26 T, and the secondary winding N2=13 T. That is, as for the number of turns of the secondary winding part N2, the secondary winding part N2 can be set to 13 T, which is ½ of the number of turns of the secondary winding N2 in FIG. 20 (embodiment 3-1). By this structure, k=0.74 is obtained as the coupling coefficient k of the isolated converter transformer PIT itself. In addition, as for a high-frequency inductor L11, a high-frequency winding part L11A=10 μH and a high-frequency winding part L11B=30 μH are selected, whereby a total coupling coefficient kt=0.61 is set.

The resonant capacitors for forming a primary side series resonant circuit, a secondary side series resonant circuit, a primary side partial voltage resonant circuit, and a secondary side partial voltage resonant circuit, and a filter capacitor CN are selected as follows.

Primary side series resonant capacitor C1=0.039 μF
Secondary side series resonant capacitor C2=0.33 μF
Primary side partial resonant capacitor Cp=1000 pF
Secondary side partial resonant capacitor Cp2=1000 pF
Filter capacitor CN=1 μF The rated level of the secondary side direct-current output voltage Eo is set to 135 V.

An experiment conducted on the power supply circuit configured as described above provides results substantially equal to those of FIG. 21, FIG. 22, FIG. 23, and FIG. 24.

Specifically, as for the AC→DC power conversion efficiency (ηAC→DC), ηAC→DC=90.3% at the time of a maximum load power Pomax=200 W and an alternating input voltage VAC=100 V, and ηAC→DC=92.2% at the time of the maximum load power Pomax=200 W and the alternating input voltage VAC=230 V. Thus, excellent characteristics are obtained.

The power factor PF is PF=0.95 at the time of the maximum load power Pomax=200 W and the alternating input voltage VAC=100 V, and is 0.75 or more in a range of the maximum load power Pomax=200 W to Po=20 W. The power factor PF is PF=0.85 at the time of the maximum load power Pomax=200 W and the alternating input voltage VAC=230 V, and is 0.75 or more in a range of the maximum load power Pomax=200 W to a load power Po=50 W.

Also, ΔfsA corresponding to the range from the alternating input voltage VAC=100 V/the maximum load power Pomax=200 W to the alternating input voltage VAC=230 V/the minimum load power Pomin=0 W in the power supply circuit according to embodiment 3-8 is 4 kHz or less as in the foregoing embodiments 3-1 to 3-7.

For confirmation, the power supply circuits according to embodiments 3-6, 3-7, and 3-8 have the configuration of a multiple complex resonant converter similar to that of one of the foregoing embodiments 3-1 to 3-5, except for a difference in the form and configuration of a rectifier circuit system provided for the secondary winding N2, as described above. Therefore, the power supply circuits according to embodiments 3-6, 3-7, and 3-8 have similar effects to those described in each of the foregoing embodiments 3-1 to 3-5.

An embodiment 4-1 will next be described as a power supply circuit according to a fourth embodiment. The circuit configuration of the power supply circuit according to embodiment 4-1 is similar to that of FIG. 20 showing embodiment 3-1.

In embodiment 4-1, the oscillation frequency fo1 of a primary side series resonant circuit and the oscillation frequency fo2 of a secondary side series resonant circuit should satisfy a relation represented by fo1<fo2

In addition, in practice, the oscillation frequency fo2 of the secondary side series resonant circuit is set to within about 1.5 times the oscillation frequency fo1 of the primary side series resonant circuit. In the actual power supply circuit according to embodiment 4-1, the oscillation frequency fo2 of the secondary side series resonant circuit is set in a range of about 1.4 to 1.3 times the oscillation frequency fo1 of the primary side series resonant circuit. Specifically, a predetermined value of fo1≈70 kHz is set for the oscillation frequency fo1 of the primary side series resonant circuit, and a predetermined value of fo2≈90 kHz is set for the oscillation frequency fo2 of the secondary side series resonant circuit.

When, for example, an alternating input voltage condition (VAC=85 V to 288 V), a load condition (Pomax=200 W to Pomin=0 W), and a rated level (135 V) of a secondary side direct-current output voltage Eo equal to those of the power supply circuit according to embodiment 3-1 are set in the power supply circuit according to embodiment 4-1, the principal part elements and the like can be selected as follows.

An EER-40 type ferrite core is selected for an isolated converter transformer PIT, and the gap length of a gap G is set to 1.6 mm. As for the number of turns (T) of each winding, the primary winding N1=26 T, and the secondary winding N2=24 T. By this structure, k=0.74 is obtained as the coupling coefficient k of the isolated converter transformer PIT itself. In addition, as for a high-frequency inductor L11, a high-frequency winding part L11A=10 µH and a high-frequency winding part L11B=30 µH are selected, whereby a total coupling coefficient kt=0.645 is set.

The resonant capacitors for forming a primary side series resonant circuit, a secondary side series resonant circuit, a primary side partial voltage resonant circuit, and a secondary side partial voltage resonant circuit, and a filter capacitor CN are selected as follows.

Figure 29:
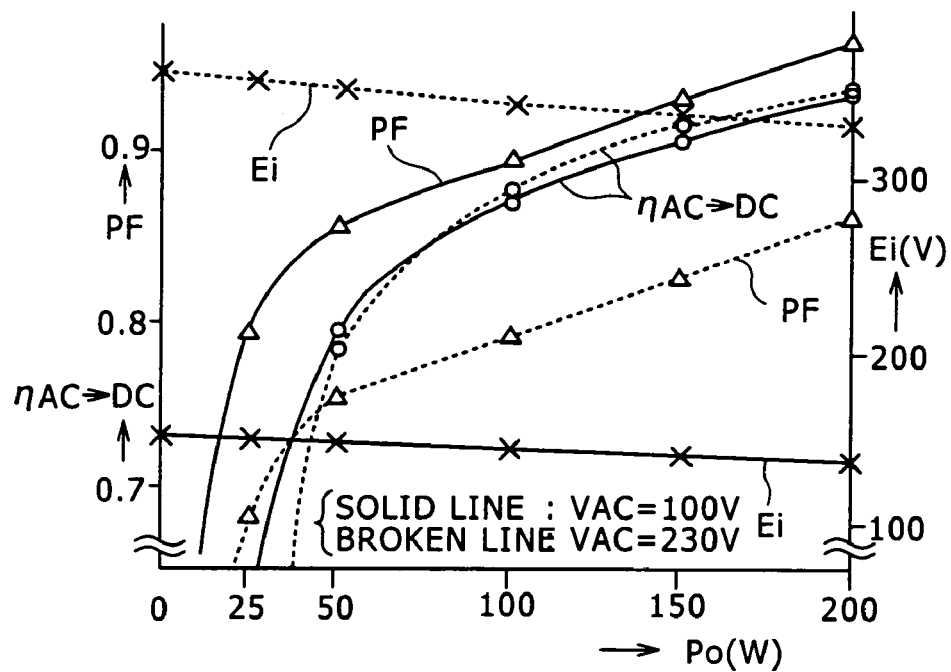
FIG. 29 is a diagram showing the characteristics of a rectified and smoothed voltage, power factor, and AC→DC power conversion efficiency with respect to the load variation in the power supply circuit according to embodiment 4-1.

Primary side series resonant capacitor C1=0.047 µF
Secondary side series resonant capacitor C2=0.075 µF
Primary side partial resonant capacitor Cp=1000 pF
Secondary side partial resonant capacitor Cp2=1000 pF
Filter capacitor CN=1 µF FIG. 29 shows the respective characteristics of the rectified and smoothed voltage (direct-current input voltage) Ei, power factor (PF), and AC→DC power conversion efficiency (ηAC→DC) with respect to load variations in the range of maximum load power Pomax=200 W to minimum load power Pomin=0 W (no load) when an experiment was conducted on the power supply circuit configured as described above. In this figure, the characteristics at the time of the alternating input voltage VAC=100 V corresponding to an AC 100 V system are represented by solid lines, and the characteristics at the time of the alternating input voltage VAC=230 V corresponding to an AC 200 V system are represented by broken lines.

Figure 30:
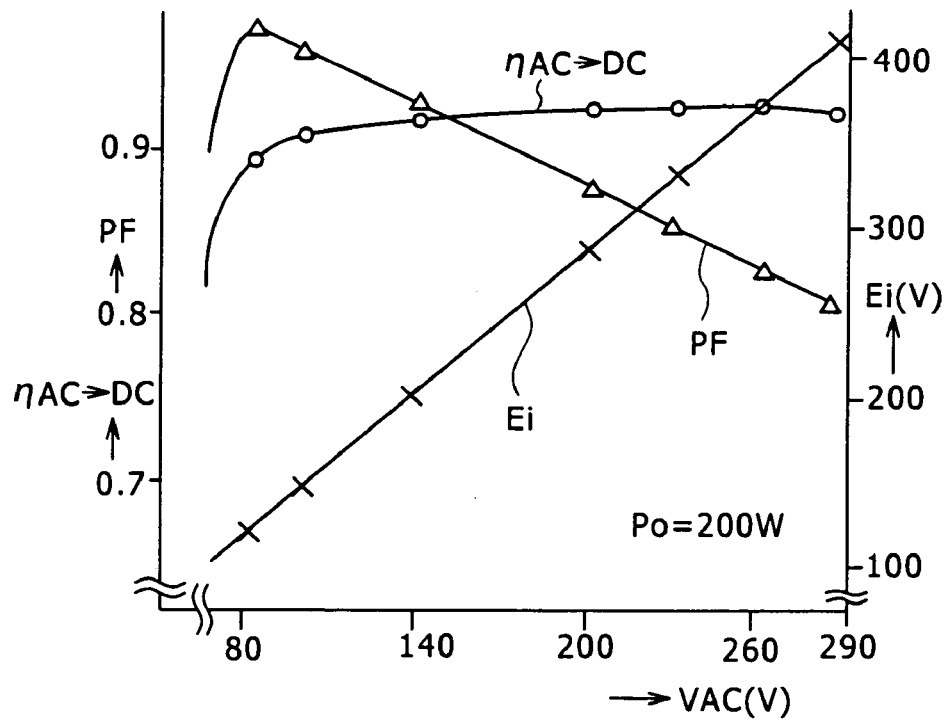
FIG. 30 is a diagram showing the characteristics of the rectified and smoothed voltage, power factor, and AC→DC power conversion efficiency with respect to the variation in an alternating input voltage in the power supply circuit according to embodiment 4-1.

FIG. 30 shows the respective characteristics of the rectified and smoothed voltage (direct-current input voltage) Ei, power factor (PF), and AC→DC power conversion efficiency (ηAC→DC) with respect to variations of the alternating input voltage in the range of 85 V to 288 V. Incidentally, the load condition is fixed at Po=200 W, which is the maximum load power.

As shown in FIG. 29, the rectified and smoothed voltage Ei as the direct-current input voltage of the switching converter is at a level around 140 V when the alternating input voltage VAC=100 V, and is at a level around 340 V when the alternating input voltage VAC=230 V. In both cases of the alternating input voltage VAC=100 V and 230 V, the level of current flowing through the circuit increases as the load becomes heavier, and thus the level of the rectified and smoothed voltage Ei is slightly lowered.

The power factor PF obtained according to the operation of a power factor improving circuit 31 is increased both when the alternating input voltage VAC=100 V and 230 V as the load becomes heavier. When the alternating input voltage VAC=100 V, the power factor PF is 0.75 or more in the range of the load power Po=20 W to 200 W, and thus a practically sufficient power factor value is obtained. When the maximum load power Pomax=200 W, PF=0.95 was obtained. When the alternating input voltage VAC=230 V, the power factor PF is 0.75 or more in the range of the load power Po=50 W to 200 W, and PF=0.82 was obtained when the maximum load power Pomax=150 W.

The AC→DC power conversion efficiency (ηAC→DC) increases as the load power Po increases. Under a load condition of the maximum load power Pomax=200 W, ηAC→DC=91.5% when the alternating input voltage VAC=100 V, and ηAC→DC=91.7% when the alternating input voltage VAC=230 V. Thus, both measurement results obtained exceed 91%.

According to FIG. 30, the rectified and smoothed voltage Ei increases as the alternating input voltage VAC increases because the rectified and smoothed voltage Ei is obtained as the voltage across a smoothing capacitor Ci by the rectifying operation of a full-wave rectifier circuit supplied with commercial alternating-current power AC (VAC), the full-wave rectifier circuit including a bridge rectifier circuit Di and the smoothing capacitor Ci.

While the power factor PF decreases with an increase in the alternating input voltage VAC, PF≧0.8 is maintained even at the maximum alternating input voltage VAC=288 V.

While the AC→DC power conversion efficiency (ηACΔDC) is slightly decreased in a low level range of the alternating input voltage VAC, the power conversion efficiency is maintained at 90% or more in a range in which the alternating input voltage VAC=100 V or higher, as is also shown in the characteristics in FIG. 9.

A comparison of the measurement result of the AC→DC power conversion efficiency (ηAC→DC) with the measurement result of the AC→DC power conversion efficiency (ηAC→DC) in embodiment 3-1, for example, indicates that the power conversion efficiency in embodiment 4-1 shows a better characteristic. This is related primarily to the setting of frequency values and a frequency value relationship different from those of embodiment 3-1 for the oscillation frequency fo1 of the primary side series resonant circuit and the oscillation frequency fo2 of the secondary side series resonant circuit. For example, by changing the settings of the oscillation frequencies fo1 and fo2, a change occurs in the switching current flowing through switching devices Q1 and Q2 and the waveform of the rectification current flowing through a secondary side rectifier circuit. This change appears as a decrease in peak level, for example, and brings about a reduction of switching loss, for example. Such a factor contributes to an improvement in the power conversion efficiency.

Also in this case, the waveform charts of FIG. 23 and FIG. 24 indicate the power factor improving operation by the power factor improving circuit 31 for obtaining the power factor characteristics described with reference to FIG. 29 and FIG. 30.

Also, ΔfsA corresponding to the range from the alternating input voltage VAC=100 V/the maximum load power Pomax=200 W to the alternating input voltage VAC=230 V/the minimum load power Pomin=0 W in the power supply circuit according to embodiment 4-1 is 10 kHz or less. This indicates that a wide range capability is achieved.

As variations of primary side configurations such as forms or the like of the power factor improving circuit and the current resonant converter of the power supply circuit according to the fourth embodiment, there are embodiments 4-2 to 4-5.

The circuit configuration of embodiment 4-2 is similar to that of the embodiment 3-2 shown in FIG. 25.

The circuit configuration of embodiment 4-3 is similar to that of the embodiment 3-3 shown in FIG. 26.

The circuit configuration of embodiment 4-4 is similar to that of the embodiment 3-4 shown in FIG. 27.

The circuit configuration of embodiment 4-5 is similar to that of the embodiment 3-5 shown in FIG. 28.

In embodiments 4-2 to 4-5, the circuit configurations of the respective figures are employed, and the oscillation frequency fo1 of the primary side series resonant circuit and the oscillation frequency fo2 of the secondary side series resonant circuit are set in the same manner as in embodiment 4-1. Respective comparisons of the power supply circuits according to embodiments 4-2 to 4-5 with the power supply circuits according to embodiments 3-2 to 3-5 indicate that the power supply circuits according to embodiments 4-2 to 4-5 have better AC→DC power conversion efficiency characteristics (ηAC→DC) as in the comparison of embodiment 4-1 with embodiment 3-1.

Further, as variations of the secondary side of the power supply circuits according to the fourth embodiments, there are embodiments 4-6, 4-7, and 4-8.

Configurations of these embodiments 4-6, 4-7, and 4-8 are shown in FIG. 14, FIG. 15, and FIG. 16, respectively. The circuit configuration on the primary side of any one of embodiments 4-1 to 4-5 may be combined with embodiments 4-6, 4-7, and 4-8. In addition, in embodiments 4-6, 4-7, and 4-8, the oscillation frequency fo1 of the primary side series resonant circuit and the oscillation frequency fo2 of the secondary side series resonant circuit are set in the same manner as in embodiment 4-1.

When the power supply circuit according to embodiment 4-7 having the circuit form of FIG. 15 is combined with a primary side configuration similar to that of the power supply circuit according to the embodiment 4-1 shown in FIG. 20, for example, and an alternating input voltage condition, a load condition, and a level of a secondary side direct-current output voltage Eo equal to those of the power supply circuit according to embodiment 4-1 are set, the principal part elements and the like can be selected as follows.

An EER-40 type ferrite core is selected for an isolated converter transformer PIT, and the gap length of a gap G is set to 1.6 mm. As for the number of turns (T) of each winding, the primary winding N1=26 T, and the secondary winding N2A=N2B=12 T. That is, as for the number of turns of each of the secondary winding parts N2A and N2B, each of the secondary winding parts N2A and N2B can be set to substantially ½ of the number of turns of the secondary winding N2 in FIG. 20 (embodiment 4-1), for example. By this structure, k=0.74 is obtained as the coupling coefficient k of the isolated converter transformer PIT itself. In addition, as for a high-frequency inductor L11, a high-frequency winding part L11A=10 μH and a high-frequency winding part L11B=30 μH are selected, whereby a total coupling coefficient kt=0.645 is set.

The resonant capacitors for forming a primary side series resonant circuit, a secondary side series resonant circuit, a primary side partial voltage resonant circuit, and a secondary side partial voltage resonant circuit, and a filter capacitor CN are selected as follows.

Primary side series resonant capacitor C1=0.047 μF
Secondary side series resonant capacitor C2=0.15 μF
Primary side partial resonant capacitor Cp=1000 pF
Secondary side partial resonant capacitor Cp2=1000 pF
Filter capacitor CN=1 μF An experiment conducted on the power supply circuit configured as described above provides results substantially equal to those of FIG. 29, FIG. 30, FIG. 23, and FIG. 24.

Specifically, as for the AC→DC power conversion efficiency (ηAC→DC), ηAC→DC=91.2% at the time of a maximum load power Pomax=200 W and an alternating input voltage VAC=100 V, and ηAC→DC=91.6% at the time of the maximum load power Pomax=200 W and the alternating input voltage VAC=230 V. Thus, excellent characteristics are obtained as compared with embodiment 3-7.

The power factor PF is PF=0.95 at the time of the maximum load power Pomax=200 W and the alternating input voltage VAC=100 V, and is 0.75 or more in a range of the maximum load power Pomax=200 W to Po=20 W. The power factor PF is PF=0.83 at the time of the maximum load power Pomax=200 W and the alternating input voltage VAC=230 V, and is 0.75 or more in a range of the maximum load power Pomax=200 W to a load power Po=50 W.

Also, ΔfsA corresponding to the range from the alternating input voltage VAC=100 V/the maximum load power Pomax=200 W to the alternating input voltage VAC=230 V/the minimum load power Pomin=0 W in the power supply circuit according to embodiment 4-7 is 10 kHz or less as in the foregoing embodiments 4-1 to 4-5. Incidentally, embodiment 4-6 having the circuit configuration of FIG. 14 has similar characteristics to those of embodiment 4-7.

When the power supply circuit according to embodiment 4-8 having the circuit form of FIG. 16 is combined with a primary side configuration similar to that of the power supply circuit according to the embodiment 4-1 shown in FIG. 20, for example, and an alternating input voltage condition, a load condition, and a level of a secondary side direct-current output voltage Eo equal to those of the power supply circuit according to embodiment 4-1 are set, the principal part elements and the like can be selected as follows.

An EER-40 type ferrite core is selected for an isolated converter transformer PIT, and the gap length of a gap G is set to 1.6 mm. As for the number of turns (T) of each winding, the primary winding N1=26 T, and the secondary winding N2=12 T. That is, as for the number of turns of the secondary winding part N2, the secondary winding part N2 can be set to substantially ½ of the number of turns of the secondary winding N2 in FIG. 20 (embodiment 4-1), for example. By this structure, k=0.74 is obtained as the coupling coefficient k of the isolated converter transformer PIT itself. In addition, as for a high-frequency inductor L11, a high-frequency winding part L11A=10 μH and a high-frequency winding part L11B=30 μH are selected, whereby a total coupling coefficient kt=0.645 is set.

The resonant capacitors for forming a primary side series resonant circuit, a secondary side series resonant circuit, a primary side partial voltage resonant circuit, and a secondary side partial voltage resonant circuit, and a filter capacitor CN are selected as follows.

Primary side series resonant capacitor C1=0.047 µF
Secondary side series resonant capacitor C2=0.15 µF
Primary side partial resonant capacitor Cp=1000 pF
Secondary side partial resonant capacitor Cp2=1000 pF
Filter capacitor CN=1 µF An experiment conducted on the power supply circuit configured as described above provides results substantially equal to those of FIG. 21, FIG. 22, FIG. 23, and FIG. 24.

Specifically, as for the AC→DC power conversion efficiency (ηAC→DC), ηAC→DC=91.0% at the time of a maximum load power Pomax=200 W and an alternating input voltage VAC=100 V, and ηAC→DC=91.3% at the time of the maximum load power Pomax=200 W and the alternating input voltage VAC=230 V. Thus, excellent characteristics are obtained as compared with embodiment 3-8.

The power factor PF is PF=0.95 at the time of the maximum load power Pomax=200 W and the alternating input voltage VAC=100 V, and is 0.75 or more in a range of the maximum load power Pomax=200 W to Po=20 W. The power factor PF is PF=0.85 at the time of the maximum load power Pomax=200 W and the alternating input voltage VAC=230 V, and is 0.75 or more in a range of the maximum load power Pomax=200 W to a load power Po=50 W.

Also, ΔfsA corresponding to the range from the alternating input voltage VAC=100 V/the maximum load power Pomax=200 W to the alternating input voltage VAC=230 V/the minimum load power Pomin=0 W in the power supply circuit according to embodiment 4-8 is 10 kHz or less as in the foregoing embodiments 4-1 to 4-7.

For confirmation, the power supply circuits according to embodiments 4-6, 4-7, and 4-8 have the configuration of a multiple complex resonant converter similar to that of one of the foregoing embodiments 4-1 to 4-5, except for a difference in the form and configuration of the rectifier circuit system provided for the secondary winding N2, as described above. Therefore, the power supply circuits according to embodiments 4-6, 4-7, and 4-8 have similar effects to those described in each of the foregoing embodiments 4-1 to 4-5.

Incidentally, in the description thus far, the coupling coefficient between the primary side and the secondary side of an isolated converter transformer PIT itself is denoted by k, and the total coupling coefficient between the primary side and the secondary side of the isolated converter transformer PIT within a power supply circuit is represented as a total coupling coefficient kt so that the coupling coefficient k and the total coupling coefficient kt are differentiated from each other.

However, when, as in the first and second embodiments of the embodiments described thus far, a high-frequency inductor L11 or the primary winding of a power factor improving transformer VFT is not connected in series with the primary winding N1 of the isolated converter transformer PIT, letting L1 be the leakage inductance of the primary winding N1 itself, the total leakage inductance of the isolated converter transformer PIT within the circuit can be, for example, represented as L1+0 considering that the inductance of the high-frequency inductor L11 or the primary winding of the power factor improving transformer VFT is zero. Thus, according to a concept of the present invention, the coupling coefficient k in this case should be treated as the total coupling coefficient kt when the inductance of the high-frequency inductor is zero.

In addition, the present invention is not to be limited to the embodiments described thus far. For example, the structure of the isolated converter transformer PIT and the control transformer PRT, including the core type thereof and the like, may be changed as appropriate.

Also, while the switching converters illustrated in the embodiments are based on an externally excited current resonant converter, the switching converters illustrated in the embodiments can be formed with a self-excited current resonant converter, for example. In this case, a bipolar transistor, for example, can be selected as the switching device. Further, as the switching device on the primary side of the switching converters, for example, a device other than a MOS-FET, such as an IGBT (Insulated Gate Bipolar Transistor) or the like, may be used as long as the device is usable in the externally excited current resonant converters.

In addition, a constant or the like of each part element described above may be changed as appropriate according to an actual condition or the like. Correspondingly, the settings of the frequency values of the oscillation frequency fo1 of the primary side series resonant circuit and the oscillation frequency fo2 of the secondary side series resonant circuit may be changed as appropriate without being limited to the settings illustrated in the foregoing embodiments.

Further, the power factor improving circuits of the power regeneration system or the voltage feedback system are not limited to the configurations shown in the respective embodiments, and may be changed as appropriate.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A switching power supply circuit, comprising:
a rectifying and smoothing circuit operable to receive an alternating voltage and to generate a rectified and smoothed voltage;
a switching circuit including a switching device operable to receive the rectified and smoothed voltage as a direct-current input voltage and to perform a switching operation at a switching frequency, the switching operation resulting in a switching output;
a switching driving unit operable to drive the switching device to perform the switching operation;
a converter transformer having a core with a primary winding on a primary side and a secondary winding on a secondary side, the primary winding being supplied with the switching output of the switching operation, and the secondary winding having an alternating voltage induced therein by the primary winding, the core having a gap formed at a predetermined position between the primary side and the secondary side, the gap having a length selected to produce a predetermined coupling coefficient between the primary side and the secondary side;
a primary side series resonant circuit including a leakage inductance component of the primary winding and a capacitance of a primary side series resonant capacitor connected in series with the primary winding for producing a predetermined primary side resonant frequency for making the switching circuit operate on a current resonant basis;
a secondary side series resonant circuit including a leakage inductance component of the secondary winding and a capacitance of a secondary side series resonant capacitor connected in series with the secondary winding for producing a predetermined secondary side resonant frequency;

the primary side series resonant circuit and the secondary side series resonant circuit forming an electromagnetic coupling type resonant circuit;

a secondary side direct-current output voltage generating circuit operable to input an oscillation output from the secondary side series resonant circuit and to perform a rectifying operation on the input oscillation output to generate a secondary side direct-current output voltage;

a constant-voltage control unit operable to perform constant voltage control on the secondary side direct-current output voltage by controlling the switching driving unit according to a level of the secondary side direct-current output voltage to adjust the switching frequency of the switching circuit;

a power factor improving circuit operable to feed back the switching output of the switching operation to a predetermined rectified current path of the rectifying and smoothing circuit, and to interrupt a rectified current according to the fed-back switching output; and a composite coupling coefficient setting unit operable to set a composite coupling coefficient between the primary side and the secondary side of the converter transformer so that the electromagnetic coupling type resonant circuit has a unimodal output characteristic with respect to the input of a frequency signal having the switching frequency.

2. The switching power supply circuit as claimed in claim 1, wherein the power factor improving circuit is operable to regenerate, as power, a current obtained in the primary side series resonant circuit as the switching output, and to feed back the regenerated current to the predetermined rectified current path of the rectifying and smoothing circuit.

3. The switching power supply circuit as claimed in claim 2, wherein the power factor improving circuit includes a series connection circuit formed by connecting a high-frequency inductor in series with a power factor improving switching device, the high-frequency inductor being inserted in series with a rectified current path between a rectification output terminal of a rectifier circuit for rectifying the alternating voltage in the rectifying and smoothing circuit and a positive electrode of a smoothing capacitor, and a filter capacitor connected in parallel with the series connection circuit; and the primary side series resonant circuit is connected to a point of connection between the high-frequency inductor and the power factor improving switching device.

4. The switching power supply circuit as claimed in claim 2, wherein the power factor improving circuit includes a series connection circuit formed by connecting a high-frequency inductor in series with a power factor improving switching device, the high-frequency inductor being inserted in series with a rectified current path between a rectification output terminal of a rectifier circuit for rectifying the alternating voltage in the rectifying and smoothing circuit and a positive electrode of a smoothing capacitor, and a power factor improving series resonant capacitor connected in parallel with the power factor improving switching device, the power factor improving series resonant capacitor and the high-frequency inductor forming a series resonant circuit; and the primary side series resonant circuit is connected to a point of connection between the high-frequency inductor and the power factor improving switching device.

5. The switching power supply circuit as claimed in claim 1, wherein the power factor improving circuit is operable to feed back the switching output of the switching operation as voltage to the predetermined rectified current path of the rectifying and smoothing circuit.

6. The switching power supply circuit as claimed in claim 5, wherein the power factor improving circuit includes a power factor improving transformer having a primary winding and a secondary winding, with a state of loose coupling between the primary winding and the secondary winding of the power factor improving transformer, and a power factor improving switching device;

the primary winding of the power factor improving transformer is connected in series with the primary side series resonant circuit; and a series connection circuit including the secondary winding of the power factor improving transformer and the power factor improving switching device is inserted between a rectification output terminal of a rectifier circuit for rectifying the alternating voltage in the rectifying and smoothing circuit and a positive electrode of a smoothing capacitor.

7. The switching power supply circuit as claimed in claim 5, wherein the power factor improving circuit includes a tertiary winding on the primary side of the converter transformer so as to have an alternating voltage induced by the switching output obtained in the primary winding of the converter transformer, a high-frequency inductor, and a power factor improving switching device; and a series connection circuit formed by connecting the power factor improving switching device, the tertiary winding, and the high-frequency inductor in series with each other is inserted in a predetermined rectified current path between a rectifier circuit and a smoothing capacitor forming the rectifying and smoothing circuit.

8. The switching power supply circuit as claimed in claim 2, wherein the power factor improving circuit includes an inductance element divided into a first winding part and a second winding part by a tap provided at a predetermined winding position, and a power factor improving switching device;

the first winding part is connected in series with the primary winding of the converter transformer; and a series connection circuit formed by the power factor improving switching device and the second winding part is inserted in the predetermined rectified current path of the rectifying and smoothing circuit.

9. The switching power supply circuit as claimed in claim 1, wherein the rectifying and smoothing circuit is a voltage doubler rectifier circuit, the voltage doubler rectifier circuit including a diode device as a power factor improving switching device for interrupting the rectified current in the power factor improving circuit.

10. The switching power supply circuit as claimed in claim 1, wherein the power factor improving circuit includes a power factor control unit operable to perform control so as to make the power factor constant with respect to a change in level of the alternating voltage.

11. The switching power supply circuit as claimed in claim 1, wherein the power factor improving circuit includes a power factor control unit operable to perform control so as to make the power factor constant with respect to load variations.

12. The switching power supply circuit as claimed in claim 1, wherein the secondary side direct-current output voltage generating circuit includes a rectifying element having on and off conditions and a secondary side partial resonant capacitor connected so as to form a partial resonant circuit operable to perform a resonant operation only when the rectifying element is in the off condition.

13. The switching power supply circuit as claimed in claim 1, wherein the secondary side direct-current output voltage generating circuit is formed by connecting a full-wave rectifier circuit having a bridge rectifier circuit to a series connection circuit of the secondary winding and the secondary side series resonant capacitor.

14. The switching power supply circuit as claimed in claim 1, wherein the secondary winding includes a center tap dividing the secondary winding into a first secondary winding part and a second secondary winding part;

the secondary side direct-current output voltage generating circuit includes a first voltage doubler half-wave rectifier circuit formed by connecting a rectifier diode and a secondary side smoothing capacitor for voltage doubler half-wave rectifier operation to a first secondary side series connection circuit including a leakage inductance component of the first secondary winding part and a capacitance of a first secondary side series resonant capacitor, and a second voltage doubler half-wave rectifier circuit formed by connecting a rectifier diode and the secondary side smoothing capacitor for voltage doubler half-wave rectifier operation to a second secondary side series connection circuit including a leakage inductance component of the second secondary winding part and a capacitance of a second secondary side series resonant capacitor; and the secondary side direct-current output voltage generating circuit is formed as a voltage doubler full-wave rectifier circuit in which charging of the secondary side smoothing capacitor by a rectifying operation of the first voltage doubler half-wave rectifier circuit and charging of the secondary side smoothing capacitor by a rectifying operation of the second voltage doubler half-wave rectifier circuit are performed alternately in half-cycles of the alternating voltage induced in the secondary winding.

15. The switching power supply circuit as claimed in claim 1, wherein the secondary side direct-current output voltage generating circuit is formed by connecting a voltage doubler half-wave rectifier circuit to a series connection circuit including the secondary winding and the secondary side series resonant capacitor.

* * * * *